United States Patent
Hayashi et al.

(10) Patent No.: US 6,841,581 B2
(45) Date of Patent: Jan. 11, 2005

(54) EXTRUDED STYRENE RESIN FOAM AND PROCESS FOR PRODUCING THE SAME

(75) Inventors: Takahiro Hayashi, Osaka (JP); Kenkichi Tanaka, Ikeda (JP); Hiroshi Kobayashi, Settsu (JP); Jun Fukuzawa, Settsu (JP); Syunji Kurihara, Settsu (JP)

(73) Assignee: Kaneka Corporation, Osaka (JP)

( * ) Notice: Subject to any disclaimer, the term of this patent is extended or adjusted under 35 U.S.C. 154(b) by 21 days.

(21) Appl. No.: 10/441,398

(22) Filed: May 20, 2003

(65) Prior Publication Data

US 2003/0220408 A1 Nov. 27, 2003

Related U.S. Application Data

(63) Continuation-in-part of application No. PCT/JP01/11248, filed on Dec. 21, 2001.

(30) Foreign Application Priority Data

Dec. 22, 2000 (JP) ........................................ 2000-391544
Jan. 19, 2001 (JP) ........................................ 2001-012135
Apr. 26, 2001 (JP) ........................................ 2001-128845

(51) Int. Cl.$^7$ ................................................. C08J 9/12
(52) U.S. Cl. .............................. 521/79; 264/53; 521/81
(58) Field of Search ....................... 521/79, 81; 264/53

(56) References Cited

U.S. PATENT DOCUMENTS

| | | | |
|---|---|---|---|
| 4,263,409 A | 4/1981 | Liberti | |
| 6,315,932 B1 | 11/2001 | Fujiwara et al. | |
| 6,528,548 B2 | 3/2003 | Hayashi et al. | ................ 521/79 |
| 6,569,912 B1 | 5/2003 | Oohara et al. | |
| 6,696,504 B1 * | 2/2004 | Hayashi et al. | ................ 521/79 |

FOREIGN PATENT DOCUMENTS

| | | | |
|---|---|---|---|
| EP | 1 024 163 A1 | 8/2000 | |
| JP | 7-278338 A | 10/1995 | |
| JP | 11-158317 A | 6/1999 | |
| JP | 11-217456 A | 8/1999 | |
| JP | 2001-316508 A | 11/2001 | |
| WO | WO 88/08013 A1 | 10/1988 | |
| WO | WO 00/12593 A1 | 3/2000 | |
| WO | WO 01/30896 A1 | 5/2001 | |

OTHER PUBLICATIONS

International Search Report Corresponding to International Application No. PCT/JP01/11248 From the Japanese Patent Office Dated Apr. 2, 2002.

* cited by examiner

*Primary Examiner*—Morton Foelak
(74) *Attorney, Agent, or Firm*—Brinks Hofer Gilson & Lione

(57) ABSTRACT

An extruded styrene resin foam which is produced by using a blowing agent imposing a reduced load on the environment and has outstandingly excellent thermal insulating property and flame retardant property adapted for construction use. The foam is obtained by extrusion-foaming of a styrene resin and characterized by containing at least, one or more of saturated hydrocarbons having 3 to 5 carbon atoms as a blowing agent, and containing (A) a halogenated flame retardant, and (B) at least one compound selected from the group consisting of phosphorus type flame retardants containing nitrogen atom in a molecule; tetrazole compounds; specific nitrogen-containing compounds; metal borates; boron oxides; phosphoric acid ester compounds, and having a cell structure constituting the foam wherein a cell anisotropic ratio k, which is defined by the formula: $k = a/(a \times b \times c)^{1/3}$ wherein, in sections of the foam, a (mm) is an average cell size in the thickness direction, b (mm) is an average cell size in the transverse direction and c (mm) is an average cell size in the longitudinal direction, satisfies the relationship: $k \leq 1.1$, and a satisfies the relationship: $0.05 \leq a \leq 0.30$, and the method for producing the same.

31 Claims, No Drawings

US 6,841,581 B2

EXTRUDED STYRENE RESIN FOAM AND PROCESS FOR PRODUCING THE SAME

CROSS-REFERENCE TO RELATED APPLICATION

This is a continuation-in-part of PCT international application No. PCT/JP01/11248 filed on Dec. 21, 2001 pending.

TECHNICAL FIELD

The present invention relates to an extruded styrene resin foam to be used for a thermal insulating material for construction or the like and a production method thereof. More particularly, the invention relates to an extruded styrene resin foam excellent in environmental compatibility and having high thermal insulating property and flame retardant property adapted for construction material use and a production method thereof.

BACKGROUND ART

Hitherto, an extruded styrene resin foam has widely been used as a thermal insulating material for building due to its suitable workability and thermal insulating characteristics. In order to obtain an extruded styrene resin foam with excellent thermal insulating characteristics, techniques using flons represented by flon 142b and flon 134a have been proposed in many past prior patents. So far, a technique using flon 142b has been fixed in the field concerned.

However, recently, the ozone layer problem and global warming problem have been attracting attention and flons are desired to be replaced if possible.

Further, halogenated hydrocarbons such as methyl chloride, ethyl chloride and the like have been commonly used as a suitable blowing agent in relation to plasticizing effect, solubility and foaming property against a resin. However, these blowing agents are substances obliged to keep work environmental preservation in production plants or the like from the viewpoint of industrial hygienic environments and such blowing agents are desired to be replaced with other blowing agents.

In such situation, it has been investigated to substitute a blowing agent excellent in the environmental compatibility as the blowing agent to be employed for an extruded styrene resin foam. Naturally, together with the replacement of the blowing agent, it has also been investigated to achieve physical properties such as thermal insulating property, flame retardant property, and mechanical strength required for the thermal insulating material for construction.

As an extruded styrene resin foam using a blowing agent other than flons and its production method, an extruded styrene resin foam and its production method using propane, butane or a mixture thereof, or these hydrocarbons with methyl chloride, ethyl chloride or a mixture thereof as a blowing agent are disclosed in JP 10-237210 A. However, in the case that a blowing agent composed of propane or butane, which has poor plasticizing effect against polystyrene resin, mixed at a high ratio is used to obtain a foam with a low density, a phenomenon of insufficient gas dispersion takes place frequently to make it impossible to stably obtain satisfactory foams. Further, as a means of suppressing this phenomenon, a special kneading/mixing apparatus such as a pin mixer or the like has to be employed to obtain such foams.

Also, in the same official gazette, it is disclosed that hexabromocyclododecane or tetrabromobisphenol A is used in an amount of 1 to 3% by weight and the amounts of propane and butane as a blowing agent remaining in the resultant foam are adjusted to be not more than 3.5% by weight and not more than 2.0% by weight, respectively, in order to satisfy the flame retardant property prescribed in JIS A 9511. Accordingly, there is a description of the upper limit of the amount of propane, butane or their mixture used. However, in that case, if the mixing ratio of methyl chloride, ethyl chloride, or their mixture is that as described in the official gazette, the foaming energy is insufficient and it is very difficult to actually obtain a foam with a low density. Further, as a blowing agent, a halogenated hydrocarbon such as methyl chloride, ethyl chloride or the like is used and this restricts the work environments for production of foams.

Further, in the case of the foam using no flons as described in the foregoing official gazette, in order to adjust the remaining gas amount of propane or butane to the aforesaid level, it is required to restrict the amount of propane or butane added when producing a foam, or it is required to store the foam for a long time until the blowing agent is decreased after the production of the foam, which causes problems such as poor production stability in extrusion foaming and poor productivity.

Moreover, with the amount of propane or butane in the foam using no flons as described in the foregoing official gazette, it is very difficult to obtain a foam having high-level thermal insulating property, for example, as required for the extrusion method polystyrene foam thermal insulating board Class 3a or 3b as prescribed JIS A 9511. In order to obtain a foam having high-level thermal insulating property, it is supposed to allow a saturated hydrocarbon compound such as propane or butane to remain in a larger amount. For example, according to the present inventors' investigations, although it depends on the foam density, in the case that the foam density is within a range of 20 to 40 kg/m$^3$, it is preferable for propane to remain in an amount of 4% by weight or more and for butanes to remain in an amount of 2.5% by weight or more, particularly in an amount of 3% by weight or more, based on the foam weight. However, in the case where compounds with a relatively high combustibility like aliphatic hydrocarbons represented by propane and butane are allowed to remain in large amounts, it sometimes takes place that the flame retardant property prescribed in JIS A 9511 cannot be satisfied only by incorporating hexabromocyclodedecane or tetrabromobisphenol A in an amount of 1 to 3% by weight as described in the foregoing official gazette. On the contrary, in order to improve the flame retardant property, it is supposed to increase the amount of a flame retardant to be added, however a stable flame retardant property cannot be obtained only by increasing the content thereof. Also, although the styrene resin, which is a basic material of a foam, itself is made flame-retardant, hydrocarbons to be evaporated from the foam upon burning are easy to be ignited and the tendency that it is difficult to suppress combustion is still difficult to be solved. Moreover, increase of the amount of the flame retardant easily results in deterioration of foam formability and it tends to be difficult to obtain a satisfactory molded product.

Further, a production method for an extruded styrene resin foam excellent in environment compatibility by using a non-halogenated hydrocarbon blowing agent is disclosed in International Publication No. WO 99/33625 pamphlet. This official gazette describes a production method for an extruded styrene resin foam satisfying the thermal insulating property of the extrusion method polystyrene foam thermal insulating board Class 3a or 3b prescribed JIS A 9511 by using a hydrocarbon to make a foam flon-free and using an ether to make a foam halogenated hydrocarbon-free. However, there is no reference to any technique to meet the flame retardant property of the extrusion method polystyrene foam thermal insulating board prescribed JIS A 9511 in the case that a hydrocarbon blowing agent is used at a high ratio, and in order to increase the industrial significance, some improvement is desired.

Further, in the case of using as a blowing agent non-flon, non-halogenated hydrocarbon with poor plasticizing effect and solubility against a styrene resin, if conventional foaming conditions and production method are employed, in some cases voids are formed in a foam and molding alteration following the pressure alteration in an extrusion system occurs owing to the insufficient dissolution of the blowing agent to make stable production very difficult. Accordingly, in the industrial production of a foam, further improvement is expected in the term of productivity stability.

On the other hand, as a prior art to make it possible to provide a high thermal insulating property, methods for modifying the cell structure of a foam to a characteristic cell structure in which two types of cells, i.e. large cells and small cells coexist to improve the thermal insulating property are disclosed in JP 3-109445 A, JP 3-27304 A, JP 4-80240 A, International Publication No. WO 99/54390 pamphlet. Nevertheless, when the size of an extruder is scaled up for actualization and mass production, such characteristic cell structure cannot stably be obtained in some times and thus further improvement is required to improve the thermal insulating property and to satisfy both the thermal insulating property and the flame retardant property.

As for a foam bearing a skin layer employed for thermal insulating and water-proofing of rooftop and civil engineering, good appearance and smoothness are simultaneously required for the foam surface and therefore, technically, the difficulty is further increased and improvement of the foam forming technique is especially required.

Since a saturated hydrocarbon compound is a combustible gas, in the case that a large quantity of it is used, the flame retardant property of foam prescribed in JIS A 9511 is hard to be maintained. Further, since the thermal conductivity of the saturated hydrocarbon compound in a gas state is high as compared with flons, excellent thermal insulating property tends to be difficult to be obtained. Further, in the case of stably producing a foam using non-flon, non-halogenated hydrocarbon, practically, production technique has to be improved. Owing to these problems, no extruded styrene resin foam using a saturated hydrocarbon and provided with high-level thermal insulating property and flame-retardant property which are required for the extrusion method polystyrene foam thermal insulating board Class 3a or 3b prescribed JIS A 9511 is made industrially available and its materialization is highly expected.

Especially, this is similar in the case of a foam bearing a skin layer and materialization of an excellent foam is desired.

In view of the foregoing prior art, it is an object of the present to provide an extruded styrene resin foam with outstandingly high-level thermal insulating property and flame retardant property without using as a blowing agent flons which have effects on the environment, such as the ozone layer destruction, global warming, and the like.

Another object of the present is to provide an extruded styrene resin foam bearing a skin layer with outstandingly high-level thermal insulating property and flame retardant property without using as a blowing agent flons which have effects on the environment, such as the ozone layer destruction, global warming, and the like.

Further object of the present invention is to provide a method for stably producing an extruded styrene resin foam with outstandingly high-level thermal insulating property and flame retardant property without using as a blowing agent flons which have effects on the environment, such as the ozone layer destruction, global warming, and the like, additionally, without using halogenated hydrocarbons and the like which restrict the work environments in production of a foam and instead, using a non-halogenated blowing agent with low environmental load.

DISCLOSURE OF INVENTION

The present inventors have made investigations of an extruded styrene resin foam provided with excellent thermal insulating property and flame retardant property using a blowing agent excellent in environment compatibility.

Consequently, it has been found out that a flame-retardant property, especially, the combustion quality required for the extrusion method polystyrene foam thermal insulating board prescribed JIS A 9511 can be obtained by incorporating a halogenated flame retardant and a specified compound in an extruded styrene resin foam using mainly a hydrocarbon as a blowing agent to suppress, especially ignition or combustion of the hydrocarbon evaporated from the foam upon burning.

Further, in order to obtain an extremely high-level thermal insulating property just like the property as required for the extrusion method polystyrene foam thermal insulating board Class 3a or 3b prescribed JIS A 9511, there is a limit to suppress the thermal conductivity by the foaming agent remaining in the foam, that is, a gas composed of mainly a hydrocarbon and therefore it is essential to suppress radiation heat transmission by mainly cell structure of the foam. Regarding this point, although hitherto it was made clear that utilization of a characteristic cell structure in which large and small cells coexist makes it easy to obtain high-level thermal insulating property, further detailed investigations make it clear that the foregoing high-level thermal insulating property can further easily be obtained by specifying the cell anisotropic ratio and the average cell size in thickness direction.

Especially, an investigation of a foam bearing a skin layer has been made and subsequently, regarding the foam density, it has been found out that a smooth, satisfactory skin layer can be obtained and it also becomes easy to get the desired cell-shape and as a result, it becomes easy to obtain high-level thermal insulating property, not only by specifying the density of the whole body of the foam but also making the density distribution in the thickness direction of the foam be a characteristic distribution. Further, it has been succeeded to improve the strength of the foam, especially, the bending strength.

Further, it is also effective to use a hydrocarbon as a main component in combination with an ether as well as water and/or alcohol and specify the proportions of these components as a blowing agent usable for an extruded styrene resin foam. Regarding the system using these blowing agents, investigations of the extrusion conditions capable of carrying out stable extrusion-foaming and further investigations of stably obtaining a satisfactory foam body while making the cells of the foam fine in order to obtain a high thermal insulating property have been carried out and as a result, it has been succeeded to achieve the object by specifying the foaming conditions in a die part.

That is, the present invention provides the following extruded styrene resin foams and their production methods:

(1) An extruded styrene resin foam obtained by extrusion-foaming of a styrene resin, the extruded styrene resin foam containing at least, one or more of saturated hydrocarbons having 3 to 5 carbon atoms as a blowing agent, and containing (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the following general formula 1, and nitrogen-containing compounds having the following general formula 2); metal borates; boron oxides; and phosphoric acid ester compounds, the extruded styrene resin foam having a cell structure constituting the foam wherein a cell anisotropic ratio k, which is defined by the formula:

$$k = a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30.$$

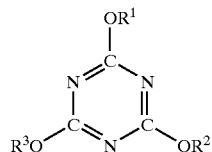

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

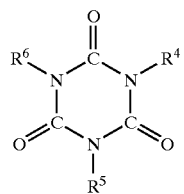

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other. (hereinafter sometimes referred to as "the first invention")

(2) The extruded styrene resin foam as described in (1) above, which contains, as the blowing agent, 100 to 20% by weight of at least one of saturated hydrocarbons having 3 to 5 carbon atoms and 0 to 80% by weight of other blowing agent other than flon type blowing agent, based on the total amount of the blowing agent.

(3) The extruded styrene resin foam as described in (1) or (2) above, wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

(4) The extruded styrene resin foam as described in any one of (1) to (3) above, which contains 0.1 to 10 parts by weight of the halogenated flame retardant (A) and 0.1 to 10 parts by weight of the compound (B), based on 100 parts by weight of the styrene resin.

(5) The extruded styrene resin foam as described in any one of (1) to (4) above, wherein the compound (B) is at least one compound selected from the group consisting of nitrogen-containing compounds having the foregoing general formula 1 and nitrogen-containing compounds having the foregoing general formula 2.

(6) The extruded styrene resin foam as described in any one of (1) to (5) above, wherein the compound (B) is isocyanuric acid and/or bis(2-carboxyethyl) isocyanurate among the nitrogen-containing compounds having the foregoing general formula 2.

(7) The extruded styrene resin foam as described in any one of (1) to (6) above, wherein the saturated hydrocarbon having 3 to 5 carbon atoms is at least one saturated hydrocarbon selected from the group consisting of propane, n-butane, and isobutane.

(8) The extruded styrene resin foam as described in any one of (1) to (7) above, wherein other blowing agent is at least one compound selected from the group consisting of dimethyl ether, methyl chloride, ethyl chloride, water, and carbon dioxide.

(9) The extruded styrene resin foam as described in any one of (1) to (8) above, wherein the total content of the saturated hydrocarbon having 3 to 5 carbon atoms in the extruded styrene resin foam is 2 to 10 parts by weight based on 100 parts by weight of the foam.

(10) The extruded styrene resin foam as described in any one of (3) to (9) above, which further contains a smectite.

(11) The extruded styrene resin foam as described in (10) above, wherein the smectite is bentonite.

(12) The extruded styrene resin foam as described (1) to (11) above, which contains no flon type blowing agent and has both thermal insulating property and flame retardant property meeting the extrusion method polystyrene foam thermal insulating board Class 3a or 3b prescribed JIS A 9511.

(13) A method for producing an extruded styrene resin foam comprising the steps of heating and melting a styrene resin, adding a blowing agent to the styrene resin, and extrusion-foaming the resultant through a die, wherein the extrusion-foaming is carried out in a condition where (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the following general formula 1, and nitrogen-containing compounds having the following general formula 2); metal borates; boron oxides; and phosphoric acid ester compounds, and further a blowing agent comprising 100 to 20% by weight of at least one of saturated hydrocarbons having 3 to 5 carbon atoms and 0 to 80% by weight of other blowing agent other than flon type blowing agent, are made coexist in the styrene resin, thereby giving a foam having a cell structure constituting the foam wherein a cell anisotropic ratio k, which is defined by the formula:

$$k=a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30.$$

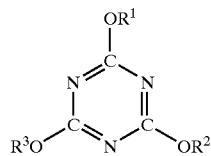

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

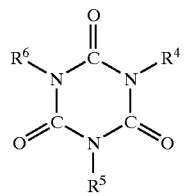

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

(14) The method for producing an extruded styrene resin foam as described in (13) above, wherein the extrusion foaming is carried out by using a blowing agent containing at least water as other blowing agent, thereby giving a foam wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

(15) The method for producing an extruded styrene resin foam as described in (14) above, wherein the extrusion foaming is carried out further in the coexistence of a smectite.

(16) The method for producing an extruded styrene resin foam as described in (15) above, wherein the smectite is bentonite.

(17) An extruded styrene resin foam obtained by extrusion foaming of a styrene resin, the extruded styrene resin foam containing at least, one or more of saturated hydrocarbons having 3 to 5 carbon atoms as a blowing agent, and containing (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the following general formula 1, and nitrogen-containing compounds having the following general formula 2); metal borates; boron oxides; and phosphoric acid ester compounds, the extruded styrene resin foam having a foam density wherein an entire density X of the foam is 20 to 45 kg/m³, and a density Y of each of both surface layer portions corresponding to up to 20% on the upper side and up to 20% on the lower side, respectively, of the overall thickness of the foam satisfies the relationship:

$$Y \geq 1.05 \times X.$$

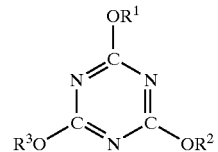

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

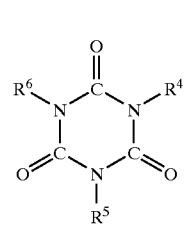

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other. (hereinafter sometimes referred to as "the second invention")

(18) The extruded styrene resin foam as described in (17) above, which contains, as the blowing agent, 100 to 20% by weight of at least one of saturated hydrocarbons having 3 to 5 carbon atoms and 0 to 80% by weight of other blowing agent other than flon type blowing agent, based on the total amount of the blowing agent.

(19) The extruded styrene resin foam as described in (17) or (18) above, which has a cell structure constituting the foam wherein a cell anisotropic ratio k, which is defined by the formula:

$$k=a/(a\times b\times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30.$$

(20) The extruded styrene resin foam as described in any one of (17) to (19) above, wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

(21) The extruded styrene resin foam as described in any one of (17) to (20) above, which contains 0.1 to 10 parts by weight of the halogenated flame retardant (A) and 0.1 to 10 parts by weight of the compound (B), based on 100 parts by weight of the styrene resin.

(22) The extruded styrene resin foam as described in any one of (17) to (21) above, wherein the compound (B) is at least one compound selected from the group consisting of nitrogen-containing compounds having the foregoing general formula 1 and nitrogen-containing compounds having the foregoing general formula 2.

(23) The extruded styrene resin foam as described in any one of (17) to (22) above, wherein the compound (B) is isocyanuric acid and/or bis(2-carboxyethyl) isocyanurate among the nitrogen-containing compounds having the foregoing general formula 2.

(24) The extruded styrene resin foam as described in any one of (17) to (23) above, wherein the saturated hydrocarbon having 3 to 5 carbon atoms is at least one saturated hydrocarbon selected from the group consisting of propane, n-butane, and isobutane.

(25) The extruded styrene resin foam as described in any one of (17) to (24) above, wherein other blowing agent is at least one compound selected from the group consisting of dimethyl ether, methyl chloride, ethyl chloride, water, and carbon dioxide.

(26) The extruded styrene resin foam as described in any one of (17) to (25) above, wherein the total content of the saturated hydrocarbon having 3 to 5 carbon atoms in the extruded styrene resin foam is 2 to 10 parts by weight based on 100 parts by weight of the foam.

(27) The extruded styrene resin foam as described in any one of (20) to (26) above, which further contains 0.2 to 10 parts by weight of a smectite based on 100 parts by weight of the styrene resin.

(28) The extruded styrene resin foam as described in (27) above, wherein the smectite is bentonite.

(29) A method for producing an extruded styrene resin foam comprising the steps of heating and melting a styrene resin, adding a blowing agent to the styrene resin, and extrusion-foaming the resultant through a die, wherein the extrusion-foaming is carried out in a condition where (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the following general formula 1, and nitrogen-containing compounds having the following general formula 2); metal borates; boron oxides; and phosphoric acid ester compounds, and further a blowing agent comprising 100 to 20% by weight of at least one of saturated hydrocarbons having 3 to 5 carbon atoms and 0 to 80% by weight of other blowing agent other than flon type blowing agent, are made coexist in the styrene resin, thereby giving a foam having a foam density wherein an entire density X of the foam is 20 to 45 kg/m³, and a density Y of each of both surface layer portions corresponding to up to 20% on the upper side and up to 20% on the lower side, respectively, of the overall thickness of the foam satisfies the relationship:

$$Y \geq 1.05 \times X.$$

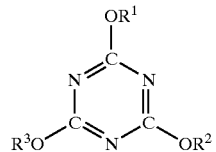

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

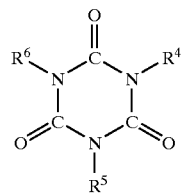

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

(30) The method for producing an extruded styrene resin foam as described in (29) above, wherein the extrusion foaming is carried out by using a blowing agent containing at least water as other blowing agent, thereby giving a foam wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

(31) The method for producing an extruded styrene resin foam as described in (30) above, wherein the extrusion foaming is carried out further in the coexistence of a smectite.

(32) The method for producing an extruded styrene resin foam as described in (31) above, wherein the smectite is bentonite.

(33) A method for producing an extruded styrene resin foam comprising the steps of heating and melting a styrene resin, adding a blowing agent to the styrene resin, and extrusion-foaming the resultant into a lower pressure region through a die, wherein a blowing agent comprising 1) 2 to 6 parts by weight of one or more saturated hydrocarbon selected from the group consisting of saturated hydrocarbons having 3 to 4 carbon atoms, 2) 1 to 6 parts by weight of at least one ether selected from the group consisting of dimethyl ether, methyl ethyl ether and diethyl ether, and 3) 0 to 3 parts by weight of at least one member selected from the group consisting of water and alcohols having 1 to 4 carbon atoms, based on 100 parts by weight of the styrene resin, is used as the blowing agent, and a pressure drop in a die slit portion is not less than 4 MPa and a resin residence time in the die slit portion is not more than 0.4 second. (hereinafter sometimes referred to as "the third invention")

(34) The method for producing an extruded styrene resin foam as described in (33) above, wherein the foam has a density of 20 to 40 kg/m³ and the cells constituting the foam have an average cell size of 0.05 to 0.3 mm.

(35) The method for producing an extruded styrene resin foam as described in (33) or (34) above, wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

(36) The method for producing an extruded styrene resin foam as described in any one of (33) to (35) above, wherein a halogenated flame retardant is contained in an amount of 0.1 to 10 parts by weight based on 100 parts by weight of the styrene resin, and at least one compound selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the following general formula 1, and nitrogen-containing compounds having the following general formula 2); metal borates; boron oxides; and phosphoric acid ester compounds, is contained in an amount of 0.1 to 10 parts by weight based on 100 parts by weight of the styrene resin.

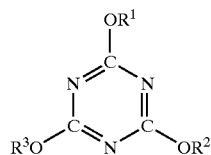

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

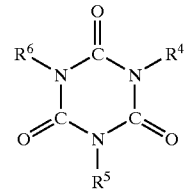

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

(37) The method for producing an extruded styrene resin foam as described in any one of (33) to (36) above, wherein a foam which has a cell structure constituting the foam wherein a cell anisotropic ratio k, which is defined by the formula:

$$k = a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30,$$

is obtained.

(38) An extruded styrene resin foam obtained by the production method described in any one of (33) to (37) above.

The first invention is one wherein high-level thermal insulating property is achieved for an extruded styrene resin foam on the basis of an investigation of the cell structure of a foam on the premise that a flame retardant-added composition for achieving high-level flame retardant property is used. Hereinafter, this point will be described.

The present inventors have tried to compensate for the decrease in thermal conductivity of a gas in cells achieved by use of a flon gas with the decrease in thermal conductivity by radiation, as a technical means of obtaining extremely high-level thermal insulating property required for the extrusion method polystyrene foam thermal insulating board Class 3a or 3b prescribed JIS A 9511 without using flons as a blowing agent. It is generally known that the thermal conduction by radiation is considerably affected by the cell structure and as the cell size becomes smaller, the thermal insulating property is improved more. That is because, under the conditions of the same thickness and the same foam density, the frequency of shielding heat current increases as the cell size becomes smaller, resulting in decrease of the thermal conduction by radiation.

Hence, paying attention to this point, the present inventors have made investigations of a further detailed relation between the cell structure and the thermal insulating property. Regarding the cell size, taking not only the cell size in the thickness direction of a product but also the cell size in the transverse direction and the cell size in the longitudinal direction into consideration, the cell structure body as a whole has been considered. In this study, it has been found out that even if foams have the same cell size in their thickness direction, namely, in the heat current direction, the thermal insulating property changes among the foams depending on their cell anisotropic ratios and that the thermal insulating property is improved as the cell anisotropic ratio becomes smaller. The cell anisotropic ratio k is represented by the formula:

$$k=a/(a \times b \times c)^{1/3}$$

wherein a represents an average cell size in the thickness direction of a product, b represents an average cell size in the transverse direction of the product and c represents an average cell size in the longitudinal direction of the product. This cell anisotropic ratio k indicates a ratio of the cell size in the thickness direction to the average cell size as the structural body calculated from cell sizes in all of the directions, namely, a ratio of orientation of the cells. This fact means that the thermal conduction by radiation is correlated with two factors, i.e. the absolute value of the cell size in the thickness direction and the cell anisotropic ratio. The reason why among foams having the same cell size in the thickness direction, a foam having a reduced cell anisotropic ratio is improved in thermal insulating property is supposedly attributed to the reflection by the cell membranes positioned in the same direction as the heat current in the cell structure body.

As a result, it has been found out that in an extruded styrene resin foam containing at least, one or more of saturated hydrocarbons having 3 to 5 carbon atoms as a blowing agent, more particularly, containing 100 to 20% by weight of at least one of saturated hydrocarbons having 3 to 5 carbon atoms and 0 to 80% by weight of other blowing agent based on the total amount of the blowing agent remaining in the foam and at the same time containing (A) halogenated flame retardant and (B) at least one compound selected from the group consisting of phosphorus type flame retardant containing nitrogen atom in a molecule, tetrazole compounds, specified nitrogen-containing compounds, metal borates, boron oxides, and phosphoric acid ester compounds, when the cell anisotropic ratio k is within a range satisfying: $k \leq 1.1$, preferably $k \leq 1.0$ and the average cell size a (mm) in the thickness direction is within a range satisfying: $0.05 \leq a \leq 0.30$, preferably $0.1 \leq a \leq 0.25$, more preferably $0.1 \leq a \leq 0.24$ as a foam cell structure, the foam is provided with a thermal conductivity of 0.028 W/mK or lower, which is required for the extrusion method polystyrene foam thermal insulating board Class 3a or 3b prescribed JIS A 9511.

If the cell anisotropic ratio k exceeds 1.1, the thermal insulating property is decreased to make it difficult to obtain a thermal conductivity of 0.028 W/mK or lower. Incidentally, if the cell anisotropic ratio k is too small, mechanical properties such as compressive strength tend to decrease and therefore the cell anisotropic ratio k is preferably 0.7 or higher.

If the average cell size a (mm) in the thickness direction is less than 0.05 mm, the cell membranes become too thin, the effect of transmitting heat rays becomes significant and on the contrary the thermal insulating property is decreased to make it difficult to obtain a thermal conductivity of 0.028 W/mK or lower. On the other hand, if the average cell size a (mm) in the thickness direction exceeds 0.30 mm, the frequency of shielding heat current is decreased to make it difficult to obtain a thermal conductivity of 0.028 W/mK or lower.

A method of obtaining the aforesaid foam cell structure specified in the first invention will be described.

Generally, in the case of obtaining board-like highly expanded foams with the same cross-sectional shape, if a large quantity of a nucleating agent is added to make the cell size small, the foregoing cell anisotropic ratio tends to be increased. It is supposed that this is related to a magnification ratio of the cross-sectional area of a foam to the area of the opening portion of a die at the time of forming and that the smaller the cell size is, the more difficult the cross-section of the foam becomes to be enlarged and the cells are easily distorted in the direction in which the cell anisotropic ratio is increased.

Since the cell structure aimed in the present invention is a cell structure with a small cell size and also a small cell anisotropic ratio, a conventional mean is difficult to achieve such a cell structure. Accordingly, in order to achieve the cell structure specified by the invention, the aforesaid cross-section magnification ratio is required to be small. Specifically, means including (1) increasing of the area of the opening portion of a die, and (2) decreasing of the cross-section area of a foam such as decreasing of the thickness of the foam are employed to achieve it. Naturally, it is required to adjust the quantity of a nucleating agent to make the cell size in the thickness direction be at the aimed level or adjust the die pressure for maintaining the pressure in an extruder at a high pressure.

In order to stably obtain a foam having the aforesaid foam cell structure specified by the first invention, the production method of the third invention wherein the foaming conditions in the die portion are specified, that is, a method wherein a pressure drop in the die slit portion is made to be 4 MPa or higher and a resin residence time in the die slit portion is made to be 0.4 second or shorter is effective.

In order to obtain the foregoing foam cell structure specified in the first invention, a foam having a characteristic cell structure in which large and small cells coexist, that is, a foam wherein cells constituting the foam comprise mainly those with a cell size of 0.25 mm or less (hereinafter referred to as "small cells") and those with a cell size of 0.3 to 1 mm (hereinafter referred to as "large cells") and these small cells and large cells are dispersed in an islands-in-sea state through cell membranes, is especially effective. In the case of obtaining a foam having a cell structure containing large and small cells, a ratio of the area occupied by the small cells with a cell size of 0.25 mm or less per cross-sectional area of the foam is preferably 10 to 90%. This small cell-occupied area ratio per cross-sectional area of the foam is more preferably 20 to 90%, furthermore preferably 30 to 90%, most preferably 40 to 90%. A higher small cell-occupied area ratio is preferable since the average cell size a (mm) in the thickness direction is easy to fall within the foregoing range and the thermal insulating property is improved.

A distribution condition of the aforesaid specific cell structure composed of large cells and small cells in a foam is not particularly limited. It may be distributed uniformly in the thickness direction of the foam. Alternatively, it may be distributed with certain regularity in the thickness direction of the foam. The distribution condition of the cell structure in a foam is significantly affected by a product taking-out method. There are two methods for the product taking-out method from an extruded foam. One is a method in which a thick foam is extruded, the skin of the foam is removed, and the foam is cut in the transverse and longitudinal directions into a predetermined size, and in a later step, the foam is sliced into a thickness corresponding to each of products having a variety of sizes to provide products. The other method is one in which a foam having a thickness corresponding to the thickness of a product is extruded, the skin of the foam is removed, and the foam is cut in the transverse and longitudinal directions into a predetermined size to provide products. In the case of a product bearing a skin, of course, the latter method is used.

The cell structure of the product obtained in the former method is relatively uniformly distributed in the thickness direction of the foam. The cell structure of the product obtained in the latter method tends to be distributed with a regularity symmetrically with respect to the center of the foam in the thickness direction. Either distribution condition may be accepted for the cell structure of the foam of the present invention.

The styrene resin to be used in the first invention is not specifically limited, and examples of the styrene resins are a styrene homopolymer produced from styrene monomer alone, random, block or graft copolymers produced from styrene monomer and a monomer copolymerizable with styrene or its derivatives, modified polystyrenes such as post-brominated polystyrene and rubber-reinforced polystyrene. These resins can be used alone or in admixture of two or more species thereof.

Examples of the monomers copolymerizable with styrene are styrene derivatives such as methylstyrene, dimethylstyrene, ethylstyrene, diethylstyrene, isopropylstyrene, bromostyrene, dibromostyrene, tribromostyrene, chlorostyrene, dichlorostyrene and trichlorostyrene; polyfunctional vinyl compounds such as divinylbenzene; (meth)acrylic compounds such as acrylic acid, methacrylic acid, methyl acrylate, methyl methacrylate, ethyl acrylate, ethyl methacrylate and acrylonitrile; diene compounds and their derivatives such as butadiene; unsaturated carboxylic acid anhydrides such as maleic anhydride and itaconic anhydride, and the like. These compounds can be used alone or in admixture of two or more species thereof.

As the styrene resins, styrene homopolymer is preferred from the viewpoint of processability.

The first invention is characterized in that one or more of saturated hydrocarbons having 3 to 5 carbon atoms are used as a blowing agent and other blowing agents other than flon type blowing agents are used together if required.

Examples of the saturated hydrocarbons having 3 to 5 carbon atoms to be used in the first invention are propane, n-butane, isobutane, n-pentane, isopentane, neopentane and the like.

Preferable saturated hydrocarbons having 3 to 5 carbon atoms are n-butane, isobutane, and a mixture of n-butane and isobutane from the viewpoints of foamability and thermal insulating property of the resultant foam and especially preferable one is isobutane.

Other blowing agents to be used in the first invention are not specifically limited so long as they are other than flon type blowing agents. Examples of other blowing agents are organic blowing agents including ethers such as dimethyl ether, diethyl ether, methyl ethyl ether, isopropyl ether, n-butyl ether, diisopropyl ether, furan, furfural, 2-methylfuran, tetrahydrofuran and tetrahydropyran; ketones such as dimethyl ketone, methyl ethyl ketone, diethyl ketone, methyl n-propyl ketone, methyl n-butyl ketone, methyl i-butyl ketone, methyl n-amyl ketone, methyl n-hexyl ketone, ethyl n-propyl ketone, and ethyl n-butyl ketone; alcohols such as methanol, ethanol, propyl alcohol, i-propyl alcohol, butyl alcohol, i-butyl alcohol, and t-butyl alcohol; carboxylic acid esters such as methyl formate, ethyl formate, propyl formate, butyl formate, amyl formate, methyl propionate, and ethyl propionate; and alkyl halides such as methyl chloride and ethyl chloride; inorganic blowing agents such as water and carbon dioxide; and chemical blowing agents such as azo compounds. These blowing agents can be used alone or in admixture of two or more species thereof.

Among other blowing agents, from the viewpoints of foamability and foam formability, dimethyl ether, methyl chloride, ethyl chloride, water, and carbon dioxide are preferred, and above all, dimethyl ether, and water are especially preferred.

The use of other blowing agents provides satisfactory plasticizing effect and effect as a blowing asistant agent, resulting a decrease in the extrusion pressure to enable stable production of a foam.

When water is used as other blowing agent, a foam having a characteristic cell structure composed of small cells and large cells as mentioned above is obtained. In the case of using water as other blowing agent, water may be used in combination with only a saturated hydrocarbon having 3 to 5 carbon atoms. However, it is more preferable to combine water with a saturated hydrocarbon having 3 to 5 carbon atoms and other blowing agents other than water (for example, dimethyl ether) to provide a blowing agent composed of three or more components since formability and productivity of foam are further improved.

In producing an extruded styrene resin foam according to the first invention, the amount of a blowing agent to be added or introduced to the styrene resin appropriately varies depending upon the set value of expansion ratio, etc. In general, however, the total amount of blowing agent (s) is preferably from 4 to 15 parts by weight based on 100 parts by weight of the styrene resin. If the amount of the blowing agent used is less than 4 parts by weight, the expansion ratio is low so that it sometimes tends to be difficult to sufficiently provide characteristic properties such as lightweight and thermal insulating property as a resin foam. If the amount is more than 15 parts by weight, defects such as voids may be caused in the resultant foam due to the excess amount of the blowing agent.

With respect to a blowing agent to be added, the amount of one or more of saturated hydrocarbons having 3 to 5 carbon atoms is preferably 20% by weight or more, more preferably 40% by weight or more, further preferably 50% by weight or more, and especially preferably 60% by weight or more, based on 100% by weight of the total amount of the blowing agent, and the amount of a blowing agent other than the saturated hydrocarbon having 3 to 5 carbon atoms is preferably 80% by weight or lower, more preferably 60% by weight or lower, further preferably 50% by weight or lower, and especially preferably 40% by weight or lower, based on 100% by weight of the total amount of the blowing agent. If the amount of the saturated hydrocarbon having 3 to 5 carbon atoms is lower than the above defined ranges, in some cases, the thermal insulating property of the obtained foam is deteriorated. If the amount of the blowing agent other than the hydrocarbon having 3 to 5 carbon atoms exceeds the foregoing ranges, the plasticizing effect is too high and the mixing state of the styrene resin and the blowing agents in an extruder is uneven and the pressure control in the extruder tends to become difficult.

From the viewpoint of stable production of a foam and materialization of a foam having satisfactory quality such as appearance, regarding the blowing agents to be added, the amount of a hydrocarbon having 3 to 5 carbon atoms is preferably 90% by weight or lower, more preferably 80% by weight or lower, furthermore preferably 70% by weight or lower, based on 100% by weight of the total amount of the blowing agent. The amount of a blowing agent other than hydrocarbon having 3 to 5 carbon atoms is preferably 10% by weight or more, more preferably 20% by weight or more, furthermore preferably 30% by weight or more, based on 100% by weight of the total amount of the blowing agent.

In the case of using dimethyl ether as other blowing agent, the amount to be added is preferably 10 to 50% by weight based on 100% by weight of the total amount of the blowing agent in terms of processability or the like.

In the case of using methyl chloride and/or ethyl chloride as other blowing agent, the amount to be added is preferably 20 to 50% by weight based on 100% by weight of the total amount of the blowing agent in terms of processability or the like.

In the case of using water as other blowing agent, the amount to be added is preferably 1 to 80% by weight, more preferably 3 to 70% by weight, furthermore preferably 3 to 30% by weight, and especially preferably 5 to 20% by weight, based on 100% by weight of the total amount of the blowing agent in terms of processability and formation of the aforesaid smaller cells and larger cells.

In the case of using carbon dioxide as other blowing agent, the amount to be added is preferably 3 to 40% by weight, more preferably 5 to 30% by weight, based on 100% by weight of the total amount of the blowing agent in terms of processability and cell size.

The pressure when adding or introducing blowing agents is not particularly limited and a pressure higher than the inner pressure of an extruder or the like is sufficient.

An extruded styrene resin foam obtained according to the first invention contains, at least, one or more of saturated hydrocarbons having 3 to 5 carbon atoms as a blowing agent. With respect to the composition of the blowing agents in the resultant extruded styrene resin foam, the amount of at least one of saturated hydrocarbons having 3 to 5 carbon atoms is preferably 100 to 20% by weight, more preferably 100 to 40% by weight, further more preferably 100 to 50% by weight, and especially preferably 100 to 60% by weight, based on the total amount of the remaining blowing agents, and the amount of other blowing agent is preferably 0 to 80% by weight, more preferably 0 to 60% by weight, further more preferably 0 to 50% by weight, and especially preferably 0 to 40% by weight, based on the total amount of the remaining blowing agents. If the amount of saturated hydrocarbons having 3 to 5 carbon atoms in the remaining blowing agents in the foam is less than the foregoing ranges, it tends to be difficult to obtain satisfactory thermal insulating performance.

Although the remaining amount of saturated hydrocarbons having 3 to 5 carbon atoms in the extruded styrene resin foam obtained varies depending on the type of the saturated hydrocarbon compounds, the density of the foam and the like, the amount is preferably 2 to 10 parts by weight based on 100 parts by weight of the foam. The remaining amount is more preferably 3 to 9 parts by weight, especially preferably 4 to 8 parts by weight for propane; more preferably 2.5 to 9 parts by weight, especially preferably 3 to 8 parts by weight for n-butane or isobutane; and more preferably 3 to 9 parts by weight for n-pentane, isopentane or neopentane, based on 100 parts by weight of the foam, in terms of the thermal insulating performance and flame retardant performance. Although the remaining amount of blowing agents other than saturated hydrocarbons having 3 to 5 carbon atoms varies depending upon the type of blowing agent used, the gas permeability and density of the foam, and the like, the amount is preferably 0 to 10 parts by weight, more preferably 0 to 5 parts by weight in order to provide a foam with satisfactory thermal insulating performance.

In the first invention, together with a halogenated flame retardant (A), there coexists one or more of compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1 and nitrogen-containing compounds having the foregoing general formula 2); metal borates; boron oxides; and phosphoric acid ester compounds, in an extruded styrene resin foam.

By virtue of this feature, the extruded styrene resin foam of the first invention is characterized by being provided with high-level flame retardant property as prescribed in JIS A 9511 even if highly combustible hydrocarbons are used as blowing agents. The above-mentioned phosphorus type flame retardants containing nitrogen atom in a molecule, tetrazole compounds, nitrogen-containing compounds having the foregoing general formula 1 or 2, metal borates, boron oxides and phosphorus acid ester compounds are known as flame retardants for resins. However, it has not been known that, in a foam using highly combustible hydrocarbons as blowing agents, these compounds suppress ignition or combustion of the hydrocarbons upon burning of the foam.

As the halogenated flame retardants to be used in the first invention, any of halogenated flame retardants commonly used for thermoplastic resins may be used without any particular limitation. Examples of brominated flame retardants are bromides of aliphatic or alicyclic hydrocarbons such as hexabromocyclododecane; bromides of aromatic compounds such as hexabromobenzene, ethylene bis (pentabromodiphenyl), decabromodiphenylethane, decabromodiphenyl ether, octabromodiphenyl ether, 2,3-dibromopropyl pentabromophenyl ether and the like; brominated bisphenols and their derivatives such as tetrabromobisphenol A, tetrabromobisphenol A bis(2,3-dibromopropyl ether), tetrabromobisphenol A (2-bromoethyl ether), tetrabromobisphenol A diglycidyl ether, an adduct of tetrabromobisphenol A diglycidyl ether and tribromophenol; oligomers of brominated bisphenol derivatives such as tetrabromobisphenol A polycarbonate oligomer, and an epoxy oligomer of an adduct of tetrabromobisphenol A glycidyl ether and bromobisphenol; bromoaromatic compounds such as ethylene bistetrabromophthalimide, and bis(2,4,6-tribromophenoxy) ethane; brominated acrylic resins; ethylene bisdibromonorbornane dicarboxyimide, and the like. As chlorinated flame retardants, examples are chloroaliphatic compounds, chloroaromatic compounds and chloroalicyclic compounds such as chlorinated paraffin, chloronaphthalene, perchloropentadecane, and the like. Further, as halogenated flame retardants containing phosphorus atom, examples are halogenated phosphoric acid esters including tris (halogenated alkyl) phosphates such as tris(chloroethyl) phosphate, tris(chloropropyl) phosphate, tris (dichloropropyl) phosphate and tris(tribromoneopentyl) phosphate, and the like. These compounds can be used alone or in combination of two or more species thereof.

Among the halogenated flame retardants, brominated flame retardants are preferable in terms of flame retardant property and especially, hexabromocyclododecane is preferred due to its compatibility with styrene resins and the like.

The content of the halogenated flame retardant is appropriately adjusted depending upon the amount of the blowing agent to be added, and the like so as to obtain flame retardant property as prescribed in JIS A 9511. Generally, however, the content of the halogenated flame retardant is preferably 0.1 to 10 parts by weight, more preferably 1 to 9 parts by weight, further preferably 2 to 8 parts by weight, especially preferably 3 to 7 parts by weight, based on 100 parts by weight of the styrene resin. If the amount of the halogenated flame retardant is smaller than the foregoing ranges, it tends to be difficult to obtain the desired flame retardant property and on the other hand, if it is larger than the foregoing ranges, formability and the like when producing a foam are sometimes deteriorated.

The content of one or more of the compounds to be used as the compound (B) in the first invention, which compounds are selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, is appropriately adjusted depending upon the amount of the blowing agent to be added, the type and content of the halogenated flame retardant (A), and the like so as to obtain flame retardant property as prescribed in JIS A 9511. Generally, however, the content of the compound (B) is preferably 0.1 to 10 parts by weight, more preferably 0.15 to 9 parts by weight, especially preferably 0.2 to 9 parts by weight, based on 100 parts by weight of the styrene resin. If the amount of the compound (B) is smaller than the foregoing ranges, it tends to be difficult to obtain the desired flame retardant property and on the other hand, if it is larger than the foregoing ranges, formability and the like when producing a foam are sometimes deteriorated.

Examples of the phosphorus type flame retardants containing nitrogen atom in a molecule to be used as the compound (B) in the first invention are melamine phosphate, ammonium phosphate, ammonium phosphate amide, phosphoric acid amide, phosphazene, melamine polyphosphate, ammonium polyphosphate, ammonium polyphosphate amide, polyphosphoric acid amide, polyphosphazene, and the like. These compounds can be used alone or in combination of two or more species thereof. These phosphorus type flame retardants can preferably be used even in a form of being treated by a surface coating with one or more of compounds selected from melamine monomer, melamine resin, modified melamine resin, guanamine resin, epoxy resin, phenol resin, urethane resin, urea resin, silicone resin, and the like.

Among the phosphorus type flame retardants containing nitrogen in a molecule, ammonium phosphate and/or ammonium polyphosphate are preferable, and surface-coated ammonium phosphate and/or surface-coated ammonium polyphosphate are more preferable, since high-level flame retardant property as prescribed in JIS A 9511 can easily be achieved even if highly combustible hydrocarbons are used as blowing agents.

The content of the phosphorus type flame retardant containing nitrogen in a molecule is appropriately adjusted depending upon the type and content of a halogenated flame retardant to be used and, in the case of using a flame retardant other than the halogenated flame retardant in combination, the type and content of the flame retardant, and the type and amount of the blowing agent to be added. Generally, however, the content of the phosphorus type flame retardant is preferably 0.1 to 10 parts by weight, more preferably 0.15 to 6 parts by weight, and especially preferably 0.2 to 4 parts by weight, based on 100 parts by weight of the styrene resin. If the amount of the phosphorus type flame retardant containing nitrogen in a molecule is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory foam.

Examples of the tetrazole compounds to be used as the compound (B) in the first invention are, for instance, guanidine salts of tetrazoles such as tetrazole, bistetrazole and their derivatives; amine salts of tetrazoles such as piperazine salts of tetrazoles and ammonium salts of tetrazoles; and metal salts of tetrazoles such as sodium salts of tetrazoles and manganese salts of tetrazoles. These compounds can be used alone or in combination of two or more species thereof.

As the tetrazole compounds to be used in the first invention, tetrazole compounds having a thermal decomposition temperature of 250° C. or higher are preferable since they are easy to provide the highest flame retarding effect in combination with the aforesaid halogenated flame retardant. Preferable examples of such tetrazole compounds are 5,5'-bistetrazole diguanidine salt, 5,5'-bistetrazole diammonium salt, 5,5'-bistetrazole diaminoguanidine salt, and 5,5'-bistetrazole piperazine salt and most preferable among them is 5,5'-bistetrazole diguanidine salt. When tetrazole compounds having a thermal decomposition temperature of 250° C. or higher is used, it is made possible to avoid their thermal decomposition when producing a styrene resin foam and to cause their thermal decomposition to efficiently generate non-flammable gases when the styrene resin foam is burned. Incidentally, the thermal decomposition temperature generally denotes the temperature at which the weight starts decreasing, measured by differential thermogravimetric analysis.

The content of the tetrazole compound to be used in the present invention is appropriately adjusted depending upon the type and content of a halogenated flame retardant to be used and, in the case of using a flame retardant other than the halogenated flame retardant in combination, the type and content of the flame retardant, and the type and amount of the blowing agent to be added. Generally, however, the content of the tetrazole compound is preferably 0.1 to 10 parts by weight, more preferably 0.15 to 6 parts by weight, and especially preferably 0.2 to 4 parts by weight, based on 100 parts by weight of the styrene resin. If the amount of the tetrazole compound is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory foam. Also, the flame retardant property is scarcely improved if the tetrazole compound is added more.

As the nitrogen-containing compound selected from cyanuric acid, isocyanuric acid, and their derivatives to be used as the compound (B) in the first invention, compounds selected from cyanuric acid, isocyanuric acid, and their derivatives which are represented by the following general formula 1 or general formula 2 are preferable. These compounds can be used alone or in combination of two or more species thereof.

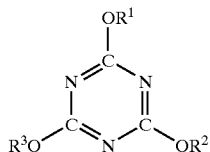

(1)

wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

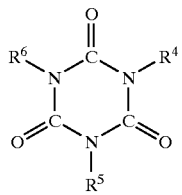

(2)

wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

Examples of the alkyl group having 1 to 8 carbon atoms represented by $R^1$, $R^2$ and $R^3$, or $R^4$, $R^5$ and $R^6$ in the general formula 1 or 2 are methyl, ethyl, propyl, isopropyl, butyl, isobutyl, s-butyl, t-butyl, pentyl, hexyl, octyl, and the like. Examples of the monovalent organic group having phosphorus atom represented by X are a residual group of phosphonic acid ester, a residual group of phosphoric acid ester, and the like. Examples of the alkylene group having 1 to 6 carbon atoms represented by Y are methylene, ethylene, trimethylene, propylene, tetramethylene, hexamethylene, and the like. Examples of the cycloalkylene group represented by Y are cyclohexene, and the like.

Typical examples of the nitrogen-containing compounds are cyanuric acid; monoalkyl cyanurates such as methyl cyanurate; dialkyl cyanurates such as diethyl cyanurate; trialkyl cyanurates such as trimethyl cyanurate and triethyl cyanurate; phenyl cyanurate, diphenyl cyanurate, triphenyl cyanurate; dialkyl phenyl cyanurates such as dimethyl phenyl cyanurate; isocyanuric acid; monoalkyl isocyanurates such as methyl isocyanurate; dialkyl isocyanurates such as diethyl isocyanurate; trialkyl isocyanurates such as trimethyl isocyanurate and triethyl isocyanurate; phenyl isocyanurate, diphenyl isocyanurate, triphenyl isocyanurate; dialkyl phenyl isocyanurates such as dimethyl phenyl isocyanurate; mono(aminoalkyl) isocyanurates such as mono(2-aminoethyl) isocyanurate; di(aminoalkyl) isocyanurates such as di(2-aminoethyl) isocyanurate; tri(aminoalkyl) isocyanurates such as tri(2-aminoethyl) isocyanurate; tri(hydroxyalkyl) isocyanurates such as tri(hydroxymethyl) isocyanurate, tri(2-hydroxyethyl) isocyanurate and tri(2-hydroxypropyl) isocyanurate; di(hydroxyalkyl) isocyanurates such as di(hydroxymethyl) isocyanurate; bis(carboxyalkyl) isocyanurates such as bis(2-carboxyethyl) isocyanurate; 1,3,5-tris(carboxyalkyl) isocyanurates such as 1,3,5-tris(2-carboxyethyl) isocyanurate; tris(2,3-epoxypropyl) isocyanurate, and the like. Further, compounds represented by the following formulas can be used. In the following formulas, R denotes an alkyl group having 1 to 6 carbon atoms, a cycloalkyl group, a phenyl group, and the like.

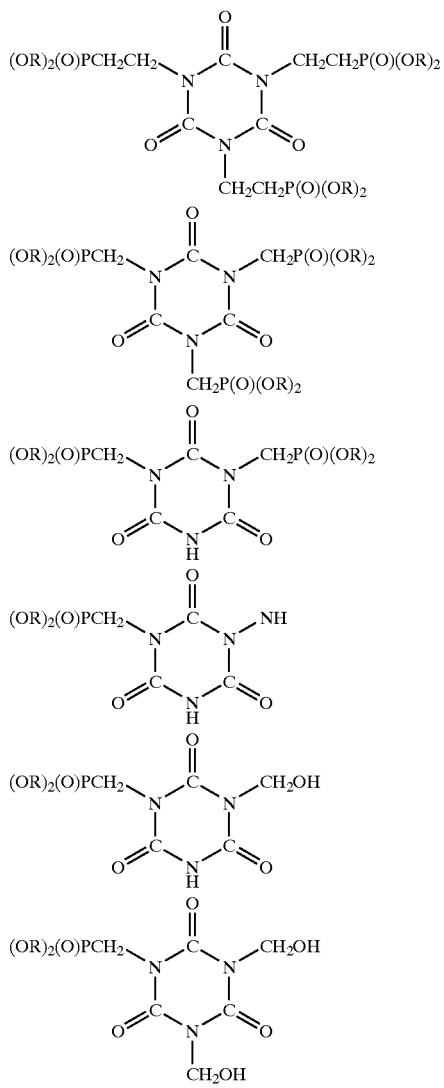

The foregoing nitrogen-containing compounds may be used in a form of a salt with melamine or a melamine derivative, for example, melamine cyanurate.

As the foregoing nitrogen-containing compounds, compounds which are flame-resistant themselves and can be decomposed or melted at 270° to 400° C. are preferable.

Further, as the nitrogen-containing compounds, preferable are compounds which do not inhibit the effect of forming both the aforesaid small cells and large cells in a foam in order to obtain high-level thermal insulating property and the like in the case of using water as other blowing agent, and examples of such compounds are those which are slightly soluble in water or have a solubility of 10% by weight or lower in water in a temperature range near room temperature (about 10° to 30° C.). If the solubility in water is higher, the effect of forming both small cells and large cells tends to be inhibited.

Especially preferable ones among the foregoing nitrogen-containing compounds are cyanuric acid ($R^1$, $R^2$, and $R^3$ in the general formula 1 are hydrogen), isocyanuric acid ($R^4$, $R^5$, and $R^6$ in the general formula 2 are hydrogen), and bis(2-carboxyethyl) isocyanurate ($R^4$ is hydrogen atom, and $R^5$ and $R^6$ are a group wherein Y is ethylene group and X is carboxyl group in the general formula 2).

The content of the foregoing nitrogen-containing compound is appropriately adjusted depending upon the amount of a blowing agent to be added and the like, so as to obtain flame retardant property as prescribed in JIS A 9511 and the effect of suppressing ignition or combustion of hydrocarbons evaporated on burning of a foam. Generally, however, the content of the nitrogen-containing compound is preferably 0.1 to 10 parts by weight, more preferably 1 to 9 parts by weight, furthermore preferably 1.5 to 8 parts by weight, and especially preferably 2 to 7 parts by weight, based on 100 parts by weight of the styrene resin. If the content of the nitrogen-containing compound is lower than the foregoing ranges, it tends to be difficult to obtain the desired flame retardant property and on the other hand, if the content is more than the foregoing ranges, the formability in producing a foam and the like tend to be sometimes deteriorated.

Examples of the metal borates to be used as the compound (B) in the first invention are zinc borate, barium borate, magnesium borate, calcium borate, aluminum borate, strontium borate, zirconium borate, tin borate, borax, and their hydrates, and the like.

Among the foregoing metal borates, zinc borate is preferable since they are easy to provide the highest flame retarding effect in combination with the aforesaid halogenated flame retardant.

The content of the metal borate is appropriately adjusted depending upon the type and content of a halogenated flame retardant to be used and, in the case of using a flame retardant other than the halogenated flame retardant in combination, the type and content of the flame retardant, and the type and amount of a blowing agent to be added, so as to obtain flame retardant property as prescribed in JIS A 9511 and the effect of suppressing ignition or combustion of hydrocarbons evaporated on burning of a foam. Generally, however, the content of the metal borate is preferably 0.1 to 10 parts by weight, more preferably 0.15 to 6 parts by weight, furthermore preferably 0.2 to 4 parts by weight, based on 100 parts by weight of the styrene resin. If the content of the metal borate is lower than the foregoing ranges, it tends to be difficult to obtain the desired flame retardant property and on the other hand, if the content is more than the foregoing ranges, the styrene resin foam extruded from die tends to be easy to be ruptured, resulting in difficult formation of a satisfactory foam.

The boron oxides to be used as the compound (B) in the first invention are, for example, diboron dioxide, diboron trioxide, tetraboron trioxide, tetraboron pentoxide. These boron oxides may contain boric acid, metaboric acid, orthoboric acid or the like to the extent within which the effect of the present invention is not deteriorated. An especially preferable one among the boron oxides is diboron trioxide in terms of flame retardant property. The particle diameter and composition of the boron oxides to be used are not particularly limited.

The content of the boron oxide is appropriately adjusted depending upon the type and content of a halogenated flame retardant to be used and, in the case of using a flame retardant other than the halogenated flame retardant in combination, the type and content of the flame retardant, and the type and amount of a blowing agent to be added, so as to obtain flame retardant property as prescribed in JIS A 9511 and the effect of suppressing ignition and combustion of hydrocarbons evaporated on burning of a foam. Generally, however, the content of the boron oxide is preferably 0.1 to 10 parts by weight, more preferably 1 to 9 parts by weight, furthermore preferably 1.5 to 8 parts by weight, based on 100 parts by weight of the styrene resin. If the content of the boron oxide is lower than the foregoing ranges, it tends to be difficult to obtain the desired flame retardant property and on the other hand, if the content is more than the foregoing ranges, the styrene resin foam extruded from die tends to become easy to be ruptured, resulting in difficult formation of a satisfactory form.

The phosphoric acid ester compounds to be used as the compound (B) in the first invention are those containing none of nitrogen atom and halogen atom in a molecule and intended to exclude the phosphorus type flame retardants containing nitrogen atom in a molecule as the compound (B) and the halogenated phosphoric acid esters as the halogenated flame retardants (A).

Typical examples of the phosphoric acid ester compounds to be used in the first invention are aliphatic type phosphoric acid esters such as trimethyl phosphate, triethyl phosphate, tributyl phosphate, tri(2-ethylhexyl) phosphate, tributoxyethyl phosphate, monoisodecyl phosphate, 2-acryloyloxyethyl acid phosphate, 2-methacryloyloxyethyl acid phosphate, and the like: and aromatic type phosphoric acid esters such as triphenyl phosphate, tricresyl phosphate, trixylenyl phosphate, tris(isopropylphenyl) phosphate, tris(phenylphenyl) phosphate, trinaphthyl phosphate, cresyl diphenyl phosphate, xylenyl diphenyl phosphate, diphenyl (2-ethylhexyl) phosphate, di(isopropylphenyl) phenyl phosphate, diphenyl (2-acryloyloxyethyl) phosphate, diphenyl (2-methacryloyloxyethyl) phosphate, and the like. Further, examples include phosphoric acid esters having two or more of phosphoric acid ester groups represented by the following general formula 3:

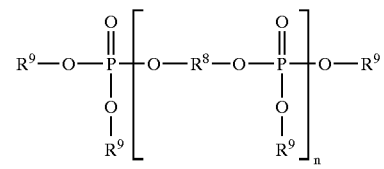

3 wherein $R^8$ is a residual group of resorcinol, hydroquinone, bisphenol A or the like; $R^9$ is phenyl group, tolyl group, xylyl group or the like; and n is an integer of 1 or more.

Examples of the phosphoric acid esters represented by the general formula 3 include aromatic type di(phosphoric acid ester)s (n=1 in the foregoing general formula 3) such as resorcinol-bis(diphenyl phosphate), resorcinol-bis(dixylenyl phosphate), resorcinol-bis(dicresyl phosphate), bisphenol A-bis(diphenyl phosphate), bisphenol A-bis(dixylenyl phosphate), bisphenol A-bis(dicresyl phosphate), hydroquinone-bis(diphenyl phosphate), hydroquinone-bis(dixylenyl phosphate), hydroquinone-bis(dicresyl phosphate), and the like; aromatic type poly(phosphoric acid ester)s (n is 2 or more in the foregoing general formula 3) such as poly[resorcinol-phenyl phosphate], poly[resorcinol- (di-2,6-xylyl) phosphate], poly(bisphenol A-cresyl phosphate), poly[hydroquinone-(2,6-xylyl) phosphate], and the like.

The content of the phosphoric acid ester compounds is appropriately adjusted depending upon the amount of a blowing agent to be added, and the like so as to obtain flame retardant property and the effect of suppressing ignition or combustion of hydrocarbons evaporated on burning of a foam. However, the content is preferably 0.1 to 10 parts by weight, more preferably 0.3 to 9 parts by weight, and furthermore preferably 0.5 to 8 parts by weight, based on 100 parts by weight of the styrene resin. If the content of the phosphoric acid ester compound is less than the foregoing ranges, the desired flame retardant property tends to be difficult to be achieved and on the other hand, if the content is more than the foregoing ranges, the formability in producing a foam is sometimes deteriorated.

According to the first invention, phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, which are used as the compound (B), can be used alone or in combination of two or more species thereof.

According to a preferred embodiment in the first invention, one or more of compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; and boron oxides, are used in combination with at least one of the phosphoric acid ester compounds to further sufficiently suppress ignition or combustion of hydrocarbons evaporated upon burning of a foam using hydrocarbons with high combustibility.

According to the first invention, if required, the extruded styrene resin foam can be incorporated with the following additives to the extent within which the effects of the present invention are not inhibited: inorganic compounds such as silica, talc, calcium silicate, wollastonite, kaolin, clay, mica, zinc oxide, titanium oxide, calcium carbonate and the like; processing assisting agents such as sodium stearate, magnesium stearate, barium stearate, liquid paraffin, olefin type wax, stearylamide type compounds and the like; phenol type antioxidants, phosphorus type stabilizers, light resistant stabilizers such as benzotriazoles, hindered amines, other flame retardants, antistatic agents, coloring agents such as pigments.

Next, a method for producing a foam having the aforesaid characteristic cell structure wherein small cells and large cells coexist will be specifically explained.

In order to obtain a foam having the characteristic cell structure wherein small cells and large cells coexist, it is most effective to use water as other blowing agent other than saturated hydrocarbon having 3 to 5 carbon atoms. In combination with this, the use of a smectite as an additive is further effective.

As the smectites, montmorillonite, and clay minerals, such as bentonite, which contain montmorillonite as a main component are preferable. The term "bentonite" in the present invention is intended to mean basic clay minerals containing montmorillonite as a main component and inclusion minerals such as quartz, α-cristobalite, opal, feldspar, mica and the like. In terms of chemical components, bentonite contains silicon oxide as a main component and aluminum oxide which is a chemical component in the second largest amount. The term "montmorillonite" is said to be a clay mineral which is composed of thin silicate layers with about 1 nm thickness and in which the layer surface of the platy crystal particles is charged to be minus and electrically kept neutral through exchangeable cations, such as sodium or calcium, intervening between the layers and when montmorillonite is brought into contact with water, the exchangeable cations existing between the layers are hydrated to swell the space between the layers.

Especially preferable as the smectites to be used in the first invention is bentonite. Representative examples of bentonite are natural bentonite and refined bentonite. Organo-bentonite or the like can also be used. The smectites in the present invention include products obtained by modifying montmorillonite, such as an anionic polymer-modified montmorillonite, a silane-treated montmorillonite, montmorillonite compounded with a highly polar organic solvent, and the like. Bentonite is available as Bentonite Hodaka, BENGEL, and the like from HOJUN KOGYO CO., LTD. Such bentonites can be used alone or in combination of two or more species thereof.

The smectites such as bentonite are employed since they are supposed to be able to form a gel upon absorbing water, which is not compatible with a styrene resin, and to uniformly disperse water in a gel state into the styrene resin.

The content of the smectite such as bentonite to be used in the present invention is appropriately adjusted depending upon the amount of water to be added and the like. However, the content is preferably 0.2 to 10 parts by weight, more preferably 0.5 to 5 parts by weight, based on 100 parts by weight of the styrene resin. If the content of the smectite is less than the foregoing ranges, the amount of water absorbed by the smectite is insufficient as compared to the amount of water added and voids are formed in a foam owing to poor dispersion of water in an extruder, resulting in a defective molded body. On the other hand, if the content is more than the foregoing ranges, the smectite is difficult to be uniformly dispersed into the styrene resin in the extruder, and thus uneven foaming tends to be caused. Further, it tends to be difficult to maintain closed cell structure. Consequently, the deterioration of and variations in thermal insulating property of the resultant foam tend to occur. The mixing ratio of water/smectite (or bentonite) by weight is preferably 0.02 to 20, more preferably 0.25 to 2.

Further, as a water absorbing medium other than the smectite, saponite; water absorptive or water-swellable clay minerals such as swellable fluoro-mica; and the foregoing mineral substances modified with organic component; water absorptive polymers, and dehydrated silica having silanol group, and the like can be used. Furthermore, the smectite can be used in combination with one or more of these water absorbing media.

In the case of using water as other blowing agent, nitrogen-containing compounds having the foregoing general formula 2 are preferable as the nitrogen-containing compounds, and isocyanuric acid and/or bis(2-carboxyethyl) isocyanurate are more preferable. These preferable nitrogen-containing compounds are further preferably used in combination with a phosphoric acid ester compound.

In the case of using water as other blowing agent, one preferable embodiment is to use isocyanuric acid and/or bis(2-carboxyethyl) isocyanurate as the nitrogen-containing compound and a smectite, especially bentonite, as the water absorptive substance since the function of forming small cells and large cells is improved and hence a foam having improved thermal insulating property and excellent flame retardant property can be obtained. Especially, the most preferable embodiment is to use isocyanuric acid and/or bis(2-carboxyethyl) isocyanurate as the nitrogen-containing compound and further a phosphoric acid ester compound in combination and a smectite, especially bentonite, as the water absorptive substance since the function of forming small cells and large cells is further improved and hence a foam having further improved thermal insulating property and especially excellent flame retardant property can be obtained.

In the case of using water as other blowing agent, in terms of processability and the aforesaid formation of small cells and large cells, preferable blowing agent is a blowing agent comprising 99 to 20% by weight of at least one of hydrocarbons having 3 to 5 carbon atoms and 1 to 80% by weight of water, based on 100% by weight of the total amount of the blowing agents, and more preferable blowing agent is a blowing agent comprising 97 to 30% by weight of at least one of hydrocarbons having 3 to 5 carbon atoms and 3 to 70% by weight of water, based on 100% by weight of the total amount of the blowing agents. In the case of using water and a blowing agent other than water (such as dimethyl ether) in combination as other blowing agent, in terms of processability and the aforesaid formation of small cells and large cells, preferable blowing agent is a blowing agent comprising 98 to 20% by weight of at least one of hydrocarbons of 3 to 5 carbons, and 1 to 75% by weight of water, and other blowing agent other than water in the residual amount, based on 100% by weight of the total amount of the blowing agents, and more preferable blowing agent is a blowing agent comprising 97 to 30% by weight of at least one of hydrocarbons of 3 to 5 carbons, and 2 to 65% by weight of water, and other blowing agent other than water in the residual amount, based on 100% by weight of the total amount of the blowing agents.

According to the first invention, a hydrocarbon having 3 to 5 carbon atoms; other blowing agent; a halogenated flame retardant (A); and one or more of the compounds (B) selected from the group consisting of phosphorus type flame retardants containing nitrogen atom in a molecule, tetrazole compounds, nitrogen-containing compounds selected from cyanuric acid, isocyanuric acid, and derivatives thereof (preferably nitrogen-containing compounds having the foregoing general formula 1, and nitrogen-containing compounds having the foregoing general formula 2), metal borates, boron oxides, and phosphoric acid ester compounds, are used in combination and this combination is further combined with the specific cell structure, thereby making it possible to obtain an extruded styrene resin foam having both thermal insulating property and flame retardant property meeting the extrusion method polystyrene foam thermal insulating board Class 3a or 3b prescribed JIS A 9511 without using any flon as a blowing agent. That is, it is possible to obtain an extruded styrene resin foam having thermal insulating property of 0.028 W/mK or lower in terms of thermal conductivity and flame retardant property meeting the requirement that the flame is extinguished within 3 seconds and neither remaining ember nor spreading flame beyond the indicating line of combustion limit exists in the combustion test (measuring method A) prescribed in JIS A 9511.

An extruded styrene resin foam having both thermal insulation property and flame retardant property meeting the extrusion method polystyrene foam thermal insulating board Class 3a or 3b prescribed JIS A 9511 can be obtained by using preferably n-butane and/or isobutane, especially preferably isobutane, among saturated hydrocarbons having 3 to 5 carbon atoms. Further, as other blowing agent, dimethyl ether or water is preferably used. The use of water as a blowing agent is especially preferable to make the foregoing small cells and large cells exist together and in this case, it is preferable to use a water absorptive substance, especially preferably a smectite, most preferably bentonite. Although any compounds described in the present invention are preferably used as the halogenated flame retardant, especially preferable one is hexabromocyclododecane. Although any compounds described in the present invention are preferably used as the nitrogen-containing compound, more preferable one is a nitrogen-containing compound to be used preferably in the case of using water as other blowing agent. Isocyanuric acid and/or bis(2-carboxyethyl) isocyanurate are especially preferable and the use of them in combination with a phosphoric acid ester compound is most preferable.

The extruded styrene resin foam of the first invention can be produced by supplying a styrene resin, a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives to a heating/melting/kneading means such as an extruder by a variety of methods such as: (1) mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with a styrene resin and then heating and melting the mixture, (2) heating and melting a styrene resin and then mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides: and phosphoric acid ester compounds, and if necessary, a smectite and other additives with the molten styrene resin, (3) previously preparing a molten composition by mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, nitrogen-containing compounds having the foregoing general formula 2); metal borates, boron oxides, and phosphoric acid ester compounds, and if necessary, a smectite and other additives with a styrene resin and then heating and melting the mixture, and supplying the molten composition to an extruder for heating and melting again; and in any appropriate stage, adding a blowing agent under high pressure to the styrene resin and making the resin into a flowable gel, cooling the gel to a temperature suitable for extrusion foaming; and extruding the flowable gel to a low pressure region through a die to form a foam.

The heating temperature, the melting/kneading time, and the melting/kneading means for heating/melting/kneading the styrene resin and additives such as blowing agent are not particularly limited. It is sufficient for the heating temperature to be a temperature not lower than the temperature at which the styrene resin is melted. However, a temperature at which molecular degradation of the resin due to the influence of the flame retardant or the like is suppressed as much as possible, for example, about 150° to about 220° C., is preferable. The melting/kneading time cannot be determined definitely since it varies depending upon the extrusion quantity per unit time, the melting/kneading means, and the like. However, a period of time required to uniformly disperse the blowing agent into the styrene resin is appropriately selected. Although the melting/kneading means may be, for example, an extruder of screw type, it is not particularly limited as long as it is used for usual extrusion foaming. However, as for the shape of screw, a low shear type screw is preferably used in order to suppress molecular degradation of the resin as much as possible.

The method of expansion forming is also not particularly limited. For example, a general method wherein a foam obtained from a slit die by pressure release is shaped into a board-like foam having a large sectional area by using a forming mold, forming rolls and the like which are mounted in close contact with or in contact with the slit die, can be used.

As for the thickness of the foam of the first invention, it is not particularly limited and appropriately selected depending upon the type of use thereof. For example, in the case of an insulating material used for construction materials, a thick material like a usual board is preferable rather than a thin material like a sheet in order to provide an insulating material having suitable thermal insulating property, bending strength and compressive strength, and the thickness is usually 10 to 150 mm, preferably 20 to 100 mm. The density of the foam of the present invention is preferably 15 to 50 kg/m$^3$, more preferably 25 to 40 kg/m$^3$ in order to provide a lightweight insulating material having excellent thermal insulating property, bending strength and compressive strength.

The second invention is one wherein a smooth, satisfactory skin layer is obtained and further high-level thermal insulating property and improved bending strength are achieved especially for an extruded styrene resin foam bearing a skin layer on the basis of an investigation of the cell structure of a foam and further by specifying the density distribution of the foam in the thickness direction to a characteristic one in addition to specifying of the entire density of the foam on the premise that a flame retardant-added composition for achieving high-level flame retardant property is used.

A foam bearing a skin layer is mainly used for thermal insulating and water proofing of rooftop, and civil engineering and is required to have high-level water-proofing property (less water absorption) and strength (compressive strength, bending strength), in addition to thermal insulating property and flame retardant property.

As for an extruded styrene resin foam to be used as a thermal insulating construction material, generally, in order to assure the smoothness of both upper and lower surfaces of the foam in the thickness direction and the product size precision, a method of removing the skin of a foam with a processing machine and finally cutting the resultant into a finished product size (thickness, width, and length) is frequently used. Further in the case of the use for which adhesion to concrete, a panel or the like is required, the skin of almost foams is removed to impart unevenness to the foam surface.

Usually, an extruded foam has a skin. Generally, however, the skin is removed. The term "a skin layer-bearing" foam in this invention means a foam provided with high-level water-proofing property (less water absorption) and strength (compressive strength and bending strength) and in principle, a foam aimed to leave a skin layer formed at the time of extrusion remaining as it is. Further, the term "a skin layer-bearing" foam in this invention also means a foam satisfying the required size precisions in the thickness direction at the time of extrusion, even in the case that the smoothness of both upper and lower surfaces of a foam in the thickness direction and the product size precision are not assured by a processing machine.

In order to satisfy all of these points, further advanced foam forming techniques and production techniques are required and investigations have been made to obtain a foam meeting the aims in the present invention.

That is, in order to achieve high-level thermal insulating property, giving attention to the density distribution in the thickness direction of the foam in addition to specifying of cell-shape, investigations have been performed. Investigations as to satisfaction of both the thermal insulating property and the strength (compressive strength and bending strength) by adjusting the cell-shape have been carried out, however there is a limitation in stable production of a skin-bearing foam only by that means. It has been found out that by specifying not only the entire density of the foam but also the density distribution of the foam in the thickness direction as constituted in the present invention, all of the items required for the skin layer-bearing foam can be satisfied.

At first, the technical content of the characteristic density distribution of a foam in the thickness direction according to the second invention will be described.

A product taking-out method for an extruded foam bearing a skin layer is generally as follows: A resin in an extruder is melted under a high temperature and high pressure, a blowing agent is introduced thereinto, and the resin and the blowing agent are kneaded together and then, the resulting gel is cooled to have a proper viscosity for foaming by a cooling apparatus or the like and the gel is pressure-released at a die to be foamed. After that, the resultant foam is formed into a board-like foam by using a forming mold, forming rolls and the like adjacent to the die. At that time, the temperature, the resin fluidizing face shape, the surface treatment condition of the resin fluidizing face (lowering of friction resistance) and the like of the forming mold are adjusted to form a smooth skin layer on the foam surface. The continuously extruded foam is cut into a predetermined size in the transverse and longitudinal directions to obtain a product.

However, in the case of employing a flame retardant-added composition for achieving high-level flame retardant property and employing a composition and conditions for making the cell size extremely fine in order to obtain high-level thermal insulating property, under the skin layer formation conditions similar to those of conventional cases, cracks or fissures are formed in the surface portion of a foam and it is very difficult to obtain a satisfactory and smooth skin layer. The cause is supposed to be attributed to a phenomenon that the elongation of cell membrane cannot follow the growth of cells, especially in the surface layer portion where the resin is easy to be subjected to cooling, owing to the tendency of decrease of the molecular weight of a basic resin constituting the cell membranes of a foam in the case of an improved flame retardant-added system, and thinning of cell membrane caused by fining of cells, and consequently the cell membranes are easy to be broken.

Regarding these problems, the present inventors have conducted a variety of investigations and consequently succeeded in obtaining a satisfactory foam bearing a smooth skin layer by specifying the density distribution of a foam in the thickness direction to a characteristic one in addition to specifying of the entire density of the foam, that is, by adjusting the entire density X of the foam to a range of 20 to 45 kg/m$^3$ and the density Y of each of both surface layer portions corresponding to up to 20% on the upper side and up to 20% on the lower side, respectively, of the overall thickness of the foam to satisfy the relationship: $Y \geq 1.05 \times X$.

Further, such characteristic density distribution improves the bending strength of the foam. In the case of using a foam for a member such as thermal insulating materials for construction, as included among the standard physical properties of the extrusion method polystyrene foam thermal insulating board according to JIS A 9511, the bending strength is one of important physical properties as well as the thermal insulating property. Regarding the strength of a foam with a high expansion ratio, the density of the foam, the size and orientation of cells, and the like have great effect thereon. Regarding the bending strength of a board-like highly expanded foam, especially, the surface layer density of the foam, the size and orientation of the cells greatly affect the bending strength of the entire foam. Thus, it has been found out that regarding the density distribution of a foam in the thickness direction, a foam having the characteristic density distribution wherein the density of the surface layer is higher, as described above, is more effective in improving the bending strength than a foam having a uniform density distribution, even if both foams has the same entire density.

As a result of a variety of further investigations, such effect is exhibited when the density Y of the portion of up to 20% of the overall thickness of a foam from the upper surface corresponding to the upper surface layer portion (hereinafter sometimes referred to as "density of the upper layer 20% portion of a foam") and the density Y of the portion of up to 20% of the overall thickness of the foam from the lower surface (rear surface) corresponding to the lower surface layer portion (hereinafter sometimes referred to as "density of the lower layer 20% portion of a foam") each satisfy the relationship: $Y \geq 1.05 \times X$, preferably $Y \geq 1.10 \times X$, more preferably $Y \geq 1.20 \times X$. If $Y < 1.05 \times X$, no clear effect can be achieved.

Imparting such characteristic density distribution to a foam can be materialized, for example, by an adjusting means such as optimizing the temperature of the forming mold within a range of about 50° to about 120° C., optimizing the resin fluidizing face profile of the forming mold so as to be along the foaming curve, or the like. The temperature of the forming mold is preferably made to be lower than the resin temperature at the time of foaming, for example, by about 10° to about 80° C. Such operation conditions are more specifically explained below.

The foam of the second invention can be obtained by extruding a blowing agent-mixed resin controlled to be at a proper resin temperature for foaming from a die by release of pressure and forming the extruded foam, which is not properly shaped yet, into a board-like foam by means of a forming mold and forming rolls adjacent to the die. The suitable resin temperature at the time of foaming in obtaining the foam of the second invention is approximately 100° to 130° C. although it depends on the type and amount of the blowing agent to be added. At the time of shaping the foam, the temperature of the forming mold is preferably set at about 50° to about 120° C., which is a considerably low temperature than the resin temperature at the time of foaming, more preferably set at a temperature within that range of about 50° to about 120° C. and lower than the resin temperature at time of foaming by about 10° to about 80° C., whereby the solidification of the resin due to cooling in the surface layer portion of the foam is promoted to suppress the foaming in the surface layer portion of the foam and as a result the characteristic density distribution of the second invention is materialized.

Nevertheless, regarding the temperature setting of the forming mold, the proper value varies depending on conditions related to the resin composition such as the type and amount of a blowing agent to be used, conditions related to the foam physical properties such as foam density, and conditions such as the fluidizing face profile of the forming mold which directly affects the cross-sectional shape of a foam to be obtained, the residence time of the foam in the forming mold, and the like. Accordingly, it is preferable to determine the proper value within the foregoing temperature range on the basis of experiments and the like.

Further, although being closely related with the temperature setting of the forming mold, in the case of obtaining a skin layer-bearing foam free from cracks or fissures in the surface portion, the condition where the contact resistance in the forming mold is as low as possible is required. Accordingly, it becomes especially important to optimize the resin fluidizing face profile of the forming mold to a profile wherein the contact resistance is low, that is, a profile along the foaming curve.

Regarding the foam having the characteristic density distribution of the second invention, especially satisfactory results can be obtained for the skin layer-bearing foam, however it is not necessarily limited to the skin layer-bearing foam. That is, the second invention is also applied to a foam wherein the skin layer has been shaved off at a thin thickness of about 1 mm to about 5 mm and which has a shaven face showing good adhesion against concrete or the like.

The foam of the second invention, similarly to the foam of the first invention, also preferably has the specified foam cell structure in order to achieve high-level thermal insulating property on the premise that a flame retardant-added composition for achieving high-level flame retardant property is used.

That is, the foam of the second invention is preferably an extruded styrene resin foam which contains at least, one or more of saturated hydrocarbons having 3 to 5 carbon atoms as a blowing agent, more particularly, contains 100 to 20% by weight of at least one of saturated hydrocarbons having 3 to 5 carbon atoms and 0 to 80% by weight of other blowing agent based on the total amount of the blowing agent remaining in the foam and at the same time contains (A) halogenated flame retardant and (B) at least one compound selected from the group consisting of phosphorus type flame retardant containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and further which has a foam cell structure wherein the cell anisotropic ratio k is within a range satisfying: k≦1.1, preferably k≦1.0 and the average cell size a (mm) in the thickness direction is within a range satisfying: 0.05≦a≦0.30, preferably 0.1≦a<0.25, more preferably 0.1≦a<0.24. By having such a foam cell structure, the foam can be provided with a thermal conductivity of 0.028 W/mK or lower, which is required for the extrusion method polystyrene foam thermal insulating board Class 3a or 3b prescribed JIS A 9511.

If the cell anisotropic ratio k exceeds 1.1, the thermal insulating property is degraded to make it difficult to obtain a thermal conductivity of 0.028 W/mK or lower. Incidentally, if the cell anisotropic ratio k is too small, mechanical properties such as compressive strength tend to decrease and therefore the cell anisotropic ratio k is preferably 0.7 or higher.

If the average cell size a (mm) in the thickness direction is less than 0.05 mm, the cell membranes become too thin, the effect of transmitting heat rays becomes significant and on the contrary the thermal insulating property is degraded to make it difficult to obtain a thermal conductivity of 0.028 W/mK or lower. On the other hand, if the average cell size a (mm) in the thickness direction exceeds 0.30 mm, the frequency of shielding heat current is decreased to make it difficult to obtain a thermal conductivity of 0.028 W/mK or lower.

As the method of obtaining the aforesaid foam cell structure, the same means as described in the descriptions of the first invention can be employed.

In order to obtain the foregoing foam cell structure, a foam having a characteristic cell structure in which large and small cells coexist, that is, a foam wherein cells constituting the foam comprise mainly those with a cell size of 0.25 mm or less (hereinafter referred to as "small cells") and those with a cell size of 0.3 to 1 mm (hereinafter referred to as "large cells") and these small cells and large cells are dispersed in an islands-in-sea state through cell membranes, is especially effective as described in the descriptions of the first invention. In the case of obtaining a foam having a cell structure containing large and small cells, a ratio of the area occupied by the small cells with a cell size of 0.25 mm or less per cross-sectional area of the foam is preferably 10 to 90%. This small cell-occupied area ratio per cross-sectional area of the foam is more preferably 20 to 90%, furthermore preferably 30 to 90%, most preferably 40 to 90%. A higher small cell-occupied area ratio is preferable since the average cell size a (mm) in the thickness direction is easy to fall within the foregoing range and the thermal insulating property is improved.

The styrene resin to be employed for the second invention is not particularly limited and any of those exemplified in the first invention can be used.

Similarly to the first invention, the second invention is characterized in that one or more of saturated hydrocarbons having 3 to 5 carbon atoms are used as a blowing agent and other blowing agents other than flon type blowing agents are used together if required.

Examples of the saturated hydrocarbons having 3 to 5 carbon atoms to be used in the second invention are propane, n-butane, isobutane, n-pentane, isopentane, neopentane and the like.

Preferable saturated hydrocarbons having 3 to 5 carbon atoms are n-butane, isobutane, and a mixture of n-butane and isobutane from the viewpoints of foamability and thermal insulating property of the resultant foam and especially preferable one is isobutane.

Other blowing agents to be used in the second invention are not specifically limited. Examples of other blowing agents are organic blowing agents including ethers such as dimethyl ether, diethyl ether, methyl ethyl ether, isopropyl ether, n-butyl ether, diisopropyl ether, furan, furfural, 2-methylfuran, tetrahydrofuran and tetrahydropyran; ketones such as dimethyl ketone, methyl ethyl ketone, diethyl ketone, methyl n-propyl ketone, methyl n-butyl ketone, methyl i-butyl ketone, methyl n-amyl ketone, methyl n-hexyl ketone, ethyl n-propyl ketone, and ethyl n-butyl ketone; alcohols such as methanol, ethanol, propyl alcohol, i-propyl alcohol, butyl alcohol, i-butyl alcohol, and t-butyl alcohol; carboxylic acid esters such as methyl formate, ethyl formate, propyl formate, butyl formate, amyl formate, methyl propionate, and ethyl propionate; and alkyl halides such as methyl chloride and ethyl chloride; inorganic blowing agents such as water and carbon dioxide; and chemical blowing agents such as azo compounds. These blowing agents can be used alone or in admixture of two or more species thereof.

Among other blowing agents, from the viewpoints of foamability and foam formability, dimethyl ether, methyl chloride, ethyl chloride, water, and carbon dioxide are preferred, and above all, dimethyl ether, and water are especially preferred.

The use of other blowing agents provides satisfactory plasticizing effect and effect as a blowing asistant agent, resulting a decrease in the extrusion pressure to enable stable production of a foam.

When water is used as other blowing agent, a foam having a characteristic cell structure in which small cells and large cells exist together as mentioned above is obtained. In case of using water as other blowing agent, water may be used in combination with only a saturated hydrocarbon having 3 to 5 carbon atoms. However, it is more preferable to combine water with a saturated hydrocarbon having 3 to 5 carbon atoms and other blowing agents other than water (for example, dimethyl ether) to provide a blowing agent composed of three or more components since formability and productivity of a foam are further improved.

In producing an extruded styrene resin foam according to the second invention, the amount of a blowing agent to be added or introduced to the styrene resin appropriately varies depending upon the set value of expansion ratio, etc. In general, however, the total amount of blowing agent (s) is preferably from 4 to 15 parts by weight based on 100 parts by weight of the styrene resin. If the amount of the blowing agent used is less than 4 parts by weight, the expansion ratio is low so that it sometimes tends to be difficult to sufficiently provide characteristic properties such as lightweight and thermal insulating property as a resin foam. If the amount is more than 15 parts by weight, defects such as voids may be caused in the resultant foam due to the excess amount of the blowing agent.

With respect to a blowing agent to be added, the amount of one or more of saturated hydrocarbons having 3 to 5 carbon atoms is preferably 20% by weight or more, more preferably 40% by weight or more, further preferably 50% by weight or more, and especially preferably 60% by weight or more, based on 100% by weight of the total amount of the blowing agent, and the amount of a blowing agent other than the saturated hydrocarbon having 3 to 5 carbon atoms is preferably 80% by weight or lower, more preferably 60% by weight or lower, further preferably 50% by weight or lower, and especially preferably 40% by weight or lower, based on 100% by weight of the total amount of the blowing agent. If the amount of the saturated hydrocarbon having 3 to 5 carbon atoms is lower than the above defined ranges, in some cases, the thermal insulating property of the obtained foam is deteriorated. If the amount of the blowing agent other than the hydrocarbon having 3 to 5 carbon atoms exceeds the foregoing ranges, the plasticizing effect is too high and the mixing state of the styrene resin and the blowing agents in an extruder is uneven and the pressure control in the extruder tends to become difficult.

From the viewpoint of stable production of a foam and materialization of a foam having satisfactory quality such as appearance, regarding the blowing agents to be added, the amount of a hydrocarbon having 3 to 5 carbon atoms is preferably 90% by weight or lower, more preferably 80% by weight or lower, furthermore preferably 70% by weight or lower, based on 100% by weight of the total amount of the blowing agent. The amount of a blowing agent other than hydrocarbon having 3 to 5 carbon atoms is preferably 10% by weight or more, more preferably 20% by weight or more, furthermore preferably 30% by weight or more, based on 100% by weight of the total amount of the blowing agent.

In the case of using dimethyl ether as other blowing agent, the amount to be added is preferably 10 to 50% by weight based on 100% by weight of the total amount of the blowing agent in terms of processability or the like.

In the case of using methyl chloride and/or ethyl chloride as other blowing agent, the amount to be added is preferably 20 to 50% by weight based on 100% by weight of the total amount of the blowing agent in terms of processability or the like.

In the case of using water as other blowing agent, the amount to be added is preferably 1 to 80% by weight, more preferably 3 to 70% by weight, furthermore preferably 3 to 30% by weight, and especially preferably 5 to 20% by weight, based on 100% by weight of the total amount of the blowing agent in terms of processability and formation of the aforesaid small cells and large cells.

In the case of using carbon dioxide as other blowing agent, the amount to be added is preferably 3 to 40% by weight, more preferably 5 to 30% by weight, based on 100% by weight of the total amount of the blowing agent in terms of processability and cell size.

The pressure when adding or introducing blowing agents is not particularly limited and a pressure higher than the inner pressure of an extruder or the like is sufficient.

An extruded styrene resin foam obtained according to the invention contains, at least, one or more of saturated hydrocarbons having 3 to 5 carbon atoms as a blowing agent. With respect to the composition of the blowing agents in the resultant extruded styrene resin foam, the amount of at least one of saturated hydrocarbons having 3 to 5 carbon atoms is preferably 100 to 20% by weight, more preferably 100 to 40% by weight, further more preferably 100 to 50% by weight, and especially preferably 100 to 60% by weight, based on the total amount of the remaining blowing agents, and the amount of other blowing agent is preferably 0 to 80% by weight, more preferably 0 to 60% by weight, further more preferably 0 to 50% by weight, and especially preferably 0 to 40% by weight, based on the total amount of the remaining blowing agents. If the amount of saturated hydrocarbons having 3 to 5 carbon atoms in the remaining blowing agents in the foam is less than the foregoing ranges, it tends to be difficult to obtain satisfactory thermal insulating performance.

Although the remaining amount of saturated hydrocarbons having 3 to 5 carbon atoms in the extruded styrene resin foam obtained varies depending on the type of the saturated hydrocarbon compounds, the density of the foam and the like, the amount is preferably 2 to 10 parts by weight based on 100 parts by weight of the foam. The remaining amount is more preferably 3 to 9 parts by weight, especially preferably 4 to 8 parts by weight for propane; more preferably 2.5 to 9 parts by weight, especially preferably 3 to 8 parts by weight for n-butane or isobutane; and more preferably 3 to 9 parts by weight for n-pentane, isopentane or neopentane, based on 100 parts by weight of the foam, in terms of the thermal insulating performance and flame retardant performance. Although the remaining amount of blowing agents other than saturated hydrocarbons having 3 to 5 carbon atoms varies depending upon the type of blowing age nt used, the gas permeability and density of the foam, and the like, the amount is preferably 0 to 10 parts by weight, more preferably 0 to 5 parts by weight in order to provide a foam with satisfactory thermal insulating performance.

In the second invention, together with a halogenated flame retardant (A), there coexists one or more of compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1 and nitrogen-containing compounds having the foregoing general formula 2); metal borates; boron oxides; and phosphoric acid ester compounds, in an extruded styrene resin foam.

By virtue of this feature, the extruded styrene resin foam of the second invention is characterized by being provided with high-level flame retardant property as prescribed in JIS A 9511 even if highly combustible hydrocarbons are used as blowing agents.

As the halogenated flame retardants to be used in the second invention, any of halogenated flame retardants commonly used for thermoplastic resins may be used without any particular limitation. For example, any of brominated flame retardants, chlorinated flame retardants, and halogenated frame retardants containing phosphorus atom as exemplified in the first invention can be used.

Among the halogenated flame retardants, brominated flame retardants are preferable in terms of flame retardant property and especially, hexabromocyclododecane is preferred due to its compatibility with styrene resins and the like.

The content of the halogenated flame retardant is appropriately adjusted depending upon the amount of the blowing agent to be added, and the like so as to obtain flame retardant property of the extrusion method polystyrene foam as prescribed in JIS A 9511. Generally, however, the content of the halogenated flame retardant is preferably 0.1 to 10 parts by weight, more preferably 1 to 9 parts by weight, further preferably 2 to 8 parts by weight, especially preferably 3 to 7 parts by weight, based on 100 parts by weight of the styrene resin. If the amount of the halogenated flame retardant is smaller than the foregoing ranges, it tends to be difficult to obtain the desired flame retardant property and on the other hand, if it is larger than the foregoing ranges, formability and the like when producing a foam are sometimes deteriorated.

The content of one or more of the compounds to be used as the compound (B) in the second invention, which compounds are selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds is appropriately adjusted depending upon the amount of the blowing agent to be added, the type and content of the halogenated flame retardant (A), and the like so as to obtain flame retardant property required for the extrusion method polystyrene foam as prescribed in JIS A 9511. Generally, however, the content of the compound (B) is preferably 0.1 to 10 parts by weight, more preferably 0.15 to 9 parts by weight, especially preferably 0.2 to 9 parts by weight, based on 100 parts by weight of the styrene resin. If the amount of the compound (B) is smaller than the foregoing ranges, it tends to be difficult to obtain the desired flame retardant property and on the other hand, if it is larger than the foregoing ranges, formability and the like when producing a foam are sometimes deteriorated.

As the phosphorus type flame retardants containing nitrogen atom in a molecule to be used as the compound (B) in the second invention, for example, any of phosphorus type flame retardants and surface-coated ones as exemplified in the first invention can be used.

Among the phosphorus type flame retardants containing nitrogen in a molecule, ammonium phosphate and/or ammonium polyphosphate are preferable, and surface-coated ammonium phosphate and/or surface-coated ammonium polyphosphate are more preferable, since high-level flame retardant property required for the extrusion method polystyrene foam as prescribed in JIS A 9511 can easily be achieved even if highly combustible hydrocarbons are used as blowing agents.

The content of the phosphorus type flame retardant containing nitrogen in a molecule is appropriately adjusted depending upon the type and content of a halogenated flame retardant to be used and, in the case of using a flame retardant other than the halogenated flame retardant in combination, the type and content of the flame retardant, and the type and amount of the blowing agent to be added. Generally, however, the content of the phosphorus type flame retardant is preferably 0.1 to 10 parts by weight, more preferably 0.15 to 6 parts by weight, and especially preferably 0.2 to 4 parts by weight, based on 100 parts by weight of the styrene resin. If the amount of the phosphorus type flame retardant containing nitrogen in a molecule is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory form.

As the tetrazole compounds to be used as the compound (B) in the second invention, for example, any of tetrazole compounds as exemplified in the first invention, and the like can be used.

As the tetrazole compounds to be used in the second invention, tetrazole compounds having a thermal decomposition temperature of 250° C. or higher are preferable since they are easy to provide the highest flame retarding effect in combination with the aforesaid halogenated flame retardant. Preferable examples of such tetrazole compounds are 5,5'-bistetrazole diguanidine salt, 5,5'-bistetrazole diammonium salt, 5,5'-bistetrazole diaminoguanidine salt, and 5,5'-bistetrazole piperazine salt and most preferable among them is 5,5'-bistetrazole diguanidine salt. When tetrazole compounds having a thermal decomposition temperature of 250° C. or higher are used, it is made possible to avoid their thermal decomposition when producing a styrene resin foam and to cause their thermal decomposition to efficiently generate non-flammable gases when the styrene resin foam is burned.

The content of the tetrazole compound to be used in the second invention is appropriately adjusted depending upon the type and content of a halogenated flame retardant to be used and, in the case of using a flame retardant other than the halogenated flame retardant in combination, the type and content of the flame retardant, and the type and amount of the blowing agent to be added. Generally, however, the content of the tetrazole compound is preferably 0.1 to 10 parts by weight, more preferably 0.15 to 6 parts by weight, and especially preferably 0.2 to 4 parts by weight, based on 100 parts by weight of the styrene resin. If the amount of the tetrazole compound is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory foam. Also, the flame retardant property is scarcely improved if the tetrazole compound is added more.

As the nitrogen-containing compound selected from cyanuric acid, isocyanuric acid, and their derivatives to be used as the compound (B) in the second invention, compounds selected from cyanuric acid, isocyanuric acid, and their derivatives represented by the foregoing general formula 1 or general formula 2 are preferable. These compounds can be used alone or in combination of two or more species thereof.

As typical examples of the nitrogen-containing compounds, any of those exemplified in the first invention can be used.

As the nitrogen-containing compounds, compounds which are flame retardant themselves and can be decomposed or melted at 270° to 400° C. are preferable.

Further, as the nitrogen-containing compounds, preferable are compounds which do not inhibit the effect of forming both the aforesaid small cells and large cells in a foam in order to obtain high-level thermal insulating property and the like in the case of using water as other blowing agent, and examples of such compounds are those which are slightly soluble in water or have a solubility of 10% by weight or lower in water in a temperature range near room temperature (about 10° to 30° C.). If the solubility in water is higher, the effect of forming both small cells and large cells tends to be inhibited.

Especially preferable ones among the nitrogen-containing compounds are cyanuric acid ($R^1$, $R^2$, and $R^3$ in the general formula 1 are hydrogen), isocyanuric acid ($R^4$, $R^5$, and $R^6$ in the general formula 2 are hydrogen), and bis(2-carboxyethyl) isocyanurate ($R^4$ is hydrogen atom, and $R^5$ and $R^6$ are a group wherein Y is ethylene group and X is carboxyl group in the general formula 2).

The content of the nitrogen-containing compound is appropriately adjusted depending upon the amount of a blowing agent to be added and the like, so as to obtain flame retardant property required for the extrusion method polystyrene foam as prescribed in JIS A 9511 and the effect of suppressing ignition or combustion of hydrocarbons evaporated on burning of a foam. Generally, however, the content of the nitrogen-containing compound is preferably 0.1 to 10 parts by weight, more preferably 1 to 9 parts by weight, furthermore preferably 1.5 to 8 parts by weight, and especially preferably 2 to 7 parts by weight, based on 100 parts by weight of the styrene resin. If the content of the nitrogen-containing compound is lower than the foregoing ranges, it tends to be difficult to obtain the desired flame retardant property and on the other hand, if the content is more than the foregoing ranges, the formability in producing a foam and the like tend to be sometimes deteriorated.

As the metal borates to be used as the compound (B) in the second invention, any of those exemplified in the first invention can be used.

Among the foregoing metal borates, zinc borate is preferable since they are easy to provide the highest flame retarding effect in combination with the aforesaid halogenated flame retardant.

The content of the metal borate is appropriately adjusted depending upon the type and content of a halogenated flame retardant to be used and, in the case of using a flame retardant other than the halogenated flame retardant in combination, the type and content of the flame retardant, and the type and amount of a blowing agent to be added, so as to obtain flame retardant property required for the extrusion method polystyrene foam as prescribed in JIS A 9511 and the effect of suppressing ignition or combustion of hydrocarbons evaporated on burning of a foam. Generally, however, the content of the metal borate is preferably 0.1 to 10 parts by weight, more preferably 0.15 to 6 parts by weight, furthermore preferably 0.2 to 4 parts by weight, based on 100 parts by weight of the styrene resin. If the content of the metal borate is lower than the foregoing ranges, it tends to be difficult to obtain the desired flame retardant property and on the other hand, if the content is more than the foregoing ranges, the styrene resin foam extruded from die tends to be easy to be ruptured, resulting in difficult formation of a satisfactory foam.

As the boron oxides to be used as the compound (B) in the second invention, for example, any of those exemplified in the first invention can be used, and diboron trioxide is especially preferred.

The content of the boron oxide is appropriately adjusted depending upon the type and content of a halogenated flame retardant to be used and, in the case of using a flame retardant other than the halogenated flame retardant in combination, the type and content of the flame retardant, and the type and amount of a blowing agent to be added, so as to obtain flame retardant property required for the extrusion method polystyrene foam as prescribed in JIS A 9511 and the effect of suppressing ignition or combustion of hydrocarbons evaporated on burning of a foam. Generally, however, the content of the boron oxide is preferably 0.1 to 10 parts by weight, more preferably 1 to 9 parts by weight, furthermore preferably 1.5 to 8 parts by weight, based on 100 parts by weight of the styrene resin. If the content of the boron oxide is lower than the foregoing ranges, it tends to be difficult to obtain the desired flame retardant property and on the other hand, if the content is more than the foregoing ranges, the styrene resin foam extruded from die tends to become easy to be ruptured, resulting in difficult formation of a satisfactory form.

As the phosphoric acid ester compounds to be used as the compound (B) in the second invention, for example, any of those exemplified in the first invention can be used.

The content of the phosphoric acid ester compounds is appropriately adjusted depending upon the amount of a blowing agent to be added and the like so as to obtain flame retardant property and the effect of suppressing ignition or combustion of hydrocarbons evaporated on burning of a foam. However, the content is preferably 0.1 to 10 parts by weight, more preferably 0.3 to 9 parts by weight, and furthermore preferably 0.5 to 8 parts by weight, based on 100 parts by weight of the styrene resin. If the content of the phosphoric acid ester compound is less than the foregoing ranges, it tends to be difficult to obtain the desired flame retardant property and on the other hand, if the content is more than the foregoing ranges, the formability in producing a foam is sometimes deteriorated.

According to the second invention, phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides and phosphoric acid ester compounds, which are used as the compound (B), can be used alone or in combination of two or more species thereof. The phosphorus acid ester compound is preferably used in combination with one or more compounds selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; and boron oxides, rather than being used alone.

According to the second invention, if required, the extruded styrene resin form can be incorporated with the following additives to the extent within which the effects of the present invention are not inhibited: inorganic compounds such as silica, talc, calcium silicate, wollastonite, kaolin, clay, mica, zinc oxide, titanium oxide, calcium carbonate and the like; processing assisting agents such as sodium stearate, magnesium stearate, barium stearate, liquid paraffin, olefin type wax, stearylamide type compounds and the like; phenol type antioxidants, phosphorus type stabilizers, light resistant stabilizers such as benzotriazoles, hindered amines, other flame retardants, antistatic agents, coloring agents such as pigments.

As the method for producing a foam having the aforesaid characteristic cell structure wherein small cells and large cells coexist, which is preferably adopted in the second invention, the method as described in detail in the descriptions of the first invention can be used.

In order to obtain a foam having the characteristic cell structure wherein small cells and large cells coexist, it is most effective to use water as other blowing agent other than saturated hydrocarbon having 3 to 5 carbon atoms. In combination with this, the use of a smectite as an additive is further effective.

As the smectites, montmorillonite, and clay minerals, such as bentonite, which contain montmorillonite as a main component are preferable.

Especially preferable as the smectites to be used in the second invention is bentonite. Representative examples of bentonite are natural bentonite and refined bentonite. Organo-bentonite or the like can also be used. The smectites in the second invention include products obtained by modifying montmorillonite, such as an anionic polymer-modified montmorillonite, a silane-treated montmorillonite, montmorillonite compounded with a highly polar organic solvent, and the like. Bentonite is available as Bentonite Hodaka, BENGEL, and the like from HOJUN KOGYO CO., LTD. Such bentonites can be used alone or in combination of two or more species thereof.

The content of the smectite such as bentonite to be used is appropriately adjusted depending upon the amount of water to be added and the like. However, the content is preferably 0.2 to 10 parts by weight, more preferably 0.5 to 5 parts by weight, based on 100 parts by weight of the styrene resin. If the content of the smectite is less than the foregoing ranges, the amount of water absorbed by the smectite is insufficient as compared to the amount of water added and voids are formed in a foam owing to poor dispersion of water in an extruder, resulting in a defective molded body. On the other hand, if the content is more than the foregoing ranges, the smectite is difficult to be uniformly dispersed into the styrene resin in the extruder, and thus uneven foaming tends to be caused. Further, it tends to be difficult to maintain closed cell structure. Consequently, the deterioration of and variations in thermal insulating property of the resultant foam tend to occur. The mixing ratio of water/smectite (or bentonite) by weight is preferably 0.02 to 20, more preferably 0.25 to 2.

Further, as a water absorbing medium other than the smectite, saponite; water absorptive or water-swellable clay minerals such as swellable fluoro-mica; and the foregoing mineral substances modified with organic component; water absorptive polymers, and dehydrated silica having silanol group, and the like can be used. Furthermore, the smectite can be used in combination with one or more of these water absorbing media.

In the case of using water as other blowing agent, nitrogen-containing compounds having the foregoing general formula 2 are preferable as the nitrogen-containing compounds, and isocyanuric acid and/or bis(2-carboxyethyl) isocyanurate are more preferable. These preferable nitrogen-containing compounds are further preferably used in combination with a phosphoric acid ester compound.

In the case of using water as other blowing agent, one preferable embodiment is to use isocyanuric acid and/or bis(2-carboxyethyl) isocyanurate as the nitrogen-containing compound and a smectite, especially bentonite, as the water absorptive substance since the function of forming small cells and large cells is improved and hence a foam having improved thermal insulating property and excellent flame retardant property can be obtained. Especially, the most preferable embodiment is to use isocyanuric acid and/or bis(2-carboxyethyl) isocyanurate as the nitrogen-containing compound and further a phosphoric acid ester compound in combination and a smectite, especially bentonite, as the water absorptive substance since the function of forming small cells and large cells is further improved and hence a foam having further improved thermal insulation property and especially excellent flame retardant property can be obtained.

In the case of using water as other blowing agent, in terms of processability and the aforesaid formation of small cells and large cells, preferable blowing agent is a blowing agent comprising 99 to 20% by weight of at least one of hydrocarbons having 3 to 5 carbon atoms and 1 to 80% by weight of water, based on 100% by weight of the total amount of the blowing agents, and more preferable blowing agent is a blowing agent comprising 97 to 30% by weight of at least one of hydrocarbons having 3 to 5 carbon atoms and 3 to 70% by weight of water, based on 100% by weight of the total amount of the blowing agents. In the case of using water and a blowing agent other than water (such as dimethyl ether) in combination as other blowing agent, in terms of processability and the aforesaid formation of small cells and large cells, preferable blowing agent is a blowing agent comprising 98 to 20% by weight of at least one of hydrocarbons of 3 to 5 carbons, and 1 to 75% by weight of water, and other blowing agent other than water in the residual amount, based on 100% by weight of the total amount of the blowing agents, and more preferable blowing agent is a blowing agent comprising 97 to 30% by weight of at least one of hydrocarbons of 3 to 5 carbons, and 2 to 65% by weight of water, and other blowing agent other than water in the residual amount, based on 100% by weight of the total amount of the blowing agents.

According to the second invention, a hydrocarbon having 3 to 5 carbon atoms; other blowing agent; a halogenated flame retardant (A); and one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, are used in combination and this combination is further combined with the specific cell structure, thereby making it possible to obtain an extruded styrene resin foam having both thermal insulating property and flame retardant property meeting the extrusion method polystyrene foam thermal insulating board Class 3a or 3b prescribed in JIS A 9511 without using any flon as a blowing agent. That is, it is possible to obtain an extruded styrene resin foam having thermal insulating property of 0.028 W/mK or lower in terms of thermal conductivity and flame retardant property meeting the requirement that the flame is extinguished within 3 seconds and neither remaining ember nor spreading flame beyond the indicating line of combustion limit exists in the combustion test (measuring method A) prescribed in JIS A 9511.

An extruded styrene resin foam having both thermal insulation property and flame retardant property meeting the extrusion method polystyrene foam thermal insulating board Class 3a or 3b prescribed JIS A 9511 can be obtained by using preferably n-butane and/or isobutane, especially preferably isobutane, among saturated hydrocarbons having 3 to 5 carbon atoms. Further, as other blowing agent, dimethyl ether or water is preferably used. The use of water as a blowing agent is especially preferable to make the foregoing small cells and large cells exist together and in this case, it is preferable to use a water absorptive substance, especially preferably a smectite, most preferably bentonite. Although any compounds described in the present invention are preferably used as the halogenated flame retardant, especially preferable one is hexabromocyclododecane. Although any compounds described in the present invention are preferably used as the nitrogen-containing compound, more preferable one is a nitrogen-containing compound to be used preferably in the case of using water as other blowing agent. Isocyanuric acid and/or bis(2-carboxyethyl) isocyanurate are especially preferable and the use of them in combination with a phosphoric acid ester compound is most preferable.

The extruded styrene resin foam of the second invention can be produced by supplying a styrene resin, a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives to a heating/melting/kneading means such as an extruder by a variety of methods such as: (1) mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with a styrene resin and then heating and melting the mixture, (2) heating and melting a styrene resin and then mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with the molten styrene resin, (3) previously preparing a molten composition by mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with a styrene resin and then heating and melting the mixture, and supplying the molten composition to an extruder for heating and melting again; and in any appropriate stage, adding a blowing agent under high pressure to the styrene resin and making the resin into a flowable gel, cooling the gel to a temperature suitable for extrusion foaming; and extruding the flowable gel to a low pressure region through a die to form a foam.

The heating temperature, the melting/kneading time, and the melting/kneading means for heating/melting/kneading the styrene resin and additives such as blowing agent are not particularly limited. It is sufficient for the heating temperature to be a temperature not lower than the temperature at which the styrene resin is melted. However, a temperature at which molecular degradation of the resin due to the influence of the flame retardant or the like is suppressed as much as possible, for example, about 150° to about 220° C., is preferable. The melting/kneading time cannot be determined definitely since it varies depending upon the extrusion quantity per unit time, the melting/kneading means, and the like. However, a period of time required to uniformly disperse the blowing agent into the styrene resin is appropriately selected. Although the melting/kneading means may be, for example, an extruder of screw type, it is not particularly limited as long as it is used for usual extrusion foaming. However, as for the shape of screw, a low shear type screw is preferably used in order to suppress molecular degradation of the resin as much as possible.

The method of expansion forming is also not particularly limited except that the temperature of the forming mold and the like are adjusted so as to obtain a foam having the specified density distribution as described above. For example, a general method wherein a foam obtained from a slit die by pressure release is shaped into a board-like foam having a large sectional area by using a forming mold, forming rolls and the like which are mounted in close contact with or in contact with the slit die, can be used.

As for the thickness of the foam of the second invention, it is not particularly limited and appropriately selected depending upon the type of use thereof. For example, in the case of an insulating material used for construction materials, a thick material like a usual board is preferable rather than a thin material like a sheet in order to provide an insulating material having suitable thermal insulating property, bending strength and compressive strength, and the thickness is usually 10 to 150 mm, preferably 20 to 100 mm. The density of the foam (the entire density X of the foam) of the second invention is preferably 20 to 45 kg/m$^3$, more preferably 25 to 40 kg/m$^3$ in order to provide a lightweight insulating material having excellent thermal insulating property, bending strength and compressive strength.

Next, the third invention will be described.

The third invention is characterized in that as a blowing agent to be employed for an extruded styrene resin foam, a saturated hydrocarbon is mainly used and it is used in combination with an ether as well as water and/or an alcohol in a specified mixing ratio and that in the system using these blowing agents, the foaming conditions are specified in a die portion so as to stably carry out the extrusion-foaming and further so as to stably obtain a satisfactory foam by making the foam cells fine to obtain a high thermal insulating property.

The third invention is effective to stably produce a foam having the specified cell structure especially prescribed in the first invention.

That is, it has been expected to carry out further investigations in order to stably actualize in a foam the characteristic cell structure for stably providing high-level thermal insulating property as described in the first invention. Therefore, the foaming conditions in a die portion directly affecting the foam cell shape have eagerly been investigated. The size and the shape (the cell anisotropic ratio) of cells, the uniformity of cells in the cross-section of a foam, the forming ratio of small cells in a foam having the cell structure in which large and small cells coexist, and the like are significantly affected by the foaming conditions in the die portion. Therefore, the effect degrees of the respective factors are quantified and the factors determined to be effective are optimized. As a result, the specifying conditions prescribed in the present invention regarding the pressure drop and the resin residence time in a die slit portion have been found out.

The characteristics of the respective blowing agents to be used in the third invention are as follows: Since a saturated hydrocarbon blowing agent has a relatively small transmittance through a styrene resin and also a small thermal conductivity in a gas phase smaller than that of air, it remains in a foam to improve the thermal insulating property of the foam. However, since the saturated hydrocarbon blowing agent is a combustible gas, there is a problem in the combustion safety in the work environments. Further, in the case of a foam used for a construction material, a flame retardant is generally added to a styrene resin to provide the foam with a flame retardant property. The saturated hydrocarbon blowing agent degrades the flame-retardant property of the foam. An ether blowing agent has a high solubility to a styrene resin and a high transmittance through the resin. The ether blowing agent is therefore desirable to obtain a foam with a high expansion ratio. However, since it is also a combustible gas, there is a problem in the combustion safety in the work environments. Water is clean and economical, however is insoluble in a styrene resin and further has a relatively high boiling point and therefore is inferior in foaming property as compared with the foregoing blowing agents. Alcohol also has a relatively high boiling point and is inferior in foaming property as compared with the foregoing blowing agents. Further, alcohol is combustible and therefore has a problem in the combustion safety under the work environments and degrades the flame-retardant property of the foam.

Thus, the respective blowing agents have advantages and disadvantages. It is not easy to use such non-halogenated blowing agents properly to stably form an extruded foam and obtain a foam with light weight and high thermal insulating property. However, the present inventors have intensively made investigations and found out some technical points to make it possible.

At first, the first point is to combine the foregoing blowing agents in proper proportions.

As the saturated hydrocarbon, a saturated hydrocarbon having 3 to 4 carbon atoms and as the ether, dimethyl ether, methyl ethyl ether, and diethyl ether, and as the alcohol, alcohols having 1 to 4 carbon atoms respectively have desirable foaming capability and can be used.

As the saturated hydrocarbons having 3 to 4 carbon atoms to be employed in the third invention, propane, n-butane, isobutane and the like can be exemplified.

As the alcohols having 1 to 4 carbon atoms to be employed in the third invention, methanol, ethanol, propyl alcohol, isopropyl alcohol, butyl alcohol, isobutyl alcohol, t-butyl alcohol, and the like can be exemplified.

The amount of the saturated hydrocarbon to be introduced under pressure is preferably 2 to 6 parts by weight per 100 parts by weight of a styrene resin; the amount of the ether to be introduced under pressure is preferably 1 to 6 parts by weight per 100 parts by weight of a styrene resin; and the amount of water and/or alcohol to be introduced under pressure is preferably 0 to 3 parts by weight per 100 parts by weight of a styrene resin. The total amount of the blowing agents to be introduced under pressure is preferably 5 to 9 parts by weight.

If the amount of saturated hydrocarbons is less than 2 parts by weight, it tends to become difficult to obtain high-level thermal insulating property. On the other hand, if it exceeds 6 parts by weight, the combustion property of the foam is considerably deteriorated and it tends to become difficult to stably obtain a foam since the saturated hydrocarbon is hardly dissolved in resin. If the amount of the ether is less than 1 part by weight, it tends to become difficult to obtain a high expansion ratio since the plasticizing function to the resin is small and it also tends to become difficult to stably obtain a foam owing to an pressure change and like. On the other hand, if it exceeds 6 parts by weight, it tends to become difficult to obtain a foam with high-level thermal insulating property owing to enlarged cells. If the amount of water and/or alcohol exceeds 3 parts by weight, it tends to become difficult to uniformly dissolve or disperse it in the styrene resin, resulting in failure to obtain a satisfactory foam owing to formation of voids and uneven formation of cells. Incidentally, in the case that water and/or alcohol is an essential component, in order to sufficiently achieve the addition effect of them, the amount of water and/or alcohol introduced under pressure is preferably 0.3 part by weight or more per 100 parts by weight of the styrene resin.

Since the density of the styrene resin foam is preferably 20 to 40 kg/m³ from a viewpoint of the thermal insulating property, the strength and the economy, it is preferable to adjust the total amount of the blowing agents to be introduced under pressure to 5 to 9 parts by weight per 100 parts by weight of the styrene resin. If the total amount of the blowing agents to be introduced under pressure is less than 5 parts by weight, the foam density tends to become higher than the foregoing foam density and if it exceeds 9 parts by weight, formation of voids and a phenomenon that the extrusion becomes unstable, which are caused by excess amount of the blowing agent, tend to be observed.

Next, the second point is that it is essential to keep the pressure drop at the die slit portion at 4 MPa or higher. Only by the above-mentioned selection, the combination, and the specifying of the amounts regarding the blowing agent, any desired foam cannot be obtained. It is required to specify the extrusion conditions, especially, the foaming conditions at the die portion. It is natural to keep the inner pressure in the extrusion system at a high pressure so as to prevent the evaporation of the blowing agents in the extruder and the die and to sufficiently dissolve them in the resin. Further, especially in the system using non-halogenated blowing agent, owing to insufficient solubility of the blowing agent in the resin, phenomena such as gas blow, formation of voids in the foam, pressure change in the system, change of the foam cross-section profile accompanied with the pressure change, and the like tend to be easy to take place. Although adjustment of combinations of the respective blowing agents can more or less suppress occurrence of these phenomena, the adjustment extent is limited in consideration of the physical properties (the density, the thermal insulating property, the strength) of the obtained foam.

Taking the above-described matters into consideration, the present inventors have found out that a stable foam formation is made possible in the system using non-halogenated blowing agent and a foam with a high expansion ratio (a low density) can be obtained by setting the pressure drop at the die slit portion greater than that in the system using a conventional flon type blowing agent or a halogenated hydrocarbon blowing agent such as methyl chloride and keeping the inner pressure of the system in the upstream side of the die slit portion higher than that. Incidentally, if the pressure drop at the die slit portion is too great, the discharge amount from the extruder tends to be deceased to result in productivity decrease. Accordingly, it is preferable to set the pressure drop to be approximately 15 MPa as the upper limit.

The pressure drop in the die slit portion is measured by a pressure sensor installed immediately before the upstream side of the die slit portion. The pressure drop in the die slit portion is a difference between the pressure measured by the pressure sensor and the pressure in the low pressure region (usually the atmospheric pressure).

The pressure drop in the die slit portion can be adjusted mainly by shape of the die slit portion, the viscosity of a styrene resin gel containing the blowing agents, and the discharge amount thereof.

Finally, the third point is to set the resin residence time in the die slit portion to be 0.4 second or shorter. The size of cells constituting a foam and the uniformity of the size are affected by the speed of the pressure release of the blowing agents. The formation of cells is carried out in the course of the evaporation of the blowing agents dissolved in the gel by pressure release, the growth of cells and its completion based on a balance between the evaporation and the tensile strength of the molten gel, and the setting of the cells. If the pressure release speed is slow, a distribution of the pressure and the gel viscosity tends to easy to be caused and the uniformity regarding to the cell size tends to be deteriorated.

Especially, in a portion where the resin temperature is high and the tensile strength of the gel is low (in resin fluidizing center portion, that is, the center portion of the foam cross-section), the cell size becomes large owing to the cell growth to make it difficult to obtain a foam with high-level thermal insulating property. Accordingly, in order to make cells of a foam uniformly fine to obtain high-level thermal insulating property, for example, when attention is given to the slit die shape, it is effective to shorten the land length. The slit die shape to be employed for a board-like extruded foam of styrene resin is not determined in general since it is affected by the viscosity of the resin containing the blowing agents or the like. However, the land length of the slit die is preferably about 1 mm to about 200 mm and especially preferably 1 mm to 50 mm.

It is possible to adjust the width and gap of the slit, however it affects the cross-section shape of the foam to be formed and there are restrictions and therefore, it is not effective. It is required to shorten the land length of the die slit to keep the high pressure up to the vicinity of the die slit outlet, thereby sharply releasing the pressure. Here, it is no need to say that the land length is set to be the necessary lowest limit to keep the pressure described concerning the second point.

The present inventors have made investigations of a variety of operation factors in the system using non-halogenated blowing agent and found out that it is possible to stably obtain a satisfactory foam containing fine cells by quantifying and specifying the conditions to set the resin residence time in the side slit portion be 0.4 second or shorter. If the resin residence time in the die slit portion is too short, it tends to be difficult to kept the pressure in the die so that there sometimes occurs a phenomenon that the dissolved blowing agents are evaporated in the die, and jetted as a gas. Accordingly, it is preferable to set the resin residence time to be about 0.1 second or longer.

Especially, even in the case of using mainly a saturated hydrocarbon blowing agent, in order to provide high-level flame retardant property, it is preferable to incorporate at least one compound selected from the group consisting of phosphorus type flame retardants containing nitrogen atom in a molecule, tetrazole compounds, specified nitrogen-containing compounds, metal borates, boron oxide, and phosphoric acid ester compound in addition to a halogenated flame retardant in a foam, and in the system containing these flame retardants, supposedly attributed to the decrease of the tensile strength of the gel, cells tend to be enlarged to degrade the thermal insulating property. Accordingly, it is preferable to specify the foaming conditions as described above.

The resin residence time at the die slit portion is calculated from the following equation:

$$t = (W \times L \times H)/Q;$$

t(sec): resin residence time at the die slit portion,
W(cm): width of the die slit portion,
L(cm): land length of the die slit portion,
H(cm): gap of the die slit portion, and
Q(cm³/sec): volumetric flow rate of the resin.

In the third invention, the present inventors have succeeded in obtaining the desired foam by the contents of the foregoing described points.

In order to obtain an average cell size of 0.05 to 0.3 mm for a foam specified in the third invention, a foam having a characteristic cell structure in which large and small cells coexist, that is, a foam wherein cells constituting the foam comprise mainly those with a cell size of 0.25 mm or less (hereinafter referred to as "small cells") and those with a cell size of 0.3 to 1 mm (hereinafter referred to as "large cells") and these small cells and large cells are dispersed in an islands-in-sea state through cell membranes, is especially effective. In the case of obtaining a foam having a cell structure containing large and small cells, a ratio of the area occupied by the small cells with a cell size of 0.25 mm or less per cross-sectional area of the foam is 10 to 90%. This small cell-occupied area ratio per cross-sectional area of the foam is preferably 20 to 90%, more preferably 30 to 90%, most preferably 40 to 90%.

As the method for producing a foam having the characteristic cell structure wherein small cells and large cells coexist, the method as described in detail in the descriptions of the first invention can be used.

In order to obtain a foam having the characteristic cell structure wherein small cells and large cells coexist, it is most effective to use water as a blowing agent. In combination with this, the use of a smectite as an additive is further effective.

As the smectites, montmorillonite, and clay minerals, such as bentonite, which contain montmorillonite as a main component are preferable.

Especially preferable as the smectites to be used in the third invention is bentonite. Representative examples of bentonite are natural bentonite and refined bentonite. Organo-bentonite or the like can also be used. The smectites in the third invention include products obtained by modifying montmorillonite, such as an anionic polymer-modified montmorillonite, a silane-treated montmorillonite, montmorillonite compounded with a highly polar organic solvent, and the like. Bentonite is available as Bentonite Hodaka, BENGEL, and the like from HOJUN KOGYO CO., LTD. Such bentonites can be used alone or in combination of two or more species thereof.

The content of the smectite such as bentonite to be used is appropriately adjusted depending upon the amount of water to be added and the like. However, the content is preferably 0.2 to 10 parts by weight, more preferably 0.5 to 5 parts by weight, based on 100 parts by weight of the styrene resin. If the content of the smectite is less than the foregoing ranges, the amount of water absorbed by the smectite is insufficient as compared to the amount of water added and voids are formed in a foam owing to poor dispersion of water in an extruder, resulting in a defective molded body. On the other hand, if the content is more than the foregoing ranges, the smectite is difficult to be uniformly dispersed into the styrene resin in the extruder, and thus uneven foaming tends to be caused. Further, it tends to be difficult to maintain closed cell structure. Consequently, the deterioration of and variations in thermal insulating property of the resultant foam tend to occur. The mixing ratio of water/smectite (or bentonite) by weight is preferably 0.02 to 20, more preferably 0.25 to 2.

Further, as a water absorbing medium other than the smectite, saponite; water absorptive or water-swellable clay minerals such as swellable fluoro-mica; and the foregoing mineral substances modified with organic component; water absorptive polymers, and dehydrated silica having silanol group, and the like can be used. Furthermore, the smectite can be used in combination with one or more of these water absorbing media.

The styrene resin to be employed for the third invention is not particularly limited and any of those exemplified in the first invention can be used.

In the third invention, together with a halogenated flame retardant, preferably there coexist one or more of compounds selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, in an extruded styrene resin foam. By virtue of this feature, the third invention is characterized in that high-level flame retardant property adapted for a construction material (extrusion method polystyrene foam thermal insulating board) as prescribed in JIS A 9511 even if highly combustible hydrocarbons are used as blowing agents.

As the halogenated flame retardants to be used in the third invention, any of halogenated flame retardants commonly used for thermoplastic resins may be used without any particular limitation. For example, any of brominated flame retardants, chlorinated flame retardants, and halogenated frame retardants containing phosphorus atom as exemplified in the first invention, and the like can be used.

Among the halogenated flame retardants, brominated flame retardants are preferable in terms of flame retardant property and especially, hexabromocyclododecane is preferred due to its compatibility with styrene resins and the like.

The content of the halogenated flame retardant is appropriately adjusted depending upon the amount of the blowing agent to be added, and the like so as to obtain the flame retardant property meeting the extrusion method polystyrene foam thermal insulating board as prescribed in JIS A 9511. Generally, however, the content of the halogenated flame retardant is preferably 0.1 to 10 parts by weight, more preferably 1 to 9 parts by weight, further preferably 2 to 8 parts by weight, especially preferably 3 to 7 parts by weight, based on 100 parts by weight of the styrene resin. If the amount of the halogenated flame retardant is smaller than the foregoing ranges, it tends to be difficult to obtain the desired flame retardant property and on the other hand, if it is larger than the foregoing ranges, formability and the like when producing a foam are sometimes deteriorated.

As the phosphorus type flame retardants containing nitrogen atom in a molecule to be used in the third invention, for example, any of phosphorus type flame retardants and surface-coated ones as exemplified in the first invention can be used.

Among the phosphorus type flame retardants containing nitrogen in a molecule, ammonium phosphate and/or ammonium polyphosphate are preferable, and surface-coated ammonium phosphate and/or surface-coated ammonium polyphosphate are more preferable, since high-level flame retardant property for the extrusion method polystyrene foam thermal insulating board as prescribed in JIS A 9511 can easily be achieved even if highly combustible hydrocarbons are used as blowing agents.

The content of the phosphorus type flame retardant containing nitrogen in a molecule is appropriately adjusted depending upon the type and content of a halogenated flame retardant to be used and, in the case of using a flame retardant other than the halogenated flame retardant in combination, the type and content of the flame retardant, and the type and amount of the blowing agent to be added. Generally, however, the content of the phosphorus type flame retardant is preferably 0.1 to 10 parts by weight, more preferably 0.15 to 6 parts by weight, and especially preferably 0.2 to 4 parts by weight, based on 100 parts by weight of the styrene resin. If the amount of the phosphorus type flame retardant containing nitrogen in a molecule is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory form.

As the tetrazole compounds to be used in the third invention, for example, any of tetrazole compounds as exemplified in the first invention, and the like can be used.

As the tetrazole compounds to be used in the third invention, tetrazole compounds having a thermal decomposition temperature of 250° C. or higher are preferable since they are easy to provide the highest flame retarding effect in combination with the aforesaid halogenated flame retardant. Preferable examples of such tetrazole compounds are 5,5'-bistetrazole diguanidine salt, 5,5'-bistetrazole diammonium salt, 5,5'-bistetrazole diaminoguanidine salt, and 5,5'-bistetrazole piperazine salt and most preferable among them is 5,5'-bistetrazole diguanidine salt. When tetrazole compounds having a thermal decomposition temperature of 250° C. or higher are used, it is made possible to avoid their thermal decomposition when producing a styrene resin foam and to cause their thermal decomposition to efficiently generate non-flammable gases when the styrene resin foam is burned.

The content of the tetrazole compound to be used in the third invention is appropriately adjusted depending upon the type and content of a halogenated flame retardant to be used and, in the case of using a flame retardant other than the halogenated flame retardant in combination, the type and content of the flame retardant, and the type and amount of the blowing agent to be added. Generally, however, the content of the tetrazole compound is preferably 0.1 to 10 parts by weight, more preferably 0.15 to 6 parts by weight, and especially preferably 0.2 to 4 parts by weight, based on 100 parts by weight of the styrene resin. If the amount of the tetrazole compound is smaller than the foregoing ranges, it tends to be difficult to obtain the desired flame retardant property and on the other hand, if the amount is larger than the foregoing ranges, a styrene resin foam extruded from die tends to be easy to be ruptured, resulting in difficult formation of a satisfactory foam. Also, the flame retardant property is scarcely improved if the tetrazole compound is added more.

As the nitrogen-containing compound selected from cyanuric acid, isocyanuric acid, and their derivatives to be used in the third invention, compounds selected from cyanuric acid, isocyanuric acid, and their derivatives represented by the foregoing general formula 1 or general formula 2 are preferable. These compounds can be used alone or in combination of two or more species thereof.

As typical examples of the nitrogen-containing compounds, any of those exemplified in the first invention can be used.

As the nitrogen-containing compounds, compounds which are flame retardant themselves and can be decomposed or melted at 270° to 400° C. are preferable.

Further, as the nitrogen-containing compounds, preferable are compounds which do not inhibit the effect of forming both the aforesaid small cells and large cells in a foam in order to obtain high-level thermal insulating property and the like in the case of using water as other blowing agent, and examples of such compounds are those which are slightly soluble in water or have a solubility of 10% by weight or lower in water in a temperature range near room temperature (about 10° to about 30° C.). If the solubility in water is higher, the effect of forming both small cells and large cells tends to be inhibited.

Especially preferable ones among the nitrogen-containing compounds are cyanuric acid ($R^1$, $R^2$, and $R^3$ in the general formula 1 are hydrogen), isocyanuric acid ($R^4$, $R^5$, and $R^6$ in the general formula 2 are hydrogen), and bis(2-carboxyethyl) isocyanurate ($R^4$ is hydrogen atom, and $R^5$ and $R^6$ are a group wherein Y is ethylene group and X is carboxyl group in the general formula 2).

The content of the nitrogen-containing compound is appropriately adjusted depending upon the amount of a blowing agent to be added and the like, so as to obtain flame retardant property required for the extrusion method polystyrene foam thermal insulating board prescribed JIS A 9511 extruded polystyrene foam as prescribed in JIS A 9511 and the effect of suppressing ignition or combustion of hydrocarbons evaporated on burning of a foam. Generally, however, the content of the nitrogen-containing compound is preferably 0.1 to 10 parts by weight, more preferably 1 to 9 parts by weight, furthermore preferably 1.5 to 8 parts by weight, and especially preferably 2 to 7 parts by weight, based on 100 parts by weight of the styrene resin. If the content of the nitrogen-containing compound is lower than the foregoing ranges, it tends to be difficult to obtain the desired flame retardant property and on the other hand, if the content is more than the foregoing ranges, the formability in producing a foam and the like tend to be sometimes deteriorated.

As the metal borates to be used in the third invention, any of those exemplified in the first invention can be used.

Among the foregoing metal borates, zinc borate is preferable since they are easy to provide the highest flame retarding effect in combination with the aforesaid halogenated flame retardant.

The content of the metal borate is appropriately adjusted depending upon the type and content of a halogenated flame retardant to be used and, in the case of using a flame retardant other than the halogenated flame retardant in combination, the type and content of the flame retardant, and the type and amount of a blowing agent to be added, so as to obtain flame retardant property required for the extrusion method polystyrene foam thermal insulating board as prescribed in JIS A 9511 and the effect of suppressing ignition or combustion of hydrocarbons evaporated on burning of a foam. Generally, however, the content of the metal borate is preferably 0.1 to 10 parts by weight, more preferably 0.15 to 6 parts by weight, furthermore preferably 0.2 to 4 parts by weight, based on 100 parts by weight of the styrene resin. If the content of the metal borate is lower than the foregoing ranges, it tends to be difficult to obtain the desired flame retardant property and on the other hand, if the content is more than the foregoing ranges, the styrene resin foam extruded from die tends to be easy to be ruptured, resulting in difficult formation of a satisfactory foam.

As the boron oxides to be used in the third invention, for example, any of those exemplified in the first invention can be used, and diboron trioxide is especially preferred.

The content of the boron oxide is appropriately adjusted depending upon the type and content of a halogenated flame retardant to be used and, in the case of using a flame retardant other than the halogenated flame retardant in combination, the type and content of the flame retardant, and the type and amount of a blowing agent to be added, so as to obtain flame retardant property required for the extrusion method polystyrene foam thermal insulating board as prescribed in JIS A 9511 and the effect of suppressing ignition or combustion of hydrocarbons evaporated on burning of a foam. Generally, however, the content of the boron oxide is preferably 0.1 to 10 parts by weight, more preferably 1 to 9 parts by weight, furthermore preferably 1.5 to 8 parts by weight, based on 100 parts by weight of the styrene resin. If the content of the boron oxide is lower than the foregoing ranges, it tends to be difficult to obtain the desired flame retardant property and on the other hand, if the content is more than the foregoing ranges, the styrene resin foam extruded from die tends to become easy to be ruptured, resulting in difficult formation of a satisfactory form.

As the phosphoric acid ester compounds to be used in the third invention, for example, any of those exemplified in the first invention can be used.

The content of the phosphoric acid ester compounds is appropriately adjusted depending upon the amount of a blowing agent to be added and the like so as to obtain flame retardant property and the effect of suppressing ignition or combustion of hydrocarbons evaporated on burning of a foam. However, the content is preferably 0.1 to 10 parts by weight, more preferably 0.3 to 9 parts by weight, and furthermore preferably 0.5 to 8 parts by weight, based on 100 parts by weight of the styrene resin. If the content of the phosphoric acid ester compound is less than the foregoing ranges, it tends to be difficult to obtain the desired flame retardant property and on the other hand, if the content is more than the foregoing ranges, the formability in producing a foam is sometimes deteriorated.

According to the third invention, phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, which are used as the compound (B), can be used alone or in combination of two or more species thereof. The phosphorus acid ester compound is preferably used in combination with one or more compounds selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; and boron oxides, rather than being used alone.

The method of the third invention is preferable for stably producing a foam having the specified foam cell structure in order to achieve high-level thermal insulating property on the premise that a flame retardant-added composition for achieving high-level flame retardant property is used, as described in the first invention.

That is, the foam obtained in the third invention is preferably an extruded styrene resin foam which contains (A) halogenated flame retardant and (B) at least one compound selected from the group consisting of phosphorus type flame retardant containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and further which has a foam cell structure wherein the cell anisotropic ratio k is within a range satisfying: $k \leq 1.1$, preferably $k \leq 1.0$ and the average cell size a (mm) in the thickness direction is within a range satisfying: $0.05 \leq a \leq 0.30$, preferably $0.1 \leq a \leq 0.25$, more preferably $0.1 \leq a < 0.24$. By having such a foam cell structure, the foam can be provided with a thermal conductivity of 0.028 W/mK or lower, which is required for the extrusion method polystyrene foam thermal insulating board Class 3a or 3b prescribed JIS A 9511.

If the cell anisotropic ratio k exceeds 1.1, the thermal insulating property is decreased to make it difficult to obtain a thermal conductivity of 0.028 W/mK or lower. Incidentally, if the cell anisotropic ratio k is too small, mechanical properties such as compressive strength tend to decrease and therefore the cell anisotropic ratio k is preferably 0.7 or higher.

If the average cell size a (mm) in the thickness direction is less than 0.05 mm, the cell membranes become too thin, the effect of transmitting heat rays becomes significant and on the contrary the thermal insulating property is decreased to make it difficult to obtain a thermal conductivity of 0.028 W/mK or lower. On the other hand, if the average cell size a (mm) in the thickness direction exceeds 0.30 mm, the frequency of shielding heat current is decreased to make it difficult to obtain a thermal conductivity of 0.028 W/mK or lower.

As the method of obtaining the aforesaid foam cell structure, the same means as described in the descriptions of the first invention can be employed.

According to the third invention, if required, the extruded styrene resin form can be incorporated with the following additives to the extent within which the effects of the present invention are not inhibited: inorganic compounds such as silica, talc, calcium silicate, wollastonite, kaolin, clay, mica, zinc oxide, titanium oxide, calcium carbonate and the like; processing assisting agents such as sodium stearate, magnesium stearate, barium stearate, liquid paraffin, olefin type wax, stearylamide type compounds and the like; phenol type antioxidants, phosphorus type stabilizers, light resistant stabilizers such as benzotriazoles, hindered amines, other flame retardants, antistatic agents, coloring agents such as pigments.

In the method of producing an extruded styrene resin foam according to the third invention, the foam can be produced by supplying a styrene resin, a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2), metal borates; boron oxides; and phosphoric acid ester compounds, and if necessary, a smectite and other additives to a heating/melting means such as an extruder by a variety of methods such as: (1) mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with a styrene resin and then heating and melting the mixture, (2) heating and melting a styrene resin and then mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with the molten styrene resin, (3) previously preparing a molten composition by mixing a halogenated flame retardant (A), one or more of the compounds (B) selected from the group consisting of phosphorus type flame retardants containing nitrogen atom in a molecule; tetrazole compounds; nitrogen-containing compounds selected from cyanuric acid, isocyanuric acid, and derivatives thereof (preferably nitrogen-containing compounds having the foregoing general formula 1, and nitrogen-containing compounds having the foregoing general formula 2); metal borates; boron oxides; and phosphoric acid ester compounds, and if necessary, a smectite and other additives with a styrene resin and then heating and melting the mixture, and supplying the molten composition to an extruder for heating and melting again; and in any appropriate stage, adding a blowing agent under high pressure to the styrene resin and making the resin into a flowable gel, cooling the gel to a temperature suitable for extrusion foaming; and extruding the flowable gel to a low pressure region through a die to form a foam. In that case, the foaming conditions at the die portion are adjusted as described above.

As for the method of expansion forming, a general method wherein a foam obtained from a slit die by pressure release is shaped into a board-like foam having a large sectional area by using a forming mold, forming rolls and the like which are mounted in close contact with or in contact with the slit die, can be used.

The thickness of the foam of the present invention is not particularly limited. Especially, in the case of providing a foam having suitable thermal insulating property, bending strength and compressive strength, a thick foam like a usual board is preferable rather than a thin foam like a sheet and the thickness is usually 10 to 150 mm, preferably 20 to 100 mm. The density of the foam of the present invention is preferably 20 to 40 kg/m$^3$, more preferably 25 to 35 kg/m$^3$ in order to provide a lightweight insulating material having excellent thermal insulating property, bending strength and compressive strength.

BEST MODE FOR CARRYING OUT THE INVENTION

Next, extruded styrene resin foams and their production methods according to the present invention will be further explained in detail on the basis of Examples. However, the present invention is not at all limited to only such Examples. Incidentally, unless otherwise noted, the terms, "parts" means parts by weight and "%" means % by weight.

EXAMPLES A1 TO A15 AND COMPARATIVE EXAMPLES A1 TO A5

These Examples and Comparative Examples are Examples and Comparative Examples of the first invention.

As characteristic properties of the obtained foams, the foam density, the amount of remaining blowing agent, the foam combustibility, the foam thermal conductivity, the average cell sizes in respective directions (thickness direction, transverse direction and longitudinal direction), the cell anisotropic ratio, and the small cell-occupied area ratio were determined according to the following methods.

(1) Foam Density (kg/m³)

The foam density was calculated by the following equation and expressed in terms of unit "kg/m³".

Foam density (g/cm³)=Weight of foam (g)/Volume of foam (cm³)

(2) Amount (g) of Remaining Blowing Agent

A foam was analyzed using a gas chromatograph (GC-14A manufactured by Shimadzu Corporation) to determine the amount (g) of each remaining blowing agent based on 100 g of the foam. The measurement was conducted for foams allowed to stand for fourteen days after the production.

(3) Foam Combustibility

The combustibility of a foam was determined according to the combustion test (measuring method A) prescribed in JIS A 9511. The measurement was conducted for foams allowed to stand for fourteen days after the production. The foam combustibility was rated as ○ (passing) when the standard that the flame is extinguished within 3 seconds and neither remaining ember nor spreading flame beyond the indicating line of combustion limit exists was satisfied, and rated as X (failure) when the standard was not satisfied.

(4) Foam Thermal Conductivity (W/mK)

The thermal conductivity of a foam was measured according to JIS A 9511 (extrusion method polystyrene foam thermal insulating board). The measurement was conducted for foams allowed to stand for 30 days after the production.

The standard for the extrusion method polystyrene foam thermal insulating board Class 3a or 3b prescribed in JIS A 9511 is 0.028 W/mK or less.

(5) Average Cell size (mm) in Each Direction (Thickness Direction, Transverse Direction and Longitudinal Direction)

Appropriate parts were sampled from a section (hereinafter, referred to as a cross section) obtained by cutting a foam vertically (in the thickness direction) along the transverse direction, and a section (hereinafter, referred to as a longitudinal section) obtained by cutting the foam vertically (in the thickness direction) along the longitudinal direction. These parts were photographed at ×30 magnification by using a scanning electron microscope (manufactured by Hitachi Ltd., model S-450). From these photographs were determined the average cell size a (mm) in the thickness direction, the average cell size b (mm) in the transverse direction and the average cell size c (mm) in the longitudinal direction according to ASTM D-3576. The actual size of the part photographed was about 5 mm×about 5 mm. The average cell size a (mm) in the thickness direction was determined from both the cross section and the longitudinal section. Sampling may be done anywhere in a foam except for the edge of the foam which has an irregular cell structure. In this measurement, a foam (thickness: 20 to 100 mm; width: 910 to 1,000 mm) was sampled at three to five points vertically symmetrically relative to the center in its thickness at the distance, 100 mm inwardly from the edge of the foam in the transverse direction. The average cell size a (mm) in the thickness direction, the average cell size b (mm) in the transverse direction or the average cell size c (mm) in the longitudinal direction is the average of the respective values obtained at the parts sampled.

(6) Cell Anisotropic Ratio

Using the previously determined average cell size a (mm) in the thickness direction, average cell size b (mm) in the transverse direction and average cell size c (mm) in the longitudinal direction, the cell anisotropic ratio was determined by the formula:

$$k = a/(a \times b \times c)^{1/3}$$

(7) Small Cell-occupied Area Ratio (%)

The ratio of the area occupied by cells with a cell size of 0.25 mm or smaller per the area of a section of a foam was determined as follows. Here, the cell with a cell size of 0.25 mm or smaller means that the diameter of a circle having the same area as the sectional area of the cell is 0.25 mm or smaller.

Appropriate parts were sampled from a section (hereinafter, referred to as a longitudinal section) obtained by cutting the foam vertically (in the thickness direction) along the longitudinal direction. Sampling may be done anywhere in a foam except for the edge of the foam which has an irregular cell structure. In this measurement, a foam (thickness: 20 to 100 mm; width: 910 to 1,000 mm) was sampled at three to five points vertically symmetrically relative to the center in its thickness at the distance, 100 mm inwardly from the edge of the foam in the transverse direction. The small cell-occupied area ratio (%) is the average of the respective values obtained at the parts sampled.

a) The foregoing longitudinal section of a foam is photographed at ×30 magnification by using a scanning electron microscope (manufactured by Hitachi Ltd., model S-450).

b) On the photograph is placed an OHP sheet onto which are copied the parts corresponding to cells having a cell size in the thickness direction of more than 7.5 mm (which corresponds to cells having an actual cell size of more than 0.25 mm) by filling them with a black ink (a first treatment).

c) The image subjected to the first treatment is read by an image processing apparatus (manufactured by PIAS Co., Ltd., model: PIAS-II) and the deep color parts and the light color part, namely, whether a certain part is colored in black or not, are distinguished.

d) Among the deep color parts, parts corresponding to an area of a circle having a diameter of not more than 7.5 mm, namely, parts which have a long diameter in the thickness direction but have only an area not more than that of a circle having a diameter of 7.5 mm are changed to light color, whereby the deep color parts are corrected.

e) The area ratio of parts having a cell size of not more than 7.5 mm (light color parts) to the whole image is determined according to the following formula using "FRACTAREA (area ratio)" which is one of image analysis calculating functions.

Small cell-occupied area ratio (%) =

(1 − area of deep color parts/area of the whole image) × 100

Example A1

A polystyrene resin available under the trade name "Styron G9401" made by A&M Styrene Co., Ltd. was used. To 100 parts of the polystyrene resin were dry-blended 3.5 parts of hexabromocyclododecane (hereinafter abbreviated to HBCD) as a halogenated flame retardant, 3 parts of isocyanuric acid (made by Shikoku Corporation, trade name: ICA-P) as a nitrogen-containing compound, 1 part of triphenyl phosphate (made by Ajinomoto Co., Inc., TPP) as a phosphoric acid ester compound, 1 part of bentonite (made by Hojun Kogyo Co., Ltd., trade name: BENGEL 23), 0.1 part of dehydrated silica (made by Nippon Aerosil Co., Ltd., trade name: AEROSIL) as an inorganic powder having a large number of hydroxyl groups, 0.1 part of talc as a nucleating agent, and 0.25 part of barium stearate as a lubricating agent, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4 parts of isobutane, 1.3 parts of dimethyl ether, and 0.8 part of water based on 100 parts of the polystyrene resin (66% of isobutane, 21% of dimethyl ether, and 13% of water based on 100% of the blowing agents) were introduced under pressure into the polystyrene resin through different lines, respectively, at the tip portion of the first extruder.

The obtained foam had a foam density of 30 kg/m$^3$, an average cell size in the thickness direction of 0.18 mm, an average cell size in the transverse direction of 0.19 mm, an average cell size in the longitudinal direction of 0.19 mm, and a cell anisotropic ratio of 0.96. Further, the foam had a cell structure wherein large cells and small cells coexist, and a small cell-occupied area ratio of 45%. The thermal conductivity of the obtained foam was 0.027 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A2

A polystyrene resin available under the trade name "Styron G9401" made by A&M Styrene Co., Ltd. was used. To 100 parts of the polystyrene resin were dry-blended 3 parts of HBCD, 3 parts of isocyanuric acid, 1 part of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4 parts of isobutane, 1.3 parts of dimethyl ether, and 0.9 part of water based on 100 parts of the polystyrene resin (65% of isobutane, 21% of dimethyl ether, and 14% of water based on 100% of the blowing agents) were introduced under pressure into the polystyrene resin through different lines, respectively, at the tip portion of the first extruder.

The obtained foam had a foam density of 31 kg/m$^3$, an average cell size in the thickness direction of 0.24 mm, an average cell size in the transverse direction of 0.22 mm, an average cell size in the longitudinal direction of 0.21 mm, and a cell anisotropic ratio of 1.08. Further, the foam had a cell structure wherein large cells and small cells coexist, and a small cell-occupied area ratio of 35%. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A3

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 0.5 part of triphenyl phosphate, 1.5 parts of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 3.5 parts of isobutane, 2 parts of dimethyl ether, and 0.8 part of water based on 100 parts of the polystyrene resin (56% of isobutane, 32% of dimethyl ether, and 12% of water based on 100% of the blowing agents) were introduced under pressure into the polystyrene resin through different lines, respectively, at the tip portion of the first extruder.

The obtained foam had a foam density of 33 kg/m$^3$, an average cell size in the thickness direction of 0.19 mm, an average cell size in the transverse direction of 0.22 mm, an average cell size in the longitudinal direction of 0.26 mm, and a cell anisotropic ratio of 0.86. Further, the foam had a cell structure wherein large cells and small cells coexist, and a small cell-occupied area ratio of 30%. The thermal conductivity of the obtained foam was 0.027 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A4

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 1 part of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4 parts of isobutane, 1.6 parts of dimethyl ether, and 0.8 part of water based on 100 parts of the polystyrene resin (63% of isobutane, 25% of dimethyl ether, and 12% of water based on 100% of the blowing agents) were introduced under pressure into the polystyrene resin through different lines, respectively, at the tip portion of the first extruder.

The obtained foam had a foam density of 30 kg/m$^3$, an average cell size in the thickness direction of 0.19 mm, an average cell size in the transverse direction of 0.19 mm, an average cell size in the longitudinal direction of 0.20 mm, and a cell anisotropic ratio of 0.98. Further, the foam had a cell structure wherein large cells and small cells coexist, and a small cell-occupied area ratio of 40%. The thermal conductivity of the obtained foam was 0.027 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A5

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 1 part of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 5 parts of isobutane, 1.3 parts of dimethyl ether, and 0.9 part of water based on 100 parts of the polystyrene resin (69% of isobutane, 18% of dimethyl ether, and 13% of water based on 100% of the blowing agents) were introduced under pressure into the polystyrene resin through different lines, respectively, at the tip portion of the first extruder.

The obtained foam had a foam density of 33 kg/m$^3$, an average cell size in the thickness direction of 0.16 mm, an average cell size in the transverse direction of 0.17 mm, an average cell size in the longitudinal direction of 0.19 mm, and a cell anisotropic ratio of 0.93. Further, the foam had a cell structure wherein large cells and small cells coexist, and a small cell-occupied area ratio of 50%. The thermal conductivity of the obtained foam was 0.026 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A6

A polystyrene resin available under the trade name "Styron G9401" made by A&M Styrene Co., Ltd. was used. To 100 parts of the polystyrene resin were dry-blended 3 parts of HBCD, 3 parts of bis(2-carboxyethyl) isocyanurate as a nitrogen-containing compound, 1 part of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4 parts of isobutane, 2 parts of dimethyl ether, and 1 part of water based on 100 parts of the polystyrene resin (57% of isobutane, 29% of dimethyl ether, and 14% of water based on 100% of the blowing agents) were introduced under pressure into the polystyrene resin through different lines, respectively, at the tip portion of the first extruder.

The obtained foam had a foam density of 31 kg/m$^3$, an average cell size in the thickness direction of 0.21 mm, an average cell size in the transverse direction of 0.22 mm, an average cell size in the longitudinal direction of 0.24 mm, and a cell anisotropic ratio of 0.94. Further, the foam had a cell structure wherein large cells and small cells coexist, and a small cell-occupied area ratio of 35%. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A7

A polystyrene resin available under the trade name "Styron G9401" made by A&M Styrene Co., Ltd. was used. To 100 parts of the polystyrene resin were dry-blended 3.5 parts of HBCD, 2 parts of boron trioxide, 0.5 part of talc, and 0.25 part of barium stearate, and then the resultant resin mixture was supplied to a tandem type extruder. The resin mixture supplied to a first extruder was heated to about 220° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam had a foam density of 33 kg/m$^3$, an average cell size in the thickness direction of 0.25 mm, an average cell size in the transverse direction of 0.33 mm, an average cell size in the longitudinal direction of 0.34 mm, and a cell anisotropic ratio of 0.82. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A8

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 5 parts of isobutane, and 2.3 parts of dimethyl ether based on 100 parts of the polystyrene resin (68% of isobutane, and 32% of dimethyl ether based on 100% of the blowing agents) were introduced under pressure into the polystyrene resin through different lines, respectively, at the tip portion of the first extruder.

The obtained foam had a foam density of 36 kg/m$^3$, an average cell size in the thickness direction of 0.25 mm, an average cell size in the transverse direction of 0.35 mm, an average cell size in the longitudinal direction of 0.33 mm, and a cell anisotropic ratio of 0.81. The thermal conductivity of the obtained foam was 0.027 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A9

A polystyrene resin available under the trade name "Styron G9401" made by A&M Styrene Co., Ltd. was used. To 100 parts of the polystyrene resin were dry-blended 3 parts of HBCD, 2 parts of boron trioxide, 1.5 parts of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4.5 parts of isobutane, and 3 parts of methyl chloride based on 100 parts of the polystyrene resin (60% of isobutane, and 40% of methyl chloride based on 100% of the blowing agents) were introduced under pressure into the polystyrene resin through different lines, respectively, at the tip portion of the first extruder.

The obtained foam had a foam density of 35 kg/m$^3$, an average cell size in the thickness direction of 0.24 mm, an average cell size in the transverse direction of 0.34 mm, an average cell size in the longitudinal direction of 0.35 mm, and a cell anisotropic ratio of 0.79. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A10

A polystyrene resin available under the trade name "Styron G9401" made by A&M Styrene Co., Ltd. was used. To 100 parts of the polystyrene resin were dry-blended 3.5 parts of HBCD, 2.5 parts of boron trioxide, 1.5 parts of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 5 parts of isobutane, and 3.5 parts of methyl chloride based on 100 parts of the polystyrene resin (58% of isobutane, and 42% of methyl chloride based on 100% of the blowing agents) were introduced under pressure into the polystyrene resin through different lines, respectively, at the tip portion of the first extruder.

The obtained foam had a foam density of 36 kg/m$^3$, an average cell size in the thickness direction of 0.28 mm, an average cell size in the transverse direction of 0.35 mm, an average cell size in the longitudinal direction of 0.36 mm, and a cell anisotropic ratio of 0.85. The thermal conductivity of the obtained foam was 0.027 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A11

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 1 part of triphenyl phosphate, 1.5 parts of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4.5 parts of isobutane, and 2.5 parts of methyl chloride based on 100 parts of the polystyrene resin (64% of isobutane, and 36% of methyl chloride based on 100% of the blowing agents) were introduced under pressure into the polystyrene resin through different lines, respectively, at the tip portion of the first extruder.

The obtained foam had a foam density of 35 kg/m$^3$, an average cell size in the thickness direction of 0.23 mm, an average cell size in the transverse direction of 0.32 mm, an average cell size in the longitudinal direction of 0.33 mm, and a cell anisotropic ratio of 0.79. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A12

A polystyrene resin available under the trade name "Styron G9401" made by A&M Styrene Co., Ltd. was used. To 100 parts of the polystyrene resin were dry-blended 3.5 parts of HBCD, 3 parts of ammonium polyphosphate as a phosphorus type flame retardant containing nitrogen atom in a molecule, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 5 parts of isobutane, and 3 parts of dimethyl ether based on 100 parts of the polystyrene resin (63% of isobutane, and 37% of dimethyl ether based on 100% of the blowing agents) were introduced under pressure into the polystyrene resin through different lines, respectively, at the tip portion of the first extruder.

The obtained foam had a foam density of 34 kg/m$^3$, an average cell size in the thickness direction of 0.25 mm, an average cell size in the transverse direction of 0.28 mm, an average cell size in the longitudinal direction of 0.29 mm, and a cell anisotropic ratio of 0.92. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A13

A polystyrene resin available under the trade name "Styron G9401" made by A&M Styrene Co., Ltd. was used. To 100 parts of the polystyrene resin were dry-blended 3 parts of HBCD, 4 parts of 5,5'-bistetrazole diguanidine salt (made by Toyo Kasei Co., Ltd., BHT-2GAD) (in Table 1, abbreviated to tetrazole) as a tetrazole compound, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4 parts of isobutane, and 4 parts of dimethyl ether based on 100 parts of the polystyrene resin (50% of isobutane, and 50% of dimethyl ether based on 100% of the blowing agents) were introduced under pressure into the polystyrene resin through different lines, respectively, at the tip portion of the first extruder.

The obtained foam had a foam density of 34 kg/m$^3$, an average cell size in the thickness direction of 0.24 mm, an average cell size in the transverse direction of 0.34 mm, an average cell size in the longitudinal direction of 0.33 mm, and a cell anisotropic ratio of 0.80. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Example A14

A polystyrene resin available under the trade name "Styron G9401" made by A&M Styrene Co., Ltd. was used. To 100 parts of the polystyrene resin were dry-blended 3 parts of HBCD, 2 parts of zinc borate as a metal borate, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4 parts of isobutane, and 4 parts of dimethyl ether based on 100 parts of the polystyrene resin (50% of isobutane, and 50% of dimethyl ether based on 100% of the blowing agents) were introduced under pressure into the polystyrene resin through different lines, respectively, at the tip portion of the first extruder.

The obtained foam had a foam density of 34 kg/m$^3$, an average cell size in the thickness direction of 0.26 mm, an average cell size in the transverse direction of 0.34 mm, an average cell size in the longitudinal direction of 0.32 mm, and a cell anisotropic ratio of 0.85. The thermal conductivity of the obtained foam was 0.028 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.3

Example A15

A polystyrene resin available under the trade name "Styron G9401" made by A&M Styrene Co., Ltd. was used. To 100 parts of the polystyrene resin were dry-blended 4 parts of HBCD, 2 parts of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4 parts of isobutane, 1.6 parts of dimethyl ether, and 0.8 part of water based on 100 parts of the polystyrene resin (63% of isobutane, 25% of dimethyl ether, and 12% of water based on 100% of the blowing agents) were introduced under pressure into the polystyrene resin through different lines, respectively, at the tip portion of the first extruder.

The obtained foam had a foam density of 31 kg/m$^3$, an average cell size in the thickness direction of 0.19 mm, an average cell size in the transverse direction of 0.20 mm, an average cell size in the longitudinal direction of 0.19 mm, and a cell anisotropic ratio of 0.98. Further, the foam had a cell structure wherein large cells and small cells coexist, and a small cell-occupied area ratio of 40%. The thermal conductivity of the obtained foam was 0.027 W/mK, and the combustibility thereof satisfied the standard prescribed in JIS A 9511. That is, the extruded styrene resin foam had both of thermal insulating property and flame retardant property meeting the standards for the extrusion method polystyrene foam thermal insulating board Class 3a or 3b prescribed in JIS A 9511.

Comparative Example A1

A polystyrene resin available under the trade name "Styron G9401" made by A&M Styrene Co., Ltd. was used. To 100 parts of the polystyrene resin were dry-blended 3.5 parts of HBCD, 2 parts of boron trioxide, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam had a foam density of 33 kg/m$^3$, an average cell size in the thickness direction of 0.35 mm, an average cell size in the transverse direction of 0.37 mm, an average cell size in the longitudinal direction of 0.46 mm, and a cell anisotropic ratio of 0.90. Although the obtained foam satisfied the standard for the combustibility prescribed in JIS A 9511, the thermal conductivity was 0.029 W/mK and did not meet the standard for the extrusion method polystyrene foam thermal insulating board Class 3a or 3b prescribed in JIS A 9511.

Comparative Example A2

A polystyrene resin available under the trade name "Styron G9401" made by A&M Styrene Co., Ltd. was used. To 100 parts of the polystyrene resin were dry-blended 3.5 parts of HBCD, 2 parts of boron trioxide, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam had a foam density of 34 kg/m$^3$, an average cell size in the thickness direction of 0.25 mm, an average cell size in the transverse direction of 0.19 mm, an average cell size in the longitudinal direction of 0.18 mm, and a cell anisotropic ratio of 1.22. Although the obtained foam satisfied the standard for the combustibility prescribed in JIS A 9511, the thermal conductivity was 0.031 W/mK and did not meet the standard for the extrusion method polystyrene foam thermal insulating board Class 3a or 3b prescribed in JIS A 9511.

Comparative Example A3

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 1 part of triphenyl phosphate, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 50 mm thickness and about 1,000 mm width.

In this case, as blowing agents, 4,5 parts of isobutane, and 2.5 parts of methyl chloride based on 100 parts of the polystyrene resin (64% of isobutane, and 36% of methyl chloride based on 100% of the blowing agents) were introduced under pressure into the polystyrene resin through different lines, respectively, at the tip portion of the first extruder.

The obtained foam had a foam density of 35 kg/m$^3$, an average cell size in the thickness direction of 0.41 mm, an average cell size in the transverse direction of 0.45 mm, an average cell size in the longitudinal direction of 0.47 mm, and a cell anisotropic ratio of 0.93. Although the obtained foam satisfied the standard for the combustibility prescribed in JIS A 9511, the thermal conductivity was 0.030 W/mK and did not meet the standard for the extrusion method polystyrene foam thermal insulating board Class 3a or 3b prescribed in JIS A 9511.

Comparative Example A4

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 1 part of triphenyl phosphate, 1.5 parts of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 60 mm thickness and about 1,000 mm width.

In this case, as blowing agents, 4,5 parts of isobutane, and 2.5 parts of methyl chloride based on 100 parts of the polystyrene resin (64% of isobutane, and 36% of methyl chloride based on 100% of the blowing agents) were introduced under pressure into the polystyrene resin through different lines, respectively, at the tip portion of the first extruder.

The obtained foam had a foam density of 36 kg/m$^3$, an average cell size in the thickness direction of 0.24 mm, an average cell size in the transverse direction of 0.17 mm, an average cell size in the longitudinal direction of 0.18 mm, and a cell anisotropic ratio of 1.23. Although the obtained foam satisfied the standard for the combustibility prescribed in JIS A 9511, the thermal conductivity was 0.031 W/mK and did not meet the standard for the extrusion method polystyrene foam thermal insulating board Class 3a or 3b prescribed in JIS A 9511.

Comparative Example A5

A polystyrene resin available under the trade name "Styron G9401" made by A&M Styrene Co., Ltd. was used. To 100 parts of the polystyrene resin were dry-blended 3.5 parts of HBCD, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam had a foam density of 34 kg/m$^3$, an average cell size in the thickness direction of 0.23 mm, an average cell size in the transverse direction of 0.31 mm, an average cell size in the longitudinal direction of 0.33 mm, and a cell anisotropic ratio of 0.80. Although the thermal conductivity of the obtained foam was 0.028 W/mK and met the standard for the extrusion method polystyrene foam thermal insulating board Class 3a or 3b prescribed in JIS A 9511, the foam did not satisfy the standard for the combustibility prescribed in JIS A 9511.

The results obtained in above-mentioned Examples A1 to A15 and Comparative Examples A1 to A5 are summarized in Table 1.

TABLE 1

| | | Ex. | | | | | | | | | | | | | | | Com. Ex. | | | | |
|---|---|---|---|---|---|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 | A15 | A1 | A2 | A3 | A4 | A5 |
| Polystyrene | part | 100 | 100 | 100 | 100 | 100 | 100 | 100 | 100 | 100 | 100 | 100 | 100 | 100 | 100 | 100 | 100 | 100 | 100 | 100 | 100 |
| Halogenated flame retardant HBCD | part | 3.5 | 3 | 3.5 | 3.5 | 3.5 | 3 | 3.5 | 3.5 | 3 | 3.5 | 3.5 | 3.5 | 3 | 3 | 4 | 3.5 | 3.5 | 3.5 | 3.5 | 3.5 |
| Nitrogen-containing compound | | | | | | | | | | | | | | | | | | | | | |
| Isocyanuric acid | part | 3 | 3 | 3 | 3 | 3 | 3 | | 3 | | | 3 | | | | | | | 3 | 3 | |
| Bis(2-carboxyethyl)isocyanurate | part | | | | | | | | | | | | | | | | | | | | |
| Boron oxide | part | | | | | | | 2 | | 2 | 2.5 | | | | | | 2 | 2 | | | |
| Diboron trioxide | part | | | | | | | | | | | | 3 | | | | | | | | |
| Phosphorus type | part | | | | | | | | | | | | | | | | | | | | |
| Ammonium polyphosphate | part | | | | | | | | | | | | | 4 | | | | | | | |
| Tetrazole compound | part | | | | | | | | | | | | | | | | | | | | |
| Metal borate Tetrazole | part | | | | | | | | | | | | | | 2 | | | | | | |
| Zinc borate | part | | | | | | | | | | | | | | | | | | | | |
| Phosphoric acid ester compound | part | 1 | 1 | 0.5 | 1 | 1 | 1 | | | | | 1 | | | | 2 | | | 1 | 1 | |
| Triphenyl phosphate | part | | | | | | | | | | | | | | | | | | | | |
| Blowing agent | | | | | | | | | | | | | | | | | | | | | |
| Isobutane | part | 4 | 4 | 3.5 | 4 | 5 | 4 | 4 | 5 | 4.5 | 5 | 4.5 | 5 | 4 | 4 | 4 | 4 | 4 | 4.5 | 4.5 | 4 |
| Methyl chloride | part | | | | | | 2 | 2 | 2.3 | 3 | 3.5 | 2.5 | 3 | 4 | 4 | | 2 | 2 | 2.5 | 2.5 | 2 |
| Dimethyl ether | part | 1.3 | 1.3 | 2 | 1.6 | 1.3 | 1 | | | | | | | | | 1.6 | | | | | |
| Water | part | 0.8 | 0.9 | 0.8 | 0.8 | 0.9 | | | | | | | | | | 0.8 | | | | | |
| Other additive | | | | | | | | | | | | | | | | | | | | | |
| Bentonite | part | 1 | 1 | 1.5 | 1 | 1 | 1 | | | | | | | | | 1 | | | | | |
| Silica | part | 0.1 | 0.1 | 0.1 | 0.1 | 0.1 | 0.1 | | | | | | | | | 0.1 | | | | | |
| Foam density | kg/m³ | 30 | 31 | 33 | 30 | 33 | 31 | 33 | 36 | 35 | 36 | 35 | 34 | 34 | 34 | 31 | 33 | 34 | 35 | 36 | 34 |

TABLE 1-continued

| | | Ex. | | | | | | | | | | | | | | | Com. Ex. | | | | |
|---|---|---|---|---|---|---|---|---|---|---|---|---|---|---|---|---|---|---|---|---|---|
| | | A1 | A2 | A3 | A4 | A5 | A6 | A7 | A8 | A9 | A10 | A11 | A12 | A13 | A14 | A15 | A1 | A2 | A3 | A4 | A5 |
| Amount of remaining blowing agent | | | | | | | | | | | | | | | | | | | | | |
| Isobutane | g | 3.9 | 3.9 | 3.3 | 3.9 | 4.8 | 3.9 | 3.8 | 4.8 | 4.4 | 4.8 | 4.4 | 4.8 | 3.6 | 3.7 | 3.9 | | | | | |
| Methyl chloride | g | 0.1 | 0 | 0.1 | 0.1 | 0 | 0.1 | 0.1 | 0.2 | 0 | 0 | 0 | 0.3 | 0.3 | 0.3 | 0.1 | | | | | |
| Dimethyl ether | g | | 0.24 | | | | | | | | | | | | | | | | | | |
| Average cell size a in thickness direction | mm | 0.18 | | 0.19 | 0.19 | 0.16 | 0.21 | 0.25 | 0.25 | 0.24 | 0.28 | 0.23 | 0.25 | 0.24 | 0.26 | 0.19 | 0.35 | 0.25 | 0.41 | 0.24 | 0.23 |
| Average cell size b in transverse direction | mm | 0.19 | 0.22 | 0.22 | 0.19 | 0.17 | 0.22 | 0.33 | 0.35 | 0.34 | 0.35 | 0.32 | 0.28 | 0.34 | 0.34 | 0.20 | 0.37 | 0.19 | 0.45 | 0.17 | 0.31 |
| Average cell size c in longitudinal direction | mm | 0.19 | 0.21 | 0.26 | 0.20 | 0.19 | 0.24 | 0.34 | 0.33 | 0.35 | 0.36 | 0.33 | 0.29 | 0.33 | 0.32 | 0.19 | 0.46 | 0.18 | 0.47 | 0.18 | 0.33 |
| Cell anisotropic ratio k | | 0.96 | 1.08 | 0.86 | 0.98 | 0.93 | 0.94 | 0.82 | 0.81 | 0.79 | 0.85 | 0.79 | 0.92 | 0.80 | 0.85 | 0.98 | 0.90 | 1.22 | 0.93 | 1.23 | 0.80 |
| Small cell-occupied area ratio | % | 45 | 35 | 30 | 40 | 50 | 35 | | | | | | | | | 40 | | | | | |
| Foam thermal | W/mK | 0.027 | 0.028 | 0.027 | 0.027 | 0.026 | 0.028 | 0.028 | 0.027 | 0.028 | 0.027 | 0.028 | 0.028 | 0.028 | 0.028 | 0.027 | 0.029 | 0.031 | 0.030 | 0.031 | 0.028 |
| Foam combusibility | | ○ | ○ | ○ | ○ | ○ | ○ | ○ | ○ | ○ | ○ | ○ | ○ | ○ | ○ | ○ | ○ | ○ | ○ | ○ | X |

EXAMPLES B1 TO B10 AND COMPARATIVE EXAMPLES B1 TO B3

These Examples and Comparative Examples are Examples and Comparative Examples of the second invention.

As characteristic properties of the obtained foams, the foam entire density, the density of upper layer 20% portion of the foam, the density of lower layer 20% portion of the foam, the bending strength of the foam, the skin condition of the foam were determined according to the following methods. The measurement of each characteristic property was conducted for the foam immediately after the production thereof unless otherwise noted. Further, the amount of remaining blowing agent, the foam combustibility, the foam thermal conductivity, the average cell sizes in respective directions (thickness direction, transverse direction and longitudinal direction), the cell anisotropic ratio, and the small cell-occupied area ratio were determined in the same manners as in Examples A1 to A14.

(1) Foam Entire Density (kg/m$^3$)

The foam entire density was calculated by the following equation and expressed in terms of unit "kg/m$^3$".

Foam entire density (g/cm$^3$)=Weight of foam (g)/Volume of foam (cm$^3$)

In this measurement, samples each having a size of foam thickness×300 mm width×300 mm length were taken from a foam (thickness: 20 to 100 mm; width: 910 to 1,000 mm) at both end portions in the transverse direction, and at the center portion in the transverse direction, and the density of each sample was calculated by the foregoing equation. The average of the respective density values at three portions was taken as the foam entire density.

(2) Density of Upper Layer 20% Portion of a Foam (kg/m$^3$)

The density of upper layer 20% portion of a foam was calculated by the following equation and expressed in terms of unit "kg/m$^3$".

Density of upper layer 20% portion of the foam (g/cm$^3$) =

Weight of upper layer 20% portion of the foam (g)/Volume of upper layer 20% portion of the foam (cm$^3$)

In this measurement, a sample of the upper layer 20% portion of the foam was cut off from each of three samples obtained for determining the foam entire density in (1) above and the density of each sample was calculated by the foregoing equation. The average of the respective density values at three portions was taken as the density of upper layer 20% portion of the foam.

(3) Density of Lower Layer 20% Portion of a Foam (kg/m$^3$)

The density of lower layer 20% portion of a foam was calculated by the following equation and expressed in terms of unit "kg/m$^3$".

Density of upper layer 20% portion of the foam (g/cm$^3$) =

Weight of lower layer 20% portion of the foam (g)/Volume of lower layer 20% portion of the foam (cm$^3$)

In this measurement, a sample of the lower layer 20% portion of the foam was cut off from each of three samples obtained for determining the foam entire density in (1) above and the density of each sample was calculated by the foregoing equation. The average of the respective density values at three portions was taken as the density of lower layer 20% portion of the foam.

(4) Bending Strength of a Foam (N/cm$^2$)

The bending strength of a foam was measured according to JIS A 9511 (extrusion method polystyrene foam thermal insulating board). The measurement was conducted for foams allowed to stand for 14 days after the production.

(5) Skin Condition

The surface of a foam was observed by the naked eye, and the skin condition was evaluated on the basis of the following criteria:

○: There are no cracks, fissures or pits on the foam surface and a smooth skin having a satisfactory surface condition is formed.

X: There are cracks, fissures or pits on the foam surface and the surface condition of the foam is coarse.

Example B1

A polystyrene resin available under the trade name "Styron G9401" made by A&M Styrene Co., Ltd. was used. To 100 parts of the polystyrene resin were dry-blended 3.5 parts of hexabromocyclododecane (hereinafter abbreviated to HBCD) as a halogenated flame retardant, 3 parts of isocyanuric acid (made by Shikoku Corporation, trade name: ICA-P) as a nitrogen-containing compound, 1 part of triphenyl phosphate (made by Ajinomoto Co., Inc., TPP) as a phosphoric acid ester compound, 1 part of bentonite (made by Hojun Kogyo Co., Ltd., trade name: BENGEL 23), 0.1 part of dehydrated silica (made by Nippon Aerosil Co., Ltd., trade name: AEROSIL) as an inorganic powder having a large number of hydroxyl groups, 0.1 part of talc as a nucleating agent, and 0.25 part of barium stearate as a lubricating agent, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 50 mm thickness and about 1,000 mm width. The temperature of the forming mold at the time of forming was set at about 80° C. which was considerably lower than the resin temperature at the time of foaming.

In this case, as blowing agents, 4 parts of isobutane, 1.6 parts of dimethyl ether, and 0.9 part of water based on 100 parts of the polystyrene resin (62% of isobutane, 25% of dimethyl ether, and 13% of water based on 100% of the blowing agents) were introduced under pressure into the polystyrene resin through different lines, respectively, at the tip portion of the first extruder.

The obtained foam was a foam having satisfactory skin condition and a foam entire density of 37.4 kg/m$^3$, a density of upper layer 20% portion of 41.3 kg/m$^3$, and a density of lower layer 20% portion of 40.9 kg/m$^3$. Further, the foam had an average cell size in the thickness direction of 0.22 mm, an average cell size in the transverse direction of 0.22 mm, an average cell size in the longitudinal direction of 0.21 mm, and a cell anisotropic ratio of 1.02. The foam had a cell structure wherein large cells and small cells coexist, and a small cell-occupied area ratio of 35%. The thermal conductivity of the obtained foam was 0.026 W/mK, and the bending strength thereof was 69 N/cm$^2$, and the combustibility thereof satisfied the standard prescribed in JIS A 9511.

That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B2

Each of the upper and lower surfaces of the skin-bearing foam obtained in Example B1 was shaved off thin to be finished to a shaven face showing good adhesion against concrete or the like, giving an extruded foam board having a cross-section with about 40 mm thickness and about 1,000 mm width.

The obtained foam was a foam having a foam entire density of 34.5 kg/m$^3$, a density of upper layer 20% portion of 36.3 kg/m$^3$, and a density of lower layer 20% portion of 36.2 kg/m$^3$. Further, the foam had an average cell size in the thickness direction of 0.22 mm, an average cell size in the transverse direction of 0.22 mm, an average cell size in the longitudinal direction of 0.21 mm, and a cell anisotropic ratio of 1.02. The foam had a cell structure wherein large cells and small cells coexist, and a small cell-occupied area ratio of 35%. The thermal conductivity of the obtained foam was 0.027 W/mK, and the bending strength thereof was 64 N/cm$^2$, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B3

A polystyrene resin available under the trade name "Styron G9401" made by A&M Styrene Co., Ltd. was used. To 100 parts of the polystyrene resin were dry-blended 3.5 parts of HBCD, 3 parts of isocyanuric acid, 1 part of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 50 mm thickness and about 1,000 mm width. The temperature of the forming mold at the time of forming was set at about 80° C. which was considerably lower than the resin temperature at the time of foaming.

In this case, as blowing agents, 4 parts of isobutane, 1.3 parts of dimethyl ether, and 0.8 part of water based on 100 parts of the polystyrene resin (66% of isobutane, 21% of dimethyl ether, and 13% of water based on 100% of the blowing agents) were introduced under pressure into the polystyrene resin through different lines, respectively, at the tip portion of the first extruder.

The obtained foam was a foam having satisfactory skin condition and a foam entire density of 35.3 kg/m$^3$, a density of upper layer 20% portion of 39.9 kg/m$^3$, and a density of lower layer 20% portion of 39.6 kg/m$^3$. Further, the foam had an average cell size in the thickness direction of 0.17 mm, an average cell size in the transverse direction of 0.19 mm, an average cell size in the longitudinal direction of 0.19 mm, and a cell anisotropic ratio of 0.93. The foam had a cell structure wherein large cells and small cells coexist, and a small cell-occupied area ratio of 45%. The thermal conductivity of the obtained foam was 0.026 W/mK, and the bending strength thereof was 66 N/cm$^2$, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B4

Each of the upper and lower surfaces of the skin-bearing foam obtained in Example B3 was shaved off thin to be finished to a shaven face showing good adhesion against concrete or the like, giving an extruded foam board having a cross-section with about 40 mm thickness and about 1,000 mm width.

The obtained foam was a foam having satisfactory skin condition and a foam entire density of 32.1 kg/m$^3$, a density of upper layer 20% portion of 34.5 kg/m$^3$, and a density of lower layer 20% portion of 34.3 kg/m$^3$. Further, the foam had an average cell size in the thickness direction of 0.17 mm, an average cell size in the transverse direction of 0.19 mm, an average cell size in the longitudinal direction of 0.19 mm, and a cell anisotropic ratio of 0.93. The foam had a cell structure wherein large cells and small cells coexist, and a small cell-occupied area ratio of 45%. The thermal conductivity of the obtained foam was 0.027 W/mK, and the bending strength thereof was 63 N/cm$^2$, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B5

A polystyrene resin available under the trade name "Styron G9401" made by A&M Styrene Co., Ltd. was used. To 100 parts of the polystyrene resin were dry-blended 3 parts of HBCD, 3 parts of bis(2-carboxyethyl) isocyanurate, 1 part of triphenyl phosphate, 1 part of bentonite, 0.1 part of dehydrated silica, 0.1 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width. The temperature of the forming mold at the time of forming was set at about 80° C. which was considerably lower than the resin temperature at the time of foaming.

In this case, as blowing agents, 4 parts of isobutane, 2 parts of dimethyl ether, and 1 part of water based on 100 parts of the polystyrene resin 57% of isobutane, 29% of dimethyl ether, and 14% of water based on 100% of the blowing agents) were introduced under pressure into the polystyrene resin through different lines, respectively, at the tip portion of the first extruder.

The obtained foam was a foam having satisfactory skin condition and a foam entire density of 36.4 kg/m$^3$, a density of upper layer 20% portion of 40.2 kg/m$^3$, and a density of lower layer 20% portion of 40.8 kg/m$^3$. Further, the foam had an average cell size in the thickness direction of 0.20 mm, an average cell size in the transverse direction of 0.21 mm, an average cell size in the longitudinal direction of 0.23 mm, and a cell anisotropic ratio of 0.94. The foam had a cell structure wherein large cells and small cells coexist, and a small cell-occupied area ratio of 35%. The thermal conductivity of the obtained foam was 0.027 W/mK, and the bending strength thereof was 70 N/cm$^2$, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B6

A polystyrene resin available under the trade name "Styron G9401" made by A&M Styrene Co., Ltd. was used. To 100 parts of the polystyrene resin were dry-blended 3.5 parts of HBCD, 2 parts of boron trioxide, 0.5 part of talc, and 0.25 part of barium stearate, and then the resultant resin mixture was supplied to a tandem type extruder. The resin mixture supplied to a first extruder was heated to 220° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 30 mm thickness and about 1,000 mm width. The temperature of the forming mold at the time of forming was set at about 80° C. which was considerably lower than the resin temperature at the time of foaming.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam was a foam having satisfactory skin condition and a foam entire density of 35.9 kg/m$^3$, a density of upper layer 20% portion of 43.5 kg/m$^3$, and a density of lower layer 20% portion of 43.6 kg/m$^3$. Further, the foam had an average cell size in the thickness direction of 0.24 mm, an average cell size in the transverse direction of 0.32 mm, an average cell size in the longitudinal direction of 0.34 mm, and a cell anisotropic ratio of 0.81. The thermal conductivity of the obtained foam was 0.026 W/mK, and the bending strength thereof was 74 N/cm$^2$, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B7

A polystyrene resin available under the trade name "Styron G9401" made by A&M Styrene Co., Ltd. was used. To 100 parts of the polystyrene resin were dry-blended 3.5 parts of HBCD, 3 parts of ammonium polyphosphate as a phosphorus type flame retardant containing nitrogen atom in a molecule, 0.5 part of talc, and 0.25 part of barium stearate, and then the resultant resin mixture was supplied to a tandem type extruder. The resin mixture supplied to a first extruder was heated to 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 40 mm thickness and about 1,000 mm width. The temperature of the forming mold at the time of forming was set at about 80° C. which was considerably lower than the resin temperature at the time of foaming.

In this case, as blowing agents, 5 parts of isobutane, and 3 parts of dimethyl ether based on 100 parts of the polystyrene resin (63% of isobutane, and 37% of dimethyl ether based on 100% of the blowing agents) were introduced under pressure into the polystyrene resin through different lines, respectively, at the tip portion of the first extruder.

The obtained foam was a foam having satisfactory skin condition and a foam entire density of 34.2 kg/m$^3$, a density of upper layer 20% portion of 38.2 kg/m$^3$, and a density of lower layer 20% portion of 38.1 kg/m$^3$. Further, the foam had an average cell size in the thickness direction of 0.23 mm, an average cell size in the transverse direction of 0.24 mm, an average cell size in the longitudinal direction of 0.26 mm, and a cell anisotropic ratio of 0.95. The thermal conductivity of the obtained foam was 0.027 W/mK, and the bending strength thereof was 68 N/cm$^2$, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B8

A polystyrene resin available under the trade name "Styron G9401" made by A&M Styrene Co., Ltd. was used. To 100 parts of the polystyrene resin were dry-blended 3 parts of HBCD, 4 parts of 5,5'-bistetrazole diguanidine salt (made by Toyo Kasei Co., Ltd., BHT-2GAD) (in Table 2, abbreviated to tetrazole) as a tetrazole compound, 0.5 part of talc, and 0.25 part of barium stearate, and then the resultant resin mixture was supplied to a tandem type extruder. The resin mixture supplied to a first extruder was heated to 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 50 mm thickness and about 1,000 mm width. The temperature of the forming mold at the time of forming was set at about 80° C. which was considerably lower than the resin temperature at the time of foaming.

In this case, as blowing agents, 4 parts of isobutane, and 4 parts of dimethyl ether based on 100 parts of the polystyrene resin (50% of isobutane, and 50% of dimethyl ether based on 100% of the blowing agents) were introduced under pressure into the polystyrene resin through different lines, respectively, at the tip portion of the first extruder.

The obtained foam was a foam having satisfactory skin condition and a foam entire density of 36.5 kg/m³, a density of upper layer 20% portion of 39.7 kg/m³, and a density of lower layer 20% portion of 39.5 kg/m³. Further, the foam had an average cell size in the thickness direction of 0.25 mm, an average cell size in the transverse direction of 0.24 mm, an average cell size in the longitudinal direction of 0.23 mm, and a cell anisotropic ratio of 1.04. The thermal conductivity of the obtained foam was 0.028 W/mK, and the bending strength thereof was 65 N/cm, and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B9

A polystyrene resin available under the trade name "Styron G9401" made by A&M Styrene Co., Ltd. was used. To 100 parts of the polystyrene resin were dry-blended 3 parts of HBCD, 2 parts of zinc borate as a metal borate, 0.5 part of talc, and 0.25 part of barium stearate, and then the resultant resin mixture was supplied to a tandem type extruder. The resin mixture supplied to a first extruder was heated to 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 30 mm thickness and about 1,000 mm width. The temperature of the forming mold at the time of forming was set at about 80° C. which was considerably lower than the resin temperature at the time of foaming.

In this case, as blowing agents, 4 parts of isobutane, and 4 parts of dimethyl ether based on 100 parts of the polystyrene resin (50% of isobutane, and 50% of dimethyl ether based on 100% of the blowing agents) were introduced under pressure into the polystyrene resin through different lines, respectively, at the tip portion of the first extruder.

The obtained foam was a foam having satisfactory skin condition and a foam entire density of 33.4 kg/m³, a density of upper layer 20% portion of 38.1 kg/m³, and a density of lower layer 20% portion of 38.3 kg/m³. Further, the foam had an average cell size in the thickness direction of 0.27 mm, an average cell size in the transverse direction of 0.34 mm, an average cell size in the longitudinal direction of 0.32 mm, and a cell anisotropic ratio of 0.88. The thermal conductivity of the obtained foam was 0.028 W/mK, and the bending strength thereof was 67 N/cm², and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Example B10

A polystyrene resin available under the trade name "Styron G9401" made by A&M Styrene Co., Ltd. was used. To 100 parts of the polystyrene resin were dry-blended 3.5 parts of HBCD, 3 parts of triphenyl phosphate, 0.5 part of talc, and 0.25 part of barium stearate, and then the resultant resin mixture was supplied to a tandem type extruder. The resin mixture supplied to a first extruder was heated to 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 30 mm thickness and about 1,000 mm width. The temperature of the forming mold at the time of forming was set at about 80° C. which was considerably lower than the resin temperature at the time of foaming.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam was a foam having satisfactory skin condition and a foam entire density of 37.6 kg/m³, a density of upper layer 20% portion of 42.1 kg/m³, and a density of lower layer 20% portion of 42.3 kg/m³. Further, the foam had an average cell size in the thickness direction of 0.29 mm, an average cell size in the transverse direction of 0.34 mm, an average cell size in the longitudinal direction of 0.33 mm, and a cell anisotropic ratio of 0.91. The thermal conductivity of the obtained foam was 0.027 W/mK, and the bending strength thereof was 69 N/cm², and the combustibility thereof satisfied the standard prescribed in JIS A 9511. That is, the obtained foam was a skin-bearing extruded styrene resin foam having all of thermal insulating property, flame retardant property and bending strength meeting the standards for the extrusion method polystyrene foam thermal insulating board Class 3b prescribed in JIS A 9511.

Comparative Example B1

A polystyrene resin available under the trade name "Styron G9401" made by A&M Styrene Co., Ltd. was used. To 100 parts of the polystyrene resin were dry-blended 3.5 parts of HBCD as a halogenated flame retardant, 3 parts of isocyanuric acid as a nitrogen-containing compound, 1 part of triphenyl phosphate as a phosphoric acid ester compound, 1 part of bentonite, 0.1 part of dehydrated silica, 0.1 part of talc as a nucleating agent, and 0.25 part of barium stearate as a lubricating agent, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 50 mm thickness and about 1,000 mm width. The temperature of the forming mold at the time of forming was set at about 130° C.

In this case, as blowing agents, 4 parts of isobutane, 1.6 parts of dimethyl ether, and 0.9 part of water based on 100 parts of the polystyrene resin (62% of isobutane, 25% of dimethyl ether, and 13% of water based on 100% of the blowing agents) were introduced under pressure into the polystyrene resin through different lines, respectively, at the tip portion of the first extruder.

A foam sample was obtained but many cracks or fissures were observed on the surface thereof, giving coarse skin condition.

The obtained foam had a foam entire density of 37.2 kg/m$^3$, a density of upper layer 20% portion of 38.8 kg/m$^3$, and a density of lower layer 20% portion of 38.7 kg/m$^3$. Further, the foam had an average cell size in the thickness direction of 0.23 mm, an average cell size in the transverse direction of 0.22 mm, an average cell size in the longitudinal direction of 0.21 mm, and a cell anisotropic ratio of 1.05. The foam had a cell structure wherein large cells and small cells coexist, and a small cell-occupied area ratio of 35%. The thermal conductivity of the obtained foam was 0.027 W/mK, and the bending strength thereof was 62 N/cm$^2$, and the combustibility thereof satisfied the standard prescribed in JIS A 9511.

Comparative Example B2

Each of the upper and lower surfaces of the foam obtained in Comparative Example B1 was shaved off thin to be finished to a shaven face showing good adhesion against concrete or the like, giving an extruded foam board having a cross-section with about 40 mm thickness and about 1,000 mm width.

The obtained foam had a foam entire density of 34.7 kg/m$^3$, a density of upper layer 20% portion of 35.1 kg/m$^3$, and a density of lower layer 20% portion of 35.0 kg/m$^3$. Further, the foam had an average cell size in the thickness direction of 0.23 mm, an average cell size in the transverse direction of 0.22 mm, an average cell size in the longitudinal direction of 0.21 mm, and a cell anisotropic ratio of 1.05. The foam had a cell structure wherein large cells and small cells coexist, and a small cell-occupied area ratio of 35%. The thermal conductivity of the obtained foam was 0.028 W/mK, and the bending strength thereof was 59 N/cm$^2$, and the combustibility thereof satisfied the standard prescribed in JIS A 9511.

Comparative Example B3

A polystyrene resin available under the trade name "Styron G9401" made by A&M Styrene Co., Ltd. was used. To 100 parts of the polystyrene resin were dry-blended 3.5 parts of HBCD, 0.5 part of talc, and 0.25 part of barium stearate, and then the resultant resin mixture was supplied to a tandem type extruder. The resin mixture supplied to a first extruder was heated to about 200° C. and melted or plasticized and kneaded, and then the resultant was cooled to about 110° C. to about 130° C. in a second extruder connected to the first extruder and further a cooling device and extruded to the atmosphere through a die attached to the tip of the cooling device. The extruded foam was shaped by means of a forming mold and forming rolls to obtain an extruded foam board having a cross-section with about 30 mm thickness and about 1,000 mm width. The temperature of the forming mold at the time of forming was set at about 80° C. which was considerably lower than the resin temperature at the time of foaming.

In this case, as blowing agents, 4 parts of isobutane, and 2 parts of dimethyl ether based on 100 parts of the polystyrene resin (67% of isobutane, and 33% of dimethyl ether based on 100% of the blowing agents) were introduced under pressure into the polystyrene resin through different lines, respectively, at the tip portion of the first extruder.

The obtained foam was a foam having satisfactory skin condition and a foam entire density of 36.2 kg/m$^3$, a density of upper layer 20% portion of 38.9 kg/m$^3$, and a density of lower layer 20% portion of 39.1 kg/m$^3$. Further, the foam had an average cell size in the thickness direction of 0.25 mm, an average cell size in the transverse direction of 0.31 mm, an average cell size in the longitudinal direction of 0.33 mm, and a cell anisotropic ratio of 0.85. The thermal conductivity of the obtained foam was 0.028 W/mK, and the bending strength thereof was 65 N/cm$^2$, both of which satisfied the standards for the extrusion method polystyrene foam thermal insulating board Class 3b prescribed in JIS A 9511. However, the combustibility thereof did not satisfy the standard prescribed in JIS A 9511.

The results obtained in above-mentioned Examples B1 to B10 and Comparative Examples B1 to B3 are summarized in Table 2.

TABLE 2

| | | Ex. | | | | | | | | | | Com. Ex. | | |
| --- | --- | --- | --- | --- | --- | --- | --- | --- | --- | --- | --- | --- | --- | --- |
| | | B1 | B2 | B3 | B4 | B5 | B6 | B7 | B8 | B9 | B10 | B1 | B2 | B3 |
| Polystyrene | part | 100 | 100 | 100 | 100 | 100 | 100 | 100 | 100 | 100 | 100 | 100 | 100 | 100 |
| Halogenated flame retardant HBCD | part | 3.5 | 3.5 | 3.5 | 3.5 | 3 | 3.5 | 3.5 | 3 | 3 | 3.5 | 3.5 | 3.5 | 3.5 |
| Nitrogen-containing compound | | | | | | | | | | | | | | |
| Isocyanuric acid | part | 3 | 3 | 3 | 3 | | | | | | | 3 | 3 | |
| Bis(2-carboxyethyl) isocyanurate | part | | | | | 3 | | | | | | | | |
| Boron oxide Diboron trioxide | part | | | | | | 2 | | | | | | | |
| Phosphorus type flame retardant Ammonium polyphosphate | part | | | | | | | 3 | | | | | | |
| Tetrazole compound Tetrazole | part | | | | | | | | 4 | | | | | |

TABLE 2-continued

|  |  | Ex. | | | | | | | | | | Com. Ex. | | |
| --- | --- | --- | --- | --- | --- | --- | --- | --- | --- | --- | --- | --- | --- | --- |
|  |  | B1 | B2 | B3 | B4 | B5 | B6 | B7 | B8 | B9 | B10 | B1 | B2 | B3 |
| Metal borate Zinc borate | part |  |  |  |  |  |  |  |  | 2 |  |  |  |  |
| Phosphoric acid ester compound Triphenyl phosphate | part | 1 | 1 | 1 | 1 | 1 |  |  |  |  | 3 | 1 | 1 |  |
| Blowing agent |  |  |  |  |  |  |  |  |  |  |  |  |  |  |
| Isobutane | part | 4 | 4 | 4 | 4 | 4 | 4 | 5 | 4 | 4 | 4 | 4 | 4 | 4 |
| Dimethyl ether | part | 1.6 | 1.6 | 1.3 | 1.3 | 2 | 2 | 3 | 4 | 4 | 2 | 1.6 | 1.6 | 2 |
| Water | part | 0.9 | 0.9 | 0.8 | 0.8 | 1 |  |  |  |  |  | 0.9 | 0.9 |  |
| Other additive |  |  |  |  |  |  |  |  |  |  |  |  |  |  |
| Bentonite | part | 1 | 1 | 1 | 1 | 1 |  |  |  |  |  | 1 | 1 |  |
| Silica | part | 0.1 | 0.1 | 0.1 | 0.1 | 0.1 |  |  |  |  |  | 0.1 | 0.1 |  |
| Foam entire density X | kg/m$^3$ | 37.4 | 34.5 | 35.3 | 32.1 | 36.4 | 35.9 | 34.2 | 36.5 | 33.4 | 37.6 | 37.2 | 34.7 | 36.2 |
| Density of upper layer 20% portion Y | kg/m$^3$ | 41.3 | 36.3 | 39.9 | 34.5 | 40.2 | 43.5 | 38.2 | 39.7 | 38.1 | 42.1 | 38.8 | 35.1 | 38.9 |
| Y/X |  | 1.10 | 1.05 | 1.13 | 1.07 | 1.10 | 1.21 | 1.12 | 1.09 | 1.14 | 1.12 | 1.04 | 1.01 | 1.07 |
| Density of lower layer 20% portion Y' | kg/m$^3$ | 40.9 | 36.2 | 39.6 | 34.3 | 40.8 | 43.6 | 38.1 | 39.5 | 38.3 | 42.3 | 38.7 | 35.0 | 39.1 |
| Y'/X |  | 1.09 | 1.05 | 1.12 | 1.07 | 1.12 | 1.21 | 1.11 | 1.08 | 1.15 | 1.13 | 1.04 | 1.01 | 1.08 |
| Amount of remaining blowing agent |  |  |  |  |  |  |  |  |  |  |  |  |  |  |
| Isobutane | g | 3.9 | 3.9 | 3.9 | 3.9 | 3.9 | 3.8 | 4.8 | 3.6 | 3.7 | 3.7 | 3.9 | 3.9 | 3.9 |
| Dimethyl ether | g | 0.1 | 0.1 | 0.1 | 0.1 | 0.1 | 0.1 | 0.3 | 0.3 | 0.3 | 0.1 | 0.1 | 0.1 | 0.2 |
| Average cell size a in thickness direction | mm | 0.22 | 0.22 | 0.17 | 0.17 | 0.20 | 0.24 | 0.23 | 0.25 | 0.27 | 0.29 | 0.23 | 0.23 | 0.25 |
| Average cell size b in transverse direction | mm | 0.22 | 0.22 | 0.19 | 0.19 | 0.21 | 0.32 | 0.24 | 0.24 | 0.34 | 0.34 | 0.22 | 0.22 | 0.31 |
| Average cell size c in longitudinal direction | mm | 0.21 | 0.21 | 0.19 | 0.19 | 0.23 | 0.34 | 0.26 | 0.23 | 0.32 | 0.33 | 0.21 | 0.21 | 0.33 |
| Cell anisotropic ratio k |  | 1.02 | 1.02 | 0.93 | 0.93 | 0.94 | 0.81 | 0.95 | 1.04 | 0.88 | 0.91 | 1.05 | 1.05 | 0.85 |
| Small cell-occupied area ratio | % | 35 | 35 | 45 | 45 | 35 |  |  |  |  |  | 35 | 35 |  |
| Foam thermal conductivity | W/mK | 0.026 | 0.027 | 0.026 | 0.027 | 0.027 | 0.026 | 0.027 | 0.028 | 0.028 | 0.027 | 0.027 | 0.028 | 0.028 |
| Foam bending strength | N/cm$^2$ | 69 | 64 | 66 | 63 | 70 | 74 | 68 | 65 | 67 | 69 | 62 | 59 | 65 |
| Foam combustibility |  | ○ | ○ | ○ | ○ | ○ | ○ | ○ | ○ | ○ | ○ | ○ | ○ | X |
| Skin condition |  | ○ | * | ○ | * | ○ | ○ | ○ | ○ | ○ | ○ | X | * | ○ |

*skin shaved

EXAMPLES C1 TO C12 AND COMPARATIVE EXAMPLES C1 TO C3

These Examples and Comparative Examples are Examples and Comparative Examples of the third invention.

The pressure drop at die slit portion and the residence time at die slit portion which are operation factors when producing a foam were determined according to the following methods. Further, forming stability was determined according to the following method.

Furthermore, when foams which were worthy of evaluation were obtained, the foam combustibility, the foam thermal conductivity, the average cell sizes in respective directions (thickness direction, transverse direction and longitudinal direction), the cell anisotropic ratio, and the small cell-occupied area ratio were determined in the same manners as in Examples A1 to A14.

(1) Pressure Drop at Die Slit Portion (MPa)

The pressure drop was measured by a pressure sensor installed immediately before the upstream side of the die slit portion in extrusion process.

(2) Residence Time at Die Slit Portion (sec)

The resin residence time at the die slit portion is determined by the following equation:

$$t = (W \times L \times H)/Q$$

t(see): resin residence time at the die slit portion,
W(cm): width of the die slit portion,
L(cm): land length of the die slit portion,
H(cm): gap of the die slit portion, and
Q(cm$^3$/sec): volumetric flow rate of resin.

The volumetric flow rate of resin Q (cm$^3$/sec) is determined by the following equation using the measured discharge amount Q' (kg/Hr) and the density of a styrene resin used (1.05 g/cm³) and converting the unit.

$$Q=Q'/3.6/1.05$$

Accordingly, the resin residence time at the die slit portion is finally determined by the following equation:

$$t=(W \times L \times H)/Q' \times 3.6 \times 1.05$$

(3) Forming Stability

The forming stability is evaluated on the basis of the following criteria:

○: A foam having a constant cross-section is stably formed without a gas blow from the die or a pressure change, and the obtained foam contains no voids and has a satisfactory surface condition.

X: A foam having a constant cross-section is not stably formed due to a gas blow from the die, a pressure change or the like. Even if a foam can be formed, the obtained foam contains voids and has a coarse surface condition.

Example C1

A polystyrene resin available under the trade name "Styron G9401" made by A&M Styrene Co., Ltd. was used. To 100 parts of the polystyrene resin were dry-blended 3.0 parts of hexabromocyclododecane (hereinafter abbreviated to HBCD) as a halogenated flame retardant, 3.0 parts of isocyanuric acid (made by Shikoku Corporation, trade name: ICA-P) as a nitrogen-containing compound, 1.0 part of triphenyl phosphate (made by Ajinomoto Co., Inc., TPP) as a phosphoric acid ester compound, 1.0 part of bentonite (made by Hojun Kogyo Co., Ltd., trade name: BENGEL 23), 0.1 part of talc as a nucleating agent, and 0.25 part of barium stearate as a lubricating agent, and then the resultant resin mixture was supplied to a tandem type extruder. The resin mixture supplied to a first extruder was heated to about 200° C. and melted or plasticized and kneaded. Further, as blowing agents, 1.5 parts of dimethyl ether, 4.0 parts of isobutane, and 1.0 part of water were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 50 kg/Hr by controlling the number of revolutions of the screw of the first extruder. As a result, the residence time at the die slit portion was 0.23 sec. The pressure drop at the die slit portion was 6.3 MPa. The extruded foam was shaped by means of a forming mold and forming rolls to stably obtain a foam having a cross-section with about 40 mm thickness and about 150 mm width.

The obtained foam had a foam density of 32 kg/m³, an average cell size in the thickness direction of 0.18 mm, an average cell size in the transverse direction of 0.19 mm, an average cell size in the longitudinal direction of 0.20 mm, and a cell anisotropic ratio of 0.95. Further, the foam had a cell structure wherein large cells and small cells coexist, and a small cell-occupied area ratio of 42%. The thermal conductivity of the obtained foam was 0.027 W/mK, and the combustibility thereof satisfied the standard prescribed in JIS A 9511. That is, the foam was provided with high-level thermal insulating property and flame retardant property.

Example C2

A polystyrene resin available under the trade name "Styron G9401" made by A&M Styrene Co., Ltd. was used. To 100 parts of the polystyrene resin were dry-blended 3.0 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.5 parts of dimethyl ether, 4.0 parts of isobutane, and 1.0 part of water were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 2.0 cm was used. The discharge amount was adjusted to 50 kg/Hr by controlling the number of revolutions of the screw of the first extruder. As a result, the residence time at the die slit portion was 0.15 sec. The pressure drop at the die slit portion was 4.5 MPa. The extruded foam was shaped by means of a forming mold and forming rolls to stably obtain a foam having a cross-section with about 40 mm thickness and about 150 mm width.

The obtained foam had a foam density of 32 kg/m³, an average cell size in the thickness direction of 0.17 mm, an average cell size in the transverse direction of 0.18 mm, an average cell size in the longitudinal direction of 0.19 mm, and a cell anisotropic ratio of 0.95. Further, the foam had a cell structure wherein large cells and small cells coexist, and a small cell-occupied area ratio of 41%. The thermal conductivity of the obtained foam was 0.027 W/mK, and the combustibility thereof satisfied the standard prescribed in JIS A 9511. That is, the foam was provided with high-level thermal insulating property and flame retardant property.

Example C3

A polystyrene resin available under the trade name "Styron G9401" made by A&M Styrene Co., Ltd. was used. To 100 parts of the polystyrene resin were dry-blended 3.0 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.5 parts of dimethyl ether, 4.0 parts of isobutane, and 1.0 part of water were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 90 kg/Hr by controlling the number of revolutions of the screw of the first extruder. As a result, the residence time at the die slit portion was 0.13 sec. The pressure drop at the die slit portion was 7.4 MPa. The extruded foam was shaped by means of a forming mold and forming rolls to stably obtain a foam having a cross-section with about 40 mm thickness and about 150 mm width.

The obtained foam had a foam density of 32 kg/m$^3$, an average cell size in the thickness direction of 0.16 mm, an average cell size in the transverse direction of 0.18 mm, an average cell size in the longitudinal direction of 0.21 mm, and a cell anisotropic ratio of 0.88. Further, the foam had a cell structure wherein large cells and small cells coexist, and a small cell-occupied area ratio of 43%. The thermal conductivity of the obtained foam was 0.026 W/mK, and the combustibility thereof satisfied the standard prescribed in JIS A 9511. That is, the foam was provided with high-level thermal insulating property and flame retardant property.

Example C4

A polystyrene resin available under the trade name "Styron G9401" made by A&M Styrene Co., Ltd. was used. To 100 parts of the polystyrene resin were dry-blended 3.5 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.0 part of dimethyl ether, 4.0 parts of isobutane, 1.0 part of water, and 1.5 parts of ethyl alcohol were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 50 kg/Hr by controlling the number of revolutions of the screw of the first extruder. As a result, the residence time at the die slit portion was 0.23 sec. The pressure drop at the die slit portion was 5.4 MPa. The extruded foam was shaped by means of a forming mold and forming rolls to stably obtain a foam having a cross-section with about 40 mm thickness and about 150 mm width.

The obtained foam had a foam density of 31 kg/m$^3$, an average cell size in the thickness direction of 0.21 mm, an average cell size in the transverse direction of 0.20 mm, an average cell size in the longitudinal direction of 0.21 mm, and a cell anisotropic ratio of 1.02. Further, the foam had a cell structure wherein large cells and small cells coexist, and a small cell-occupied area ratio of 36%. The thermal conductivity of the obtained foam was 0.028 W/mK, and the combustibility thereof satisfied the standard prescribed in JIS A 9511. That is, the foam was provided with high-level thermal insulating property and flame retardant property.

Example C5

A polystyrene resin available under the trade name "Styron G9401" made by A&M Styrene Co., Ltd. was used. To 100 parts of the polystyrene resin were dry-blended 3.5 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.0 part of dimethyl ether, 4.0 parts of isobutane, 1.0 part of water, and 1.5 parts of ethyl alcohol were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 2.0 cm was used. The discharge amount was adjusted to 50 kg/Hr by controlling the number of revolutions of the screw of the first extruder. As a result, the residence time at the die slit portion was 0.15 sec. The pressure drop at the die slit portion was 4.1 MPa. The extruded foam was shaped by means of a forming mold and forming rolls to stably obtain a foam having a cross-section with about 40 mm thickness and about 150 mm width.

The obtained foam had a foam density of 31 kg/m$^3$, an average cell size in the thickness direction of 0.20 mm, an average cell size in the transverse direction of 0.21 mm, an average cell size in the longitudinal direction of 0.20 mm, and a cell anisotropic ratio of 0.98. Further, the foam had a cell structure wherein large cells and small cells coexist, and a small cell-occupied area ratio of 36%. The thermal conductivity of the obtained foam was 0.028 W/mK, and the combustibility thereof satisfied the standard prescribed in JIS A 9511. That is, the foam was provided with high-level thermal insulating property and flame retardant property.

Example C6

A polystyrene resin available under the trade name "Styron G9401" made by A&M Styrene Co., Ltd. was used. To 100 parts of the polystyrene resin were dry-blended 3.5 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.0 part of dimethyl ether, 4.0 parts of isobutane, 1.0 part of water, and 1.5 parts of ethyl alcohol were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 90 kg/Hr by controlling the number of revolutions of the screw of the first extruder. As a result, the residence time at the die slit portion was 0.13 sec. The pressure drop at the die slit portion was 6.5 MPa. The extruded foam was shaped by means of a forming mold and forming rolls to stably obtain a foam having a cross-section with about 40 mm thickness and about 150 mm width.

The obtained foam had a foam density of 31 kg/m$^3$, an average cell size in the thickness direction of 0.19 mm, an average cell size in the transverse direction of 0.20 mm, an average cell size in the longitudinal direction of 0.21 mm, and a cell anisotropic ratio of 0.95. Further, the foam had a cell structure wherein large cells and small cells coexist, and a small cell-occupied area ratio of 38%. The thermal conductivity of the obtained foam was 0.027 W/mK, and the combustibility thereof satisfied the standard prescribed in JIS A 9511. That is, the foam was provided with high-level thermal insulating property and flame retardant property.

Example C7

A polystyrene resin available under the trade name "Styron G9401" made by A&M Styrene Co., Ltd. was used. To 100 parts of the polystyrene resin were dry-blended 3.0 parts of HBCD, 2.0 parts of diboron trioxide, 1.0 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 2.0 parts of dimethyl ether, and 5.0 parts of isobutane were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 50 kg/Hr by controlling the number of revolutions of the screw of the first extruder. As a result, the residence time at the die slit portion was 0.23 sec. The pressure drop at the die slit portion was 5.8 MPa. The extruded foam was shaped by means of a forming mold and forming rolls to stably obtain a foam having a cross-section with about 30 mm thickness and about 150 mm width.

The obtained foam had a foam density of 33 kg/m$^3$, an average cell size in the thickness direction of 0.24 mm, an average cell size in the transverse direction of 0.24 mm, an average cell size in the longitudinal direction of 0.25 mm, and a cell anisotropic ratio of 0.99. The thermal conductivity of the obtained foam was 0.028 W/mK, and the combustibility thereof satisfied the standard prescribed in JIS A 9511. That is, the foam was provided with high-level thermal insulating property and flame retardant property.

Example C8

A polystyrene resin available under the trade name "Styron G9401" made by A&M Styrene Co., Ltd. was used. To 100 parts of the polystyrene resin were dry-blended 3.0 parts of HBCD, 2.0 parts of diboron trioxide, 1.0 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 2.0 parts of dimethyl ether, and 5.0 parts of isobutane were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 2.0 cm was used. The discharge amount was adjusted to 50 kg/Hr by controlling the number of revolutions of the screw of the first extruder. As a result, the residence time at the die slit portion was 0.15 sec. The pressure drop at the die slit portion was 4.4 MPa. The extruded foam was shaped by means of a forming mold and forming rolls to stably obtain a foam having a cross-section with about 30 mm thickness and about 150 mm width.

The obtained foam had a foam density of 33 kg/m$^3$, an average cell size in the thickness direction of 0.24 mm, an average cell size in the transverse direction of 0.24 mm, an average cell size in the longitudinal direction of 0.23 mm, and a cell anisotropic ratio of 1.01. The thermal conductivity of the obtained foam was 0.028 W/mK, and the combustibility thereof satisfied the standard prescribed in JIS A 9511. That is, the foam was provided with high-level thermal insulating property and flame retardant property.

Example C9

A polystyrene resin available under the trade name "Styron G9401" made by A&M Styrene Co., Ltd. was used. To 100 parts of the polystyrene resin were dry-blended 3.0 parts of HBCD, 2.0 parts of diboron trioxide, 1.0 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 2.0 parts of dimethyl ether, and 5.0 parts of isobutane were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 90 kg/Hr by controlling the number of revolutions of the screw of the first extruder. As a result, the residence time at the die slit portion was 0.13 sec. The pressure drop at the die slit portion was 6.7 MPa. The extruded foam was shaped by means of a forming mold and forming rolls to stably obtain a foam having a cross-section with about 30 mm thickness and about 150 mm width.

The obtained foam had a foam density of 33 kg/m³, an average cell size in the thickness direction of 0.22 mm, an average cell size in the transverse direction of 0.25 mm, an average cell size in the longitudinal direction of 0.26 mm, and a cell anisotropic ratio of 0.91. The thermal conductivity of the obtained foam was 0.027 W/mK, and the combustibility thereof satisfied the standard prescribed in JIS A 9511. That is, the foam was provided with high-level thermal insulating property and flame retardant property.

Example C10

A polystyrene resin available under the trade name "Styron G9401" made by A&M Styrene Co., Ltd. was used. To 100 parts of the polystyrene resin were dry-blended 3.0 parts of HBCD, 3.0 parts of ammonium polyphosphate as a phosphorus type flame retardant containing nitrogen atom in a molecule, 1.0 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 2.0 parts of dimethyl ether, and 5.0 parts of isobutane were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 50 kg/Hr by controlling the number of revolutions of the screw of the first extruder. As a result, the residence time at the die slit portion was 0.23 sec. The pressure drop at the die slit portion was 5.9 MPa. The extruded foam was shaped by means of a forming mold and forming rolls to stably obtain a foam having a cross-section with about 30 mm thickness and about 150 mm width.

The obtained foam had a foam density of 32 kg/m³, an average cell size in the thickness direction of 0.23 mm, an average cell size in the transverse direction of 0.24 mm, an average cell size in the longitudinal direction of 0.24 mm, and a cell anisotropic ratio of 0.97. The thermal conductivity of the obtained foam was 0.028 W/mK, and the combustibility thereof satisfied the standard prescribed in JIS A 9511. That is, the foam was provided with high-level thermal insulating property and flame retardant property.

Example C11

A polystyrene resin available under the trade name "Styron G9401" made by A&M Styrene Co., Ltd. was used. To 100 parts of the polystyrene resin were dry-blended 3.0 parts of HBCD, 4.0 parts of 5,5'-bistetrazole diguanidine salt (made by Toyo Kasei Co., Ltd., BHT-2GAD) (in Table 3, abbreviated to tetrazole) as a tetrazole compound, 1.0 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 2.0 parts of dimethyl ether, and 5.0 parts of isobutane were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 50 kg/Hr by controlling the number of revolutions of the screw of the first extruder. As a result, the residence time at the die slit portion was 0.23 sec. The pressure drop at the die slit portion was 5.6 MPa. The extruded foam was shaped by means of a forming mold and forming rolls to stably obtain a foam having a cross-section with about 30 mm thickness and about 150 mm width.

The obtained foam had a foam density of 34 kg/m³, an average cell size in the thickness direction of 0.24 mm, an average cell size in the transverse direction of 0.24 mm, an average cell size in the longitudinal direction of 0.24 mm, and a cell anisotropic ratio of 1.00. The thermal conductivity of the obtained foam was 0.028 W/mK, and the combustibility thereof satisfied the standard prescribed in JIS A 9511. That is, the foam was provided with high-level thermal insulating property and flame retardant property.

Example C12

A polystyrene resin available under the trade name "Styron G9401" made by A&M Styrene Co., Ltd. was used. To 100 parts of the polystyrene resin were dry-blended 3.0 parts of HBCD, 2.0 parts of zinc borate as a metal borate, 1.0 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 2.0 parts of dimethyl ether, and 5.0 parts of isobutane were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.2 cm, and a slit land length of 3.0 cm was used. The discharge amount was adjusted to 50 kg/Hr by controlling the number of revolutions of the screw of the first extruder. As a result, the residence time at the die slit portion was 0.23 sec. The pressure drop at the die slit portion was 5.5 MPa. The extruded foam was shaped by means of a forming mold and forming rolls to stably obtain a foam having a cross-section with about 30 mm thickness and about 150 mm width.

The obtained foam had a foam density of 33 kg/m³, an average cell size in the thickness direction of 0.23 mm, an average cell size in the transverse direction of 0.25 mm, an average cell size in the longitudinal direction of 0.24 mm, and a cell anisotropic ratio of 0.96. The thermal conductivity of the obtained foam was 0.028 W/mK, and the combustibility thereof satisfied the standard prescribed in JIS A 9511.

That is, the foam was provided with high-level thermal insulating property and flame retardant property.

Comparative Example C1

A polystyrene resin available under the trade name "Styron G9401" made by A&M Styrene Co., Ltd. was used. To 100 parts of the polystyrene resin were dry-blended 3.0 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.5 parts of dimethyl ether, 4.0 parts of isobutane, and 1.0 part of water were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.45 cm, and a slit land length of 3.0 cm was used. The discharge amount was adjusted to 50 kg/Hr by controlling the number of revolutions of the screw of the first extruder. As a result, the residence time at the die slit portion was 0.51 sec. The pressure drop at the die slit portion was 3.1 MPa. However, under such conditions, gases frequently blew off from the die and the formation of a foam was unstable. The obtained foam contained many voids which were attributed to poor dispersion of gases and had a coarse surface condition. Thus, any foam which is worthy of evaluation of foam thermal conductivity and foam combustibility was not obtained.

Comparative Example C2

A polystyrene resin available under the trade name "Styron G9401" made by A&M Styrene Co., Ltd. was used. To 100 parts of the polystyrene resin were dry-blended 3.0 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.5 parts of dimethyl ether, 4.0 parts of isobutane, and 1.0 part of water were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.35 cm, and a slit land length of 3.0 cm was used. The discharge amount was adjusted to 50 kg/Hr by controlling the number of revolutions of the screw of the first extruder. As a result, the residence time at the die slit portion was 0.40 sec. The pressure drop at the die slit portion was 3.6 MPa. However, under such conditions, the cross-sectional shape of the foam greatly varied and the formation of a foam was unstable. The obtained foam contained many voids which were attributed to poor dispersion of gases and had a coarse surface condition. Thus, any foam which is worthy of evaluation of foam thermal conductivity and foam combustibility was not obtained.

Comparative Example C3

A polystyrene resin available under the trade name "Styron G9401" made by A&M Styrene Co., Ltd. was used. To 100 parts of the polystyrene resin were dry-blended 3.0 parts of HBCD, 3.0 parts of isocyanuric acid, 1.0 part of triphenyl phosphate, 1.0 part of bentonite, 0.1 part of talc, and 0.25 part of barium stearate, and then the resultant resin mixture was supplied to a tandem type extruder. The resin mixture supplied to a first extruder was heated to about 200° C. and melted or plasticized and kneaded. Further, as blowing agents, 1.5 parts of dimethyl ether, 4.0 parts of isobutane, and 1.0 part of water were introduced under pressure into the polystyrene resin through different lines, respectively, at the tip portion of the first extruder. Then the resultant was cooled to about 110° C. to about 130° C. in a second extruder connected to the first extruder and further a cooling device and extruded to the atmosphere through a die attached to the tip of the cooling device.

As the slit die, a slit die having a slit width of 5.0 cm, a slit gap of 0.35 cm, and a slit land length of 6.0 cm was used. The discharge amount was adjusted to 50 kg/Hr by controlling the number of revolutions of the screw of the first extruder. As a result, the residence time at the die slit portion was 0.79 sec. The pressure drop at the die slit portion was 7.1 MPa. The extruded foam was shaped by means of a forming mold and forming rolls to stably obtain a foam having a cross-section with about 40 mm thickness and about 150 mm width.

The obtained foam had a foam density of 32 kg/m$^3$, an average cell size in the thickness direction of 0.38 mm, an average cell size in the transverse direction of 0.32 mm, an average cell size in the longitudinal direction of 0.30 mm, and a cell anisotropic ratio of 1.15. Further, the foam had a cell structure wherein large cells and small cells coexist, and a small cell-occupied area ratio of 9%. The thermal conductivity of the obtained foam was 0.030 W/mK, and the combustibility thereof satisfied the standard prescribed in JIS A 9511. However, the foam contained enlarged cells as compared to those obtained in Examples C1 to C3 and the thermal insulating property was degraded.

The results obtained in above-mentioned Examples C1 to C12 and Comparative Examples C1 to C3 are summarized in Table 3.

TABLE 3

| | | Ex. | | | | | | | | | | | | Com. Ex. | | |
|---|---|---|---|---|---|---|---|---|---|---|---|---|---|---|---|---|
| | | C1 | C2 | C3 | C4 | C5 | C6 | C7 | C8 | C9 | C10 | C11 | C12 | C1 | C2 | C3 |
| Main material Polystyrene | part | 100 | 100 | 100 | 100 | 100 | 100 | 100 | 100 | 100 | 100 | 100 | 100 | 100 | 100 | 100 |
| Blowing agent | | | | | | | | | | | | | | | | |
| Dimethyl ether | part | 1.5 | 1.5 | 1.5 | 1.0 | 1.0 | 1.0 | 2.0 | 2.0 | 2.0 | 2.0 | 2.0 | 2.0 | 1.5 | 1.5 | 1.5 |
| Isobutane | part | 4.0 | 4.0 | 4.0 | 4.0 | 4.0 | 4.0 | 5.0 | 5.0 | 5.0 | 5.0 | 5.0 | 5.0 | 4.0 | 4.0 | 4.0 |
| Water | part | 1.0 | 1.0 | 1.0 | 1.0 | 1.0 | 1.0 | | | | | | | 1.0 | 1.0 | 1.0 |
| Ethyl alcohol | part | | | | 1.5 | 1.5 | 1.5 | | | | | | | | | |
| Halogenated flame retardant HBCD | part | 3.0 | 3.0 | 3.0 | 3.5 | 3.5 | 3.5 | 3.0 | 3.0 | 3.0 | 3.0 | 3.0 | 3.0 | 3.0 | 3.0 | 3.0 |
| Nitrogen-containing compound Isocyanuric acid | part | 3.0 | 3.0 | 3.0 | 3.0 | 3.0 | 3.0 | | | | | | | 3.0 | 3.0 | 3.0 |
| Boron oxide Diboron trioxide | part | | | | | | | 2.0 | 2.0 | | | | | | | |
| Phosphorus type flame retardant Ammonium polyphosphate | part | | | | | | | | | | 3.0 | | | | | |
| Tetrazole compound Tetrazole | part | | | | | | | | | | | 4.0 | | | | |
| Metal borate Zinc borate | part | | | | | | | | | | | | 2.0 | | | |
| Other additive Phosphoric acid ester compound | part | 1.0 | 1.0 | 1.0 | 1.0 | 1.0 | 1.0 | | | | | | | 1.0 | 1.0 | 1.0 |
| Triphenyl phosphate | part | 1.0 | 1.0 | 1.0 | 1.0 | 1.0 | 1.0 | | | | | | | 1.0 | 1.0 | 1.0 |
| Bentonite | part | | | | | | | | | | | | | | | |
| Discharged amount | kg/hr | 50 | 50 | 90 | 50 | 50 | 90 | 50 | 50 | 90 | 50 | 50 | 50 | 50 | 50 | 50 |
| Die slit width | cm | 5.0 | 5.0 | 5.0 | 5.0 | 5.0 | 5.0 | 5.0 | 5.0 | 5.0 | 5.0 | 5.0 | 5.0 | 5.0 | 5.0 | 5.0 |
| Die slit gap | cm | 0.2 | 0.2 | 0.2 | 0.2 | 0.2 | 0.2 | 0.2 | 0.2 | 0.2 | 0.2 | 0.2 | 0.2 | 0.45 | 0.35 | 0.35 |
| Die slit land length | cm | 3.0 | 2.0 | 3.0 | 3.0 | 2.0 | 3.0 | 3.0 | 2.0 | 3.0 | 3.0 | 3.0 | 3.0 | 3.0 | 3.0 | 6.0 |
| Pressure drop at die slit portion | MPa | 6.3 | 4.5 | 7.4 | 5.4 | 4.1 | 6.5 | 5.8 | 4.4 | 6.7 | 5.9 | 5.6 | 5.5 | 3.1 | 3.6 | 7.1 |
| Residence time at die slit portion | sec | 0.23 | 0.15 | 0.13 | 0.23 | 0.15 | 0.13 | 0.23 | 0.15 | 0.13 | 0.23 | 0.23 | 0.23 | 0.51 | 0.40 | 0.79 |
| Forming stability | | ○ | ○ | ○ | ○ | ○ | ○ | ○ | ○ | ○ | ○ | ○ | ○ | X | X | ○ |
| Foam density | kg/m³ | 32 | 32 | 32 | 31 | 31 | 31 | 33 | 33 | 33 | 32 | 34 | 33 | | | 32 |
| Average cell size a in thickness direction | mm | 0.18 | 0.17 | 0.16 | 0.21 | 0.20 | 0.19 | 0.24 | 0.24 | 0.22 | 0.23 | 0.24 | 0.23 | | | 0.38 |
| Average cell size b in transverse direction | mm | 0.19 | 0.18 | 0.18 | 0.20 | 0.21 | 0.20 | 0.24 | 0.23 | 0.25 | 0.24 | 0.24 | 0.25 | | | 0.32 |
| Average cell size c in longitudinal direction | mm | 0.20 | 0.19 | 0.21 | 0.21 | 0.20 | 0.21 | 0.25 | 0.23 | 0.26 | 0.24 | 0.24 | 0.24 | | | 0.30 |
| Cell anisotropic ratio k | | 0.95 | 0.95 | 0.88 | 1.02 | 0.98 | 0.95 | 0.99 | 1.01 | 0.91 | 0.97 | 1.00 | 0.96 | | | 1.15 |
| Small cell-occupied area ratio | % | 42 | 41 | 43 | 36 | 36 | 38 | | | | | | | | | 9 |
| Foam thermal conductivity | W/mK | 0.027 | 0.027 | 0.026 | 0.028 | 0.028 | 0.027 | 0.028 | 0.028 | 0.027 | 0.028 | 0.028 | 0.028 | | | 0.030 |
| Foam combustibility | | ○ | ○ | ○ | ○ | ○ | ○ | ○ | ○ | ○ | ○ | ○ | ○ | | | ○ |

INDUSTRIAL APPLICABILITY

According to the present invention, an extruded styrene resin foam excellent in environmental compatibility and having extremely high-level thermal insulating property and flame retardant property adapted for construction material use is obtained.

What is claimed is:

1. An extruded styrene resin foam obtained by extrusion-foaming of a styrene resin, the extruded styrene resin foam containing at least, one or more of saturated hydrocarbons having 3 to 5 carbon atoms as a blowing agent, and containing (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof; metal borates; boron oxides; and phosphoric acid ester compounds, the extruded styrene resin foam having a cell structure constituting the foam wherein a cell anisotropic ratio k, which is defined by the formula:

$$k=a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30.$$

2. The extruded styrene resin foam of claim 1, wherein the nitrogen-containing compounds selected from cyanuric acid, isocyanuric acid, and derivatives thereof are at least one member selected from the group consisting of nitrogen-containing compounds having the following general formula 1, and nitrogen-containing compounds having the following general formula 2:

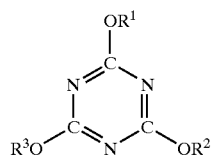

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other;

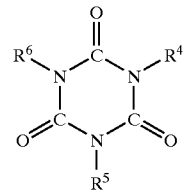

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

3. The extruded styrene resin foam of claim 1, which contains, as the blowing agent, 100 to 20% by weight of at least one of saturated hydrocarbons having 3 to 5 carbon atoms and 0 to 80% by weight of other blowing agent other than flon type blowing agent, based on the total amount of the blowing agent.

4. The extruded styrene resin foam of claim 1, wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

5. The extruded styrene resin foam of claim 1, which contains 0.1 to 10 parts by weight of the halogenated flame retardant (A) and 0.1 to 10 parts by weight of the compound (B), based on 100 parts by weight of the styrene resin.

6. The extruded styrene resin foam of claim 1, wherein the compound (B) is at least one compound selected from the group consisting of the nitrogen-containing compounds having the foregoing general formula 1 and the nitrogen-containing compounds having the foregoing general formula 2.

7. The extruded styrene resin foam of claim 1, wherein the compound (B) is isocyanuric acid and/or bis(2-carboxyethyl) isocyanurate among the nitrogen-containing compounds having the foregoing general formula 2.

8. The extruded styrene resin foam of claim 3, wherein other blowing agent is at least one compound selected from the group consisting of dimethyl ether, methyl chloride, ethyl chloride, water, and carbon dioxide.

9. The extruded styrene resin foam of claim 4, which further contains a smectite.

10. The extruded styrene resin foam of claim 9, wherein the smectite is bentonite.

11. A method for producing an extruded styrene resin foam comprising the steps of heating and melting a styrene resin, adding a blowing agent to the styrene resin, and extrusion-foaming the resultant through a die, wherein the extrusion-foaming is carried out in a condition where (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof; metal borates; boron oxides; and phosphoric acid ester compounds, and further a blowing agent comprising 100 to 20% by weight of at least one of saturated hydrocarbons having 3 to 5 carbon atoms and 0 to 80% by weight of other blowing agent other than flon type blowing agent, are made coexist in the styrene resin, thereby giving a foam having a cell structure constituting the foam wherein a cell anisotropic ratio k, which is defined by the formula:

$$k=a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k+\leq 1.1,$$

and a satisfies the relationship:

$$0.05 \leq a \leq 0.30.$$

12. The method for producing an extruded styrene resin foam of claim 11, wherein the nitrogen-containing compound selected from cyanuric acid, isocyanuric acid, and derivatives thereof is at least one member selected from the group consisting of nitrogen-containing compounds having the following general formula 1, and nitrogen-containing compounds having the following general formula 2:

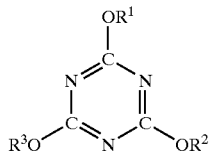

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other;

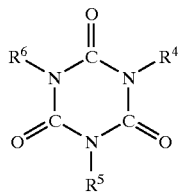

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

13. An extruded styrene resin foam obtained by extrusion foaming of a styrene resin,
the extruded styrene resin foam containing at least, one or more of saturated hydrocarbons having 3 to 5 carbon atoms as a blowing agent, and containing (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof; metal borates; boron oxides; and phosphoric acid ester compounds,
the extruded styrene resin foam having a foam density wherein an entire density X of the foam is 20 to 45 kg/m³, and a density Y of each of both surface layer portions corresponding to up to 20% on the upper side and up to 20% on the lower side, respectively, of the overall thickness of the foam satisfies the relationship:

$$Y \geq 1.05 \times X.$$

14. The extruded styrene resin foam of claim 13, wherein the nitrogen-containing compound selected from cyanuric acid, isocyanuric acid, and derivatives thereof is at least one member selected from the group consisting of nitrogen-containing compounds having the following general formula 1, and nitrogen-containing compounds having the following general formula 2:

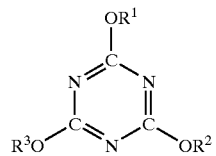

1 wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other;

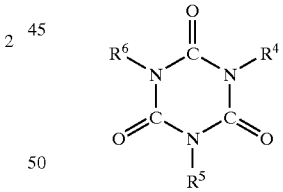

2 wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

15. The extruded styrene resin foam of claim 13, which contains, as the blowing agent, 100 to 20% by weight of at least one of saturated hydrocarbons having 3 to 5 carbon atoms and 0 to 80% by weight of other blowing agent other than flon type blowing agent, based on the total amount of the blowing agent.

16. The extruded styrene resin foam of claim 13, which has a cell structure constituting the foam wherein a cell anisotropic ratio k, which is defined by the formula:

$$k=a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30.$$

17. The extruded styrene resin foam of claim 13, wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

18. The extruded styrene resin foam of claim 13, which contains 0.1 to 10 parts by weight of the halogenated flame retardant (A) and 0.1 to 10 parts by weight of the compound (B), based on 100 parts by weight of the styrene resin.

19. The extruded styrene resin foam of claim 13, wherein the compound (B) is at least one compound selected from the group consisting of the nitrogen-containing compounds having the foregoing general formula 1 and the nitrogen-containing compounds having the forgoing general formula 2.

20. The extruded styrene resin foam of claim 13, wherein the compound (B) is isocyanuric acid and/or bis(2-carboxyethyl) isocyanurate among the nitrogen-containing compounds having the forgoing general formula 2.

21. The extruded styrene resin foam of claim 15, wherein other blowing agent is at least one compound selected from the group consisting of dimethyl ether, methyl chloride, ethyl chloride, water, and carbon dioxide.

22. The extruded styrene resin foam of claim 17, which further contains 0.2 to 10 parts by weight of a smectite based on 100 parts by weight of the styrene resin.

23. The extruded styrene resin foam of claim 22, wherein the smectite is bentonite.

24. A method for producing an extruded styrene resin foam comprising the steps of heating and melting a styrene resin, adding a blowing agent to the styrene resin, and extrusion-foaming the resultant through a die, wherein the extrusion-foaming is carried out in a condition where (A) a halogenated flame retardant, and (B) at least one compound selected from the group consisting of phosphorus type flame retardants containing nitrogen atom in a molecule; tetrazole compounds; nitrogen-containing compounds selected from cyanuric acid, isocyanuric acid, and derivatives thereof; metal borates; boron oxides; and phosphoric acid ester compounds, and further a blowing agent comprising 100 to 20% by weight of at least one of saturated hydrocarbons having 3 to 5 carbon atoms and 0 to 80% by weight of other blowing agent other than flon type blowing agent, are made coexist in the styrene resin, thereby giving a foam having a foam density wherein an entire density X of the foam is 20 to 45 kg/m³, and a density Y of each of both surface layer portions corresponding to up to 20% on the upper side and up to 20% on the lower side, respectively, of the overall thickness of the foam satisfies the relationship:

$$Y \geq 1.05 \times X.$$

25. The method for producing an extruded styrene resin foam of claim 24, wherein the nitrogen-containing compound selected from cyanuric acid, isocyanuric acid, and derivatives thereof is at least one member selected from the group consisting of nitrogen-containing compounds having the following general formula 1, and nitrogen-containing compounds having the following general formula 2:

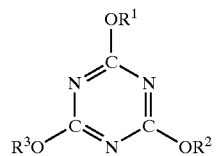

1 wherein R¹, R² and R³ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other;

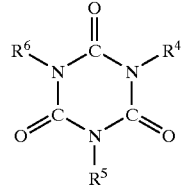

2 wherein R⁴, R⁵ and R⁶ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

26. A method for producing an extruded styrene resin foam comprising the steps of heating and melting a styrene resin, adding a blowing agent to the styrene resin, and extrusion-foaming the resultant into a lower pressure region through a die, wherein a blowing agent comprising 1) 2 to 6 parts by weight of one or more saturated hydrocarbon selected from the group consisting of saturated hydrocarbons having 3 to 4 carbon atoms, 2) 1 to 6 parts by weight of at least one ether selected from the group consisting of dimethyl ether, methyl ethyl ether and diethyl ether, and 3) 0 to 3 parts by weight of at least one member selected from the group consisting of water and alcohols having carbon atoms 1 to 4, based on 100 parts by weight of the styrene resin, is used as the blowing agent, and a pressure drop in a die slit portion is not less than 4 MPa and a resin residence time in the die slit portion is not more than 0.4 second.

27. The method for producing an extruded styrene resin foam of claim 26, wherein the foam has a density of 20 to 40 kg/m³ and the cells constituting the foam have an average cell size of 0.05 to 0.3 mm.

28. The method for producing an extruded styrene resin foam of claim 26, wherein the cells constituting the foam comprise mainly small cells having a cell size of 0.25 mm or less and large cells having a cell size of 0.3 to 1 mm, and the area of the small cells having a cell size of 0.25 mm or less accounts for 10 to 90% of a sectional area of the foam.

29. The method for producing an extruded styrene resin foam of claim 26, wherein a halogenated flame retardant is contained in an amount of 0.1 to 10 parts by weight based on 100 parts by weight of the styrene resin, and at least one compound selected from the group consisting of phosphorus type flame retardants containing nitrogen atom in a molecule; tetrazole compounds; nitrogen-containing compounds selected from cyanuric acid, isocyanuric acid, and derivatives thereof; metal borates; boron oxides; and phosphoric acid ester compounds, is contained in an amount of 0.1 to 10 parts by weight based on 100 parts by weight of the styrene resin.

30. The method for producing an extruded styrene resin foam of claim 29, wherein the nitrogen-containing compound selected from cyanuric acid, isocyanuric acid, and derivatives thereof is at least one member selected from the group consisting of nitrogen-containing compounds having the following general formula 1, and nitrogen-containing compounds having the following general formula 2:

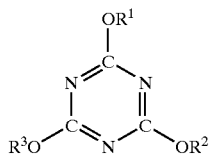

wherein $R^1$, $R^2$ and $R^3$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other;

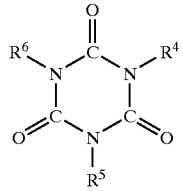

wherein $R^4$, $R^5$ and $R^6$ are selected from hydrogen atom, an alkyl group having 1 to 8 carbon atoms, an organic group represented by the formula: —Y—X (wherein Y is an alkylene group having 1 to 6 carbon atoms, a phenylene group, or a cycloalkylene group, and X is an epoxy group, a carboxyl group, a hydroxyl group, an amino group, a phenyl group, or a monovalent organic group having phosphorus atom), and a phenyl group, and may be different from each other.

31. The method for producing an extruded styrene resin foam of claim 26, wherein a foam which has a cell structure constituting the foam wherein a cell anisotropic ratio k, which is defined by the formula:

$$k = a/(a \times b \times c)^{1/3}$$

wherein, in sections of the foam, a (mm) is an average cell size in the thickness direction, b (mm) is an average cell size in the transverse direction and c (mm) is an average cell size in the longitudinal direction, satisfies the relationship:

$$k \leq 1.1,$$

and a satisfies the relationship:

$$0.05 \leq a \leq 0.30,$$

is obtained.

* * * * *